United States Patent [19]

Eickmann

[11] Patent Number: 4,856,732
[45] Date of Patent: Aug. 15, 1989

[54] AIRBORNE VEHICLE WITH HYDRAULIC DRIVE AND CONTROL

[76] Inventor: Karl Eickmann, 2420 Isshiki, Hayama-machi, Kanagawa-ken, Japan

[21] Appl. No.: 45,638

[22] Filed: May 1, 1987

[51] Int. Cl.[4] .............................................. B64C 37/00
[52] U.S. Cl. ....................................... 244/2; 244/12.4; 244/56; 244/66
[58] Field of Search ................ 244/12.4, 2, 12.6, 23 R, 244/23 A, 26, 29, 56, 66, 60

[56] References Cited

U.S. PATENT DOCUMENTS

| | | | |
|---|---|---|---|
| 1,957,896 | 5/1934 | Marguglio | 244/23 R |
| 3,012,738 | 12/1961 | Bertin et al. | 244/12.4 |
| 3,276,528 | 10/1966 | Tucknott et al. | 244/23 R |
| 3,417,943 | 12/1968 | Page et al. | 244/23 R |
| 3,497,162 | 2/1970 | Zickmann | |

FOREIGN PATENT DOCUMENTS 1506048  7/1969  Fed. Rep. of Germany ..... 244/12.4

Primary Examiner—Galen L. Barefoot

[57] ABSTRACT

An airborne craft with at least four propellers arranged in a front propeller pair and a rear propeller pair having substantial vertical or forwardly inclined axes has hydraulic motors which drive the propellers. A pumping device supplies two pairs of separated flows to the motors. One pair of the flows has fixed delivery and equal flow quantities per revolution of the pump while the other pair has variable flow-rates but the flow quantities of both flows of the variable flow pair are also equal relatively to each other. One of the flow pairs drives the front propellers at equal speeds and the other pair of flows drives the rear propellers with equal speeds. But the variability of the rates of flow of one of the pairs of flows is utilized to let one of the pairs run with a different rotary velocity of the propellers than the other pair. The so obtained difference of rotary speeds of the propeller pairs relatively to each other is utilized to incline the vehicle in a desired and controlable extent in the desired direction of flight to obtain and control the forward speed of the vehicle. The variable flow pair has a common control means which assures an equality of the rates of flows in the variable flow pair, whereby a straight forward flight path of the vehicle is assured and departures to the right or left of the desired flight path are prevented. The invention also makes it possible to set the arrangement to the most effective and fuel saving speed as well as to employ control means, which prevent too stiff descents or ascents. In the specific embodiment whereto the claims are directed, the invention is utilized to provide a vehicle with the lateral size of a passenger car to be able to run on the road and lift away from it to fly through the air, borne by eight propellers which are located and revolve in eight ducts.

1 Claim, 28 Drawing Sheets

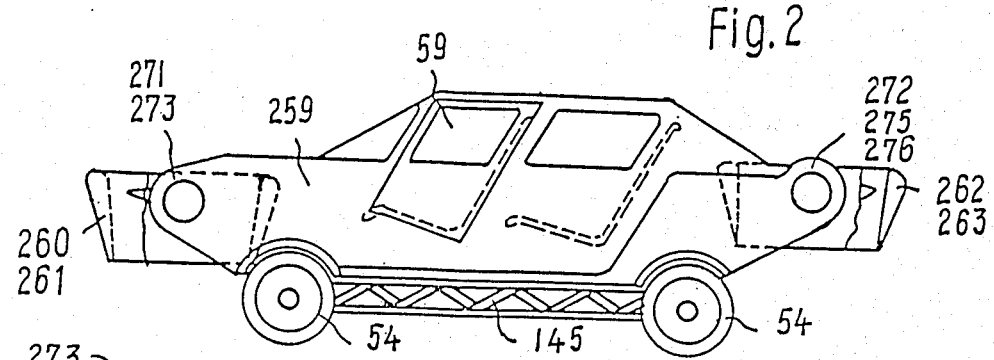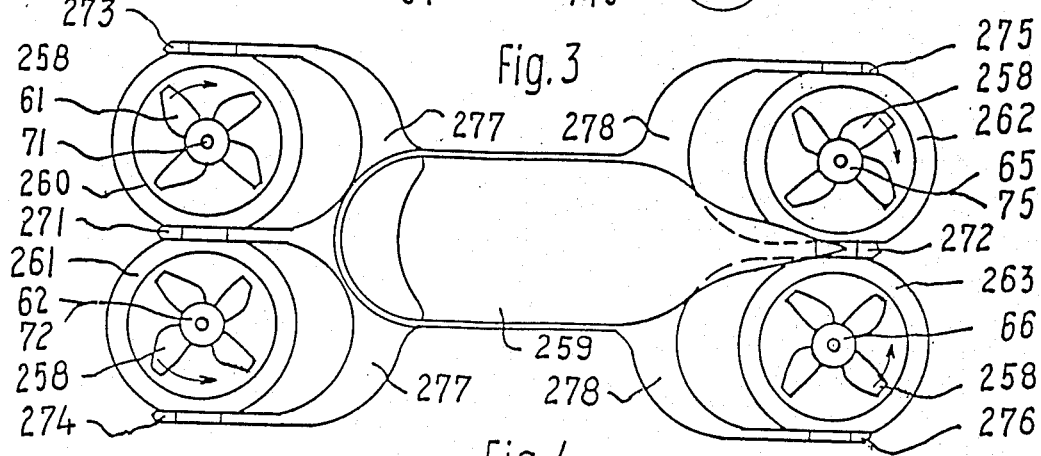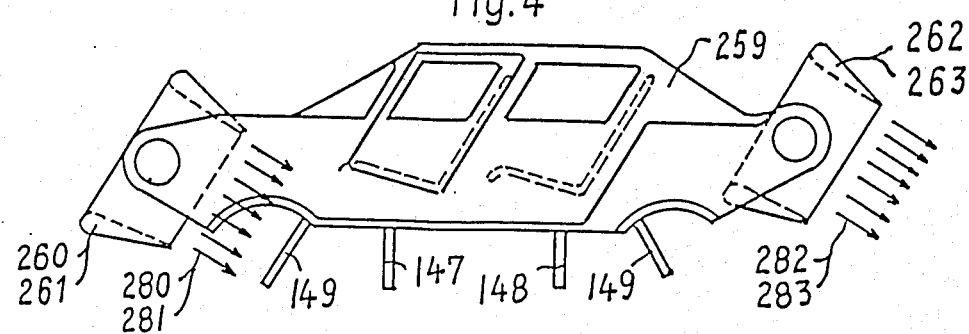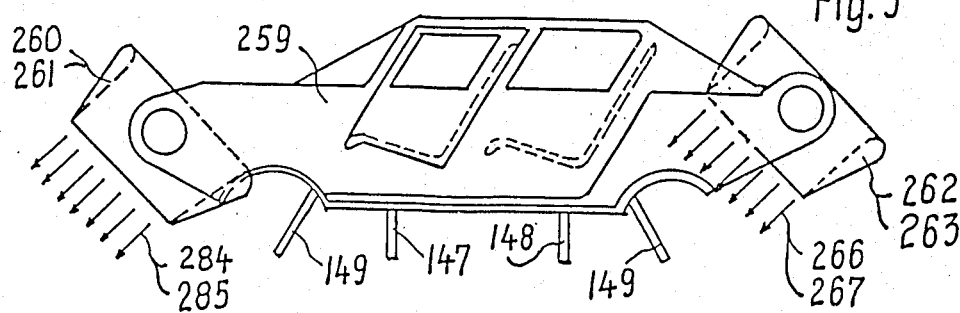

FORMER ART $M_F = D_v \cdot L_{fc} \quad M_r = D_v \cdot L_r \quad M_G = GY \sin \gamma \quad (39)$ $M_{balance} = M_F + M_G - M_r = 0$ $M" = D_v L_{fc} + GY \sin \gamma = D_v \cdot L_r \quad \dfrac{D_v \cdot L_r - D_v \cdot L_{fc}}{GY} = \sin \gamma$ $\sin \gamma = (D_v / GY)(L_r - L_{fc}) \quad (40)$

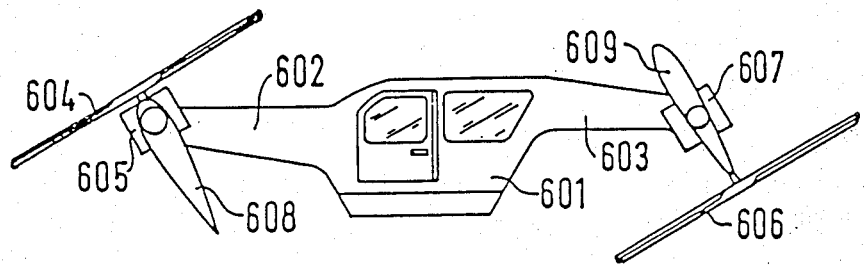
Fig. 15
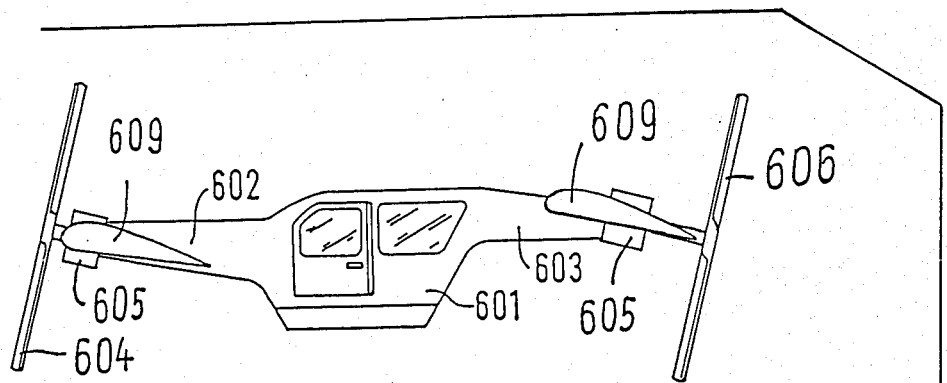
Fig. 16
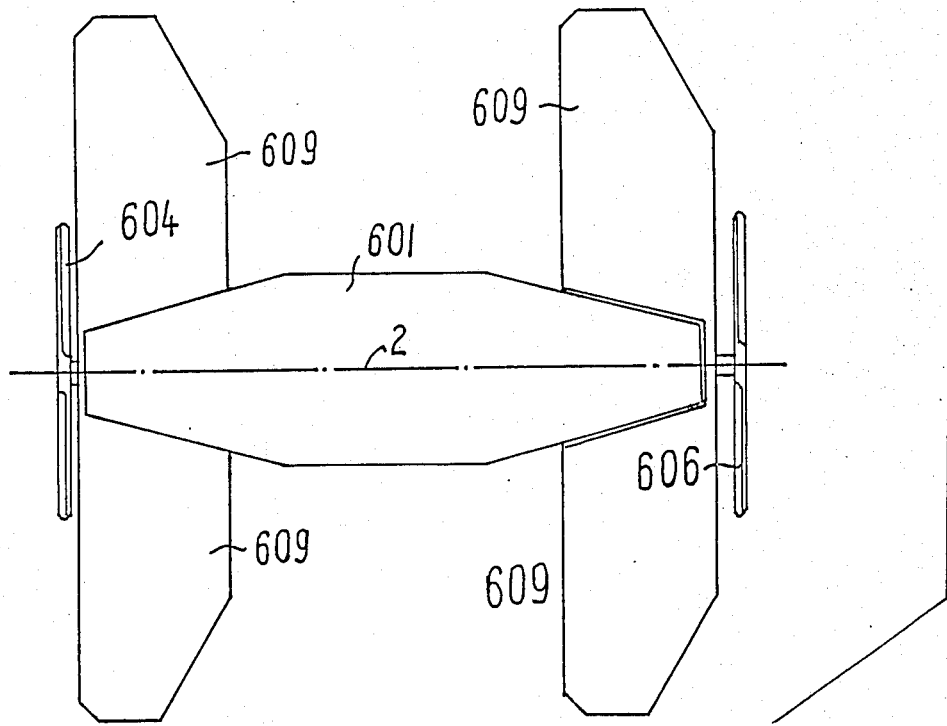

Fig. 29

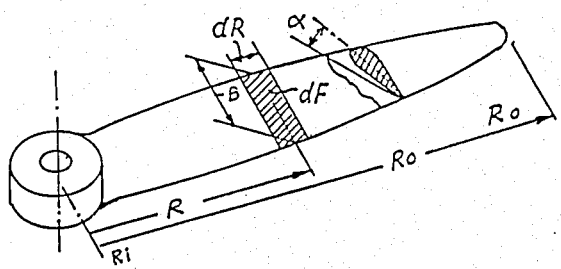

$\omega$ = angular velocity = $1/s$    $n$ = Rpm
$\omega = \pi n / 30$;    $\pi = 3.14 \cdots$
$g$ = density of air ; f.e. $0.125$ $Kgs^2/m^4$ near sea level.
$Ca$ = Coefficient of Lift    $Md$ = Moment = TORQUE
$Cw$ = Coefficient of resistance    Lift = $W(Ca/Cw)$
$W$ = RESISTANCE    $L$ = Lift
$N$ = POWER REQUIRED    $\overline{(\ )}$ = Integral mean values
$K$ = Konstant = $(g/2)Cw$    $F$ = AREA
$W = (g/2)Cw\,F\,V^2 = KFV^2$    $L = (g/2)FCa\,V^2 = W(Ca/Cw)$
$V = 2R\pi n/60 = m/s =$    $V = R\omega$
$E = K\omega^2$    $M = (1/3)E$    $S = (1/4)E$    $T = (1/5)E$

DEVELOPMENT OF THE FORMULAS:

$dV = \omega dR$;    $V = \int \omega dR$    $V = \omega R$    $\overline{V} = \int \omega dR / \Delta R = \frac{1}{2} \omega R^2$ $dW = K\omega^2 dFR^2 = ER^2 dF = ER^2 dB dR$
$W = \int dW = \int ER^2 \overline{B} dR = E\overline{B} \int R^2 dR = E\overline{B}(1/3)(R_2^3 - R_1^3)$ if B is constant, as in TYPE ①

$dMd = K\omega^2 R^3 dF = ER^3 dF = ER^3 dB dR$
$Md = \int dMd = \int ER^3 \overline{B} dR = E\overline{B} \int R^3 dR = E\overline{B}(1/4)(R_2^4 - R_1^4)$ if B is constant For B linear inclined :. ⟨────⟩ J: J introduced. $J = \left(\frac{dQ}{dR}\right)$ TYPE ③: $W = E(q + JR) R^2 dR = Eq\,1/3\,R^3 + EJ\,1/4\,R^4$
$Md = E(q + JR) R^3 dR = Eq\,1/4\,R^4 + EJ\,1/5\,R^5$ TYPE ②: $W = E(Q - JR) R^2 dR = EQ\,1/3\,R^3 - EJ\,1/4\,R^4$
$Md = E(Q - JR) R^3 dR = EQ\,1/4\,R^4 - EJ\,1/5\,R^5$

OR:

TYPE ③:    $W = Mq(R_2^3 - R_1^3) + SJ(R_2^4 - R_1^4)$
$Md = Sq(R_2^4 - R_1^4) + TJ(R_2^5 - R_1^5)$

TYPE ②:    $W = MQ(R_2^3 - R_1^3) - SJ(R_2^4 - R_1^4)$
$Md = SQ(R_2^4 - R_1^4) - TJ(R_2^5 - R_1^5)$

TYPE ⑤: CALCULATE INNER- MEDIAL- AND OUTER-PORTIONS BY ABOVE EQUATIONS. FOR OUTER PORTION USE Q' INSTEAD OF Q.    $Q' = q_2 + J_2 R$    ($R = R_0 abite$)

Fig. 31
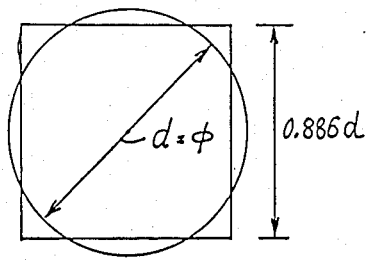
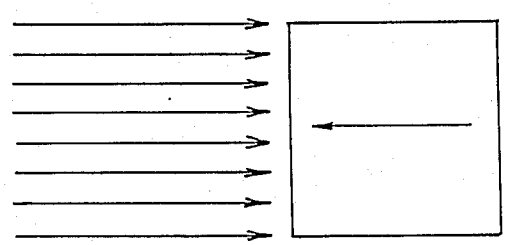
THE CIRCLE EQUIVALENT SQUARE
AREA OF CIRCLE = $d^2 \pi / 4$
SIDE OF EQUIVALENT SQUARE = $\sqrt{d^2 \pi / 4}$
$= d\sqrt{\pi/4} = \frac{d}{2}\sqrt{\pi} = d\frac{1.77245}{2} = 0.88623\, d$
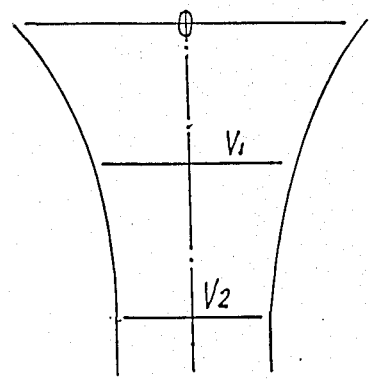
$Vb$ = smallest fuel consumption.
$Vg$ = fuel consumption equal to hovering.
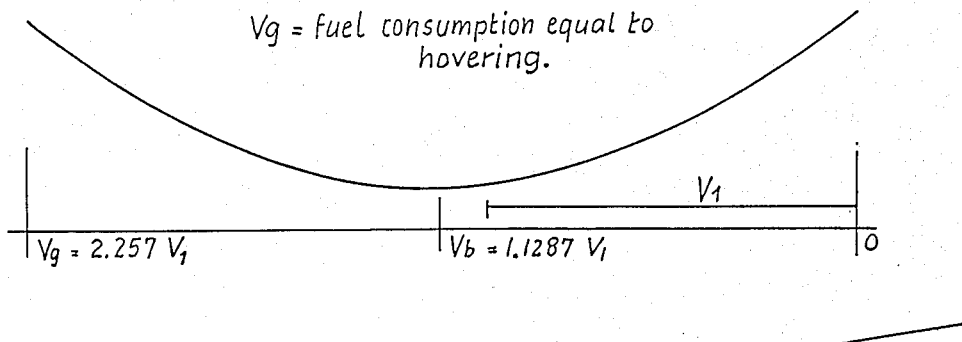
$Vg = 2.257\, V_1$   $Vb = 1.1287\, V_1$

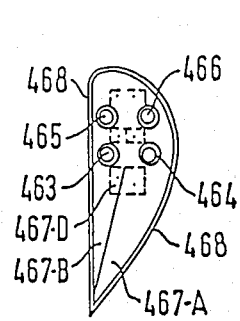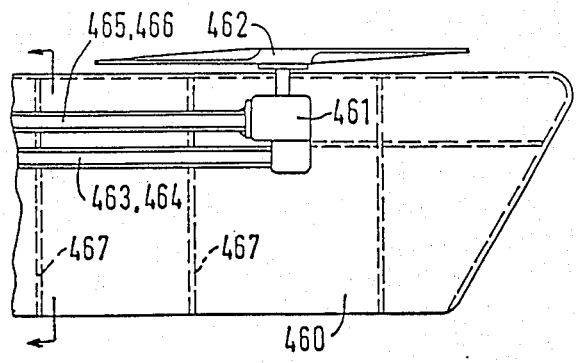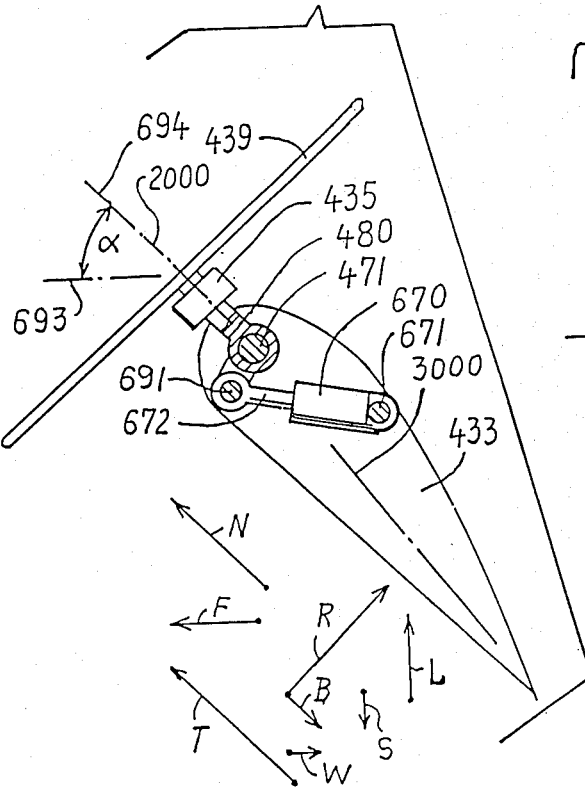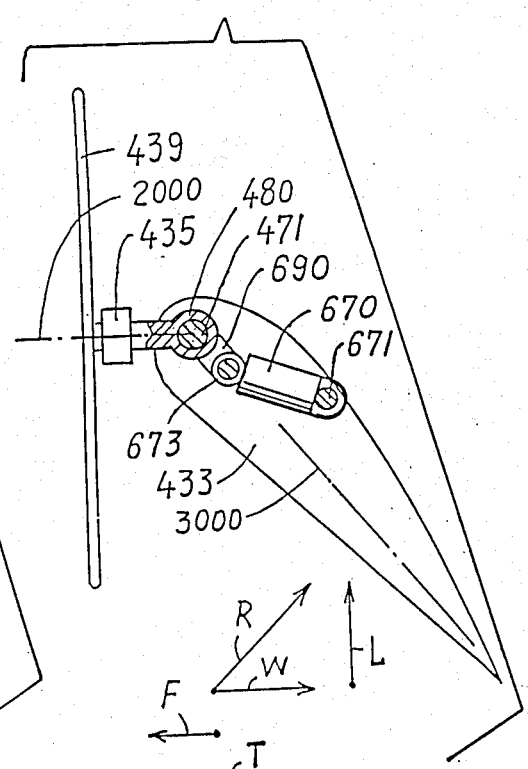

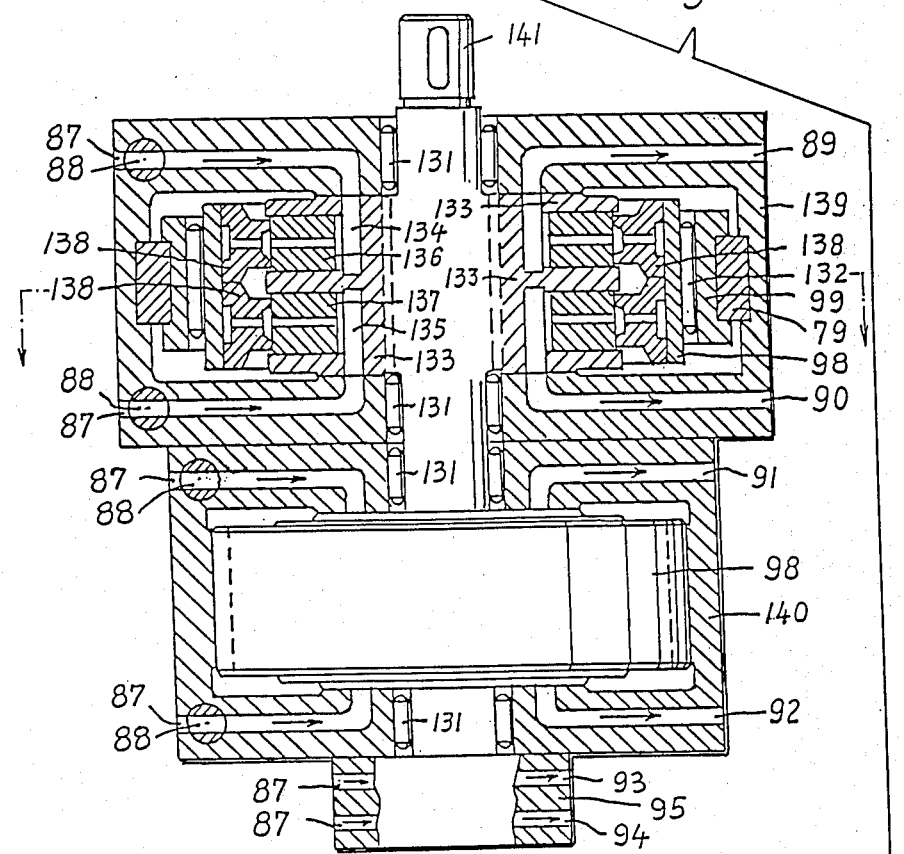
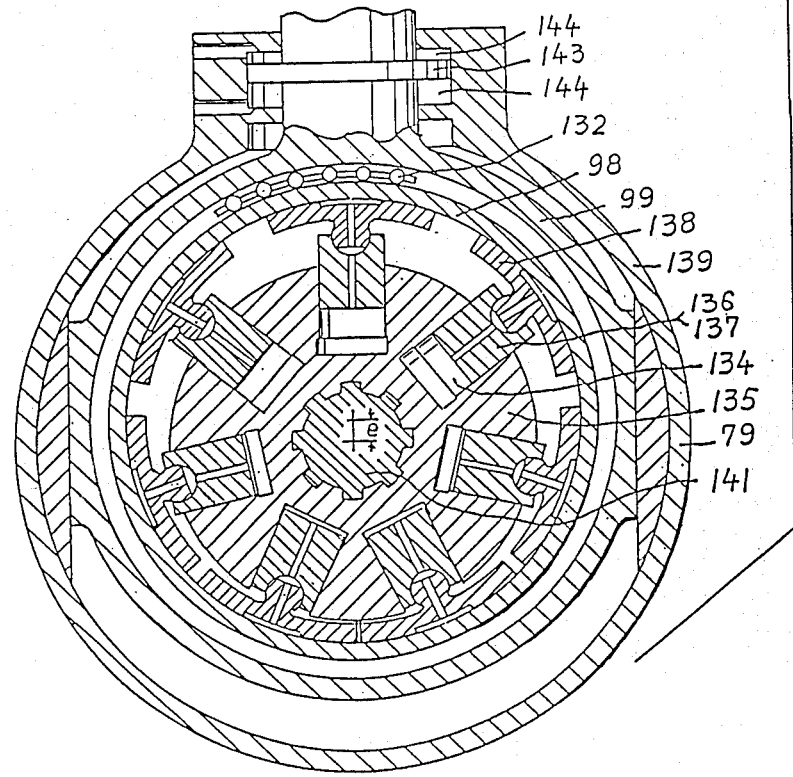
Fig.45

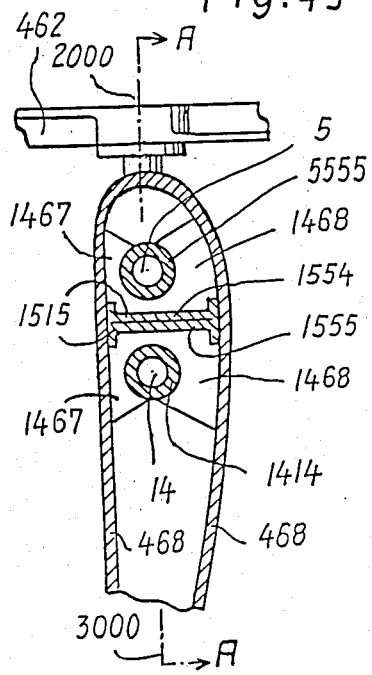
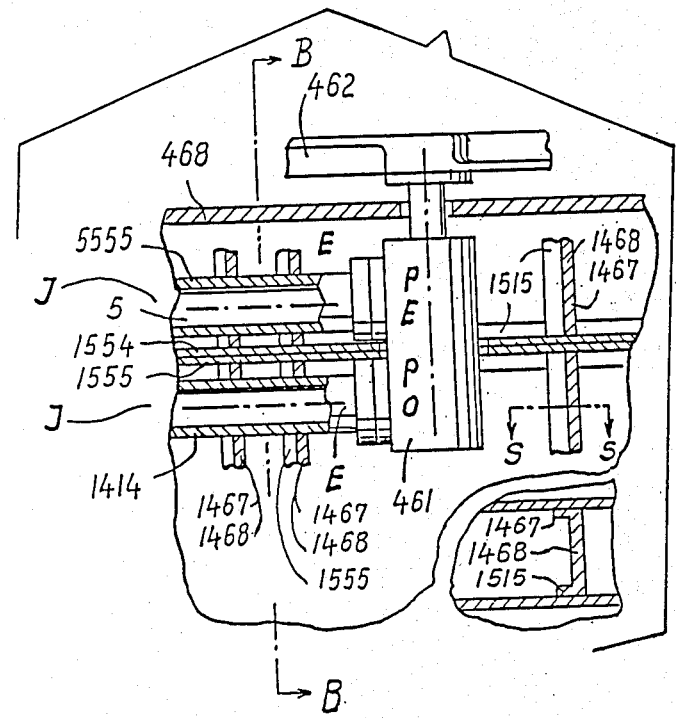
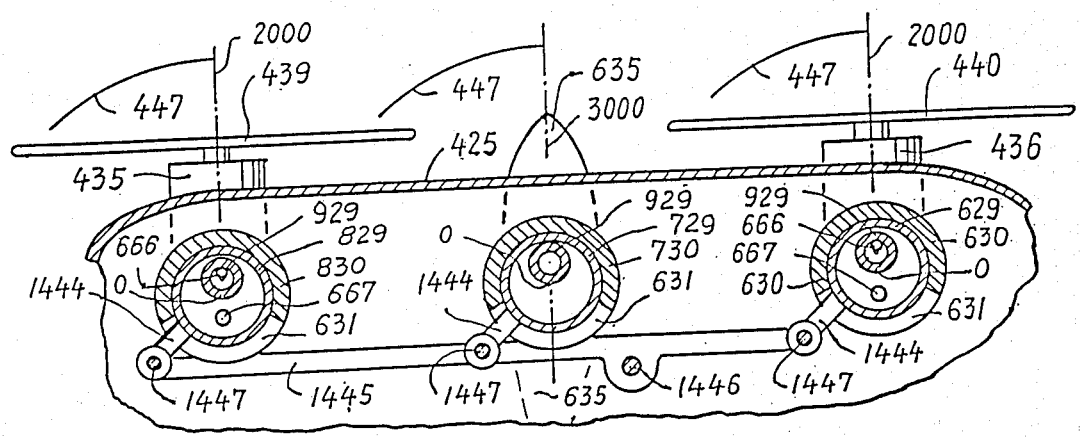

Fig. 52

| $S_H$ | $\gamma$ | $\frac{SH}{\cos\gamma}$ $Sp$ | $Sp\sin\gamma$ $St$ | $\sqrt{\frac{2Sp}{\varsigma F}}$ $V_{2i}$ | $V_{oF}$ | $(V_{oF}\sin\gamma)^2$ $+(V_{2i})^2$ | $\sqrt{dto}$ $V_{2fi}$ | $\frac{V_{2fi}}{2}$ $V_{1fi}$ | $Sp\,V_{1fi}$ $N_{in}$ | $N_{in}$ |
|---|---|---|---|---|---|---|---|---|---|---|
| Kg | ° | Kg | Kg | m/s | m/s | | m/s | m/s | Kgm/s | HP |
| 25 | 2 | 25.02 | .87 | 11.29 | 10 | 128 | 11.32 | 5.66 | 142 | 1.9 |
| " | 4 | 25.06 | 1.74 | 11.30 | " | 128 | 11.32 | 5.66 | 142 | 1.9 |
| " | 8 | 25.24 | 3.45 | 11.34 | " | 131 | 11.42 | 5.71 | 144 | 1.9 |
| " | 12 | 25.55 | 5.20 | 11.41 | " | 151 | 12.29 | 6.14 | 157 | 2 |
| " | 20 | 26.60 | 9.10 | 11.64 | " | 177 | 13.29 | 6.64 | 177 | 2.4 |
| " | 40 | 32.34 | 20.79 | 12.84 | " | 206 | 14.35 | 7.18 | 232 | 3.1 |
| " | 2 | 25.02 | .87 | 11.29 | 25 | 128 | 11.32 | 5.66 | 142 | 1.9 |
| " | 4 | 25.06 | 1.74 | 11.30 | " | 131 | 11.43 | 5.72 | 143 | 1.9 |
| " | 8 | 25.24 | 3.45 | 11.34 | " | 140 | 11.86 | 5.93 | 150 | 2 |
| " | 12 | 25.55 | 5.20 | 11.41 | " | 157 | 12.54 | 6.27 | 160 | 2.1 |
| " | 20 | 26.60 | 9.10 | 11.64 | " | 237 | 15.42 | 7.71 | 205 | 2.7 |
| " | 40 | 32.34 | 20.79 | 12.84 | " | 423 | 20.57 | 10.28 | 332 | 4.3 |
| " | 2 | 25.02 | .87 | 11.29 | 50 | 130 | 11.42 | 5.71 | 143 | 1.9 |
| " | 4 | 25.06 | 1.74 | 11.30 | " | 139 | 11.83 | 5.90 | 148 | 2 |
| " | 8 | 25.24 | 3.45 | 11.34 | " | 177 | 13.30 | 6.65 | 168 | 2.2 |
| " | 12 | 25.55 | 5.20 | 11.41 | " | 238 | 15.45 | 7.72 | 197 | 2.6 |
| " | 20 | 26.60 | 9.10 | 11.64 | " | 457 | 21.38 | 10.69 | 346 | 4.6 |
| " | 40 | 32.34 | 20.79 | 12.84 | " | 1398 | 34.61 | 17.30 | 560 | 7.5 |
| " | 2 | 25.02 | .87 | 11.29 | 100 | 140 | 11.81 | 5.90 | 148 | 2 |
| " | 4 | 25.06 | 1.74 | 11.30 | " | 176 | 13.28 | 6.64 | 166 | 2.2 |
| " | 8 | 25.24 | 3.45 | 11.34 | " | 322 | 17.95 | 8.98 | 227 | 3 |
| " | 12 | 25.55 | 5.20 | 11.41 | " | 562 | 23.72 | 11.86 | 303 | 4 |
| " | 20 | 26.60 | 9.10 | 11.64 | " | 1334 | 36.53 | 18.27 | 486 | 6.5 |
| " | 40 | 32.34 | 20.79 | 12.84 | " | 4296 | 65.54 | 32.77 | 1059 | 14.3 |

Valid for a propeller of 2 meter $\phi$ = 3.14 m² propeller circle area.
$\varsigma$ = 0.125. To obtain values per square meter divide by 3.1416.

AIRBORNE VEHICLE WITH HYDRAULIC DRIVE AND CONTROL

REFERENCE TO RELATED APPLICATIONS

This is a continuation in part application of my at the filing date of this application copending application Ser. No. 06-619,956, filed on June 12, 1984 as a continuation in part application of my application, Ser. No. 425,750, which was filed on Sept. 28, 1982 as a divisional application of my erlier application Ser. No. 121,348, filed on Feb. 14, 1982 which is now abandoned. Application Ser. No. 121,348 was a continuation in part application of my earlier patent application Ser. No. 800,755 which was filed on May 26th, 1977 and which is a divisional application of my earlier patent application Ser. No. 465,413 of Apr. 30th, 1974. Applications Ser. Nos. 800,755 and 465,413 are now abandoned. Application Ser. No. 427,750 is now abandoned.

This is also a continuation in part application of my at the filing date of this application copending application Ser. No. 06-664,262, filed on Oct. 14, 1984, which issues as Pat. No. 4,662,584 on May 05, 1987 and which was filed as a continuation in part application of my still earlier application Ser. No. 330,980, now U.S. Pat. No. 4,496,120, issued on Jan. 29, 1985, filed on Dec. 14, 1981 as a continuation in part of my earlier patent application, Ser. No. 110,157, which was filed on Jan. 7th, 1980, now abandoned, as a continuation in part application of the that time co-pending application, Ser. No. 895,687, filed on Apr. 12, 1978 which is now abandoned. Application Ser. No. 895,687 was a continuation in part application of my earlier application, Ser. No. 760,006, filed on Jan. 17th, 1977. Application Ser. No. 760,006 is now U.S. Pat. No. 4,136,845 and issued on Jan. 30th, 1979.

Application Ser. No. 760,006 was a continuation in part application of my still earlier application Ser. No. 104,676, filed on Mar. 8th, 1971, now U.S. Pat. No. 3,823,898.

Application Ser No. 104,676 itself arrived from earlier applications, which are mentioned in now granted U.S. Pat. No. 3,823,898. The eldest application therein is application Ser. No. 328,395 of Dec. 5th, 1963, now U.S. Pat. No. 3,220,898. Another important application therein is application Ser. No. 551,023 of May 18th, 1966, now abandoned. Priority for the equalness of rates of flow in flows to hydraulic motors which drive propellers is thereby substantiated by application Ser. No. 328,395 of Dec. 5th, 1963 and the priority for the use of such drive to propeller vehicles forward and maintain their straight forward path by equally driven propeller pairs wich one propeller of each pair on another side of the vehicle is obtained by application Ser. No. 551,023 of May 18th, 1966.

This present patent application is also a divisional of my at the filing date of the parental co-pending patent applications, Ser. No. 954,555 which was filed on Oct. 25th, 1978 and of co-pending patent application, Ser. No. 973,780, which was filed on Dec. 27th, 1978 as a continuation in part application of Ser. No. 760,006, now U.S. Pat. No. 4,136,854. Application Ser. No. 954,555 is now U.S. Pat. No. 4,358,073, issued on Nov. 12, 1982.

FIELD AND BACKGROUND OF THE INVENTION

This invention relates to hydraulically driven airborne vehicles with plural propellers of vertical or inclined propeller-axes whereby the craft may take off and land vertically and fly either with inclined axes like a helicopter or also with stiffer inclined axes for high forward speed or even horizontal flight with substantially nearly horizontal propeller axes. This invention deals in particular with a common control of a pair of propellers to assure a clean straight forward flight path of the vehicle without departures from the forward flight path by controlling errors.

DESCRIPTION OF THE PRIOR ART

Hydrostatical drive systems in which power received from a driving engine is transmitted to the rotors of a vehicle through fluid pressure are well-known, for example, from the inventor's prior U.S. Pat. No. 3,457,808. Also well-known is the driving of aircraft by means of hydrostatically driven propellers.

The known aircrafts with static pressure driven propellers may be divided into two groups which are:
(a) part-reliable in operation; and
(b) reliable in operation. In the drive systems of non-reliable aircrafts, the main pressure fluid flow is branched into several flows for driving several propeller motors whereby a communication is established between the motors which, consequently, may rotate at mutually different speeds with the aircraft exposed to the risk of tilting and crashing. If, on the other hand, a series-connection is used, the aircraft cannot be held in a straight and horizontal position while starting or landing. Aircrafts of this type, i.e., with hydrostatic propeller driving systems part-reliable in operation, are known, for example, from U.S. Pat. Nos. 2,212,490; 2,454,138, 2,514,128 and British Pat. No. 364,510. Aircrafts with drive systems which are reliable in operation, on the other hand, use either hydrostatic motors series-connected in the flight direction or motors supplied with separate pressure fluid flows having mutually equal flow rates so that the synchronism of the propellers is assured, a tilting is prevented, and the aircraft is secure. Such aircraft are known, for example, from U.S. Pat. Nos. 3,211,399; 3,245,637; 3,353,806; 3,253,807; 3,260,489; 3,345,016 or 3,614,029.

Partially- or non-reliable aircraft can hardly be used in service, since due to the hydraulic intercommunication between the motors, a synchronous rotation cannot be assured and there is always a risk of crashing as soon as the propeller speeds become substantially different.

It is true that hydrostatically driven non- or only partially reliable aircraft are, in addition, provided with control means which theoretically serve to ensure the security of the flight. In reality, however, such means cannot make the vehicle reliable in a satisfactory manner. That is, a system in which a main fluid flow is branched into several partial flows with the use of flow-volume regulators is controllable, in principle, only through the variation of the cross-sectional areas. If such a system meets with stronger air gusts or the aircraft flies through turbulence, the propellers are unequally loaded, and it becomes practically impossible for the control to react quickly enough. Therefore, even aircraft equipped with such a control but otherwise not reliable, are not safe. Fixed wing aircraft with a plurality of propellers driven by hydrostatic motors which are supplied with partial flows branched off a common fluid flow are not controllable during the starting and landing because, at that time, the controlling surfaces of the aircraft have no sufficient hold and there is no provision in the hydraulic system for controlling the speed of the motors.

As for the driving machines, hydraulic radial-piston motors and pumps are well known in the art. For use in aircraft, however, propeller driving motors comprising a single cylinder block or rotor are not sufficiently reliable because any failure in the rotor or in the respective supply or return circuit or in the hydraulic pump or driving engine stops the propeller. Even if two rotors are provided, which are not independently supplied or cannot be disconnected from each other, a failure in any part of the supply system may have the same disastrous effect. Multiple-flow pumps producing more than two pressure-fluid flows are also known, for example in U.S. Pat. No. 3,270,685. However, in this known construction of a four-flow pump, the working fluid is fed into the rotor and also discharged radially from the inside through ports and passages provided in a control shaft extending through the rotor bore. In themselves, such four-flow machines have proved to be very satisfactory even as hydrostatic high-torque motors. However, the shortcoming of the machines supplied radially from the inside is that the control shaft must have a relatively large diameter so as to be able to receive the four inlet and four outlet fluid passages, or the fluid passages must be so narrow that only a small quantity of fluid can flow therethrough. In the first case, i.e, if a shaft with a large diameter is used, it is disadvantageous that the friction between the shaft and the rotor becomes relatively high and also that the larger diameter of the shaft necessarily leads to a wider fit clearance between the rotor and the shaft and thereby to a considerable leakage, because the leakage losses increase with the third power of the clearance width. In the second case, i.e., if a shaft with a small diameter is used, it is disadvantageous that the fluid flow through the passages is so small that the machine is suited only for very limited performances or its efficiency drops to unbearable values due to too high hydraulic losses. Because of the just-mentioned drawbacks, the known four-flow pumps and motors are incapable of offering efficiencies and performances satisfying the high demands made on four-wheel or four-propeller drives for land vehicles or aircraft and all the less on more powerful drives.

SPECIFIC DISCUSSION OF THE MOST CLOSE FORMER ART

A vehicle with four propellers which are hydraulically driven and which have substantial vertical or inclined propeller-axes is known from my elder U.S. Pat. No. 3,614,029.

In the mentioned vehicle there are four separated flows of fluid which drive the four propellers at equal rotary velocities. In order to incline the vehicle in a desired direction for the obtainment of a movement in the desired direction, the patent uses an additional pump for the provision of a control flow of fluid. The additional—or control—flow of fluid is led by a control means into one of the desired fluid motors to revolve the respective propeller faster than the other propellers are revolving. The known craft thereby obtains a higher lift in one of the propellers whereby the portion of the vehicle which bears the respective propeller is slightly lifted. The vehicle thereby obtains an inclination which in turn inclines the propeller axis in a certain direction. Thereby the vehicle obtains a forward speed in the desired direction. The extent of the size of the control flow defines the angle of inclination of the vehicle and thereby influences its foward speed.

The mentioned patent also provides the possibility of utilization of pluralities of such control flows. Thereby a plurality of propellers can become influenced regarding their rotary velocities.

However, each of the control flows is a separated control flow which is separatedly controlled. There is no combination of control flows and no means in the mentioned patent to combine control flows or to assure an equality of rate of flow in a plurality of additional flows or of control flows.

The control of the flight path and of the stability of the vehicle of the mentioned patent is therefore a delicate matter and depends on the skill of the pilot. This patent of the former art thereby fails to provide means which assure a straight forward flight path, which prevent control accidents of the pilot and it fails to prevent the appearance of unstabilities of the vehicle.

SUMMARY OF THE INVENTION

This invention investigates the features and disadvantages of the former art and provides novel means to overcome the unsafeties and unstabilities of the former art.

In this regard the invention discovered, that the handling of the controls of the vehicle of U.S. Pat. No. 3,614,029 is a delicate task and that is understandable because the vehicle of the said patent was invented during the Vietnam war and should provide the possibility of high acrobatic movements for escape from dangerous places.

In civil flight in peace times the abilities for acrobatic movements are not required and desired is a more easily controllable and stable vehicle.

In addition the invention discovers, that the slightest provision of a control flow to a single propeller of four propellers at forward speed of the vehicle results in an unstability of the vehicle. This, as the invention discovers, occures thereby, that the propeller of four propellers which is most forwardly located in the craft grapses the air easier than the most rear located propeller does. Because the more forwardly located propeller sucks an airstream downward and thins the air whereinto the rear propeller soon will follow. The four propellers are thereby acting in different densities of air and they are providing therefore different lifts at equal propeller speeds and they are consuming different powers at equal propeller speeds, when the vehicle is not stationary in the air, but moving through it substantially horizontally.

The vehicles of the former art do therefore not exactly, what they were supposed to do, but derivate therefrom in a certain extent partially depending on the forward speed of the vehicle.

The vehicle of the former art which are here under discussion, are thereby unstable, when they have plural propellers exceeding two propellers, and the slightest error in control increases the unstability of the vehicle.

The invention has therefore the object, to overcome the described unstability and to provide a combined control of the plural flows of fluid to a forward or rear propeller pair.

It is also an object of the present invention, to improve the economy of air-travel and also to improve the safety of air-travel in aircraft of the invention.

To obtain a better efficiency of travel with best chance of saving fuel for a certain mailage, the invention considers, that there are economic and un-economic speed ranges for each aircraft. The pilot can not see the speed of the craft relatively to the air and therefore, he cannot exactly judge, whether his craft travels in the most fuel saving speed range. Therefore, the invention takes into consideration, what the best speed range is and also considers, that the front propellers are subjected to a different downwards airflow speed through the propellers, than the rear propellers. Since also this matter can not be seen by the pilot, the invention designs the best conditions for front and rear propellers in combination with the best speed range to save fuel. These results of inquiries are used to find the best ratios between the chambers of the pumps and motors and thereby for the speeds of the propellers relatively to each other.

The invention further attempts to improve the safety of the craft and specifically to prevent errors of pilots. For example early in the year of 1982 an aircraft approached Haneda Airport in Tokyo. Shortly before landing, the pilot lost control of his mind and put the aircraft with the passengers therein into a nose-dive, whereupon the aircraft crashed into the water and many persons were killed or injured. Such accident would not have been possible, if the aircraft of the invention would have been used. Because it is one object of the invention to limit the possibilities of ascent and descent to such an extent, that the craft maintains at all times a stable location and capacity to fly smoothly in the air. This is according to the invention easily obtained, by limiting the rate of adjustment of the variable two flows in relation to the non-variable two flows, which drive the motors of the propellers. By this limitation of the rate of flow adjustment device, the pilot loses the possibility to set his craft to too stiff an ascent or descent. Consequently, the aircraft of the invention can not crash, as the aircraft did in early 1982 in the Tokyo bay before Haneda Airport.

The solutions and the technological details which the invention provides to obtain the object of the invention, may for example, be described as follows:

BRIEF DESCRIPTION OF THE EMBODIMENT OF THE INVENTION

A vehicle capable of travel in air includes a body—structure, propellers with substantially upright axes, fluid motors to drive said propellers, a prime mover, a pump means driven by said prime-mover and fluid lines from said pump means to said fluid motors;
  wherein said propellers are symmetrically disposed with respect to a medial portion of said body structure,
  wherein said body structure includes holding means for holding said motors, wherein said motors hold and drive said propellers,
  wherein said fluid lines pass fluid from said pump means to said motors, wherein said motors include at least four rotors,
  wherein said pump means includes at least four separated working chamber groups of pluralities of individual working chambers for the supply of at least four separated flows of fluid out of said pumpe means, wherein each of said fluid lines carries one of said separated flows without communication to the others of said flows from one of said groups to one of said rotors,
  wherein said groups include at least two fixed chamber groups of fixed displacment and said fixed chamber groups supply fixed flows of relatively to each other equal rates of flow of fluid to drive some rotors of said motors with a fixed rotary velocity,
  wherein said groups include at least two variable chamber groups of variable displacement and said variable chamber groups supply variable flows of relatively to each other equal rates of flow of fluid to drive some other rotors of said motors with a variable rotary velocity,
  wherein said variable chamber groups have a variable single common displacement actuator means for the maintenance of the equalness of said rate of flow of fluid of said variable flows,
  wherein said propellers are four propellers and said motors are four motors, wherein said propellers and said motors form fluid-motor-driven propeller pairs,
  wherein said body structure is substantially symmetrically disposed about a medial longitudinal plane of said vehicle, wherein said vehicle has a front portion and a rear portion, wherein one of said propeller pairs is located in said front portion
and an other of said propeller pairs is located in said rear portion, wherein the motors and propellers of said propeller pairs are symmetrically disposed with respect to said medial plane, wherein each of said motors includes one fluid receiving rotor, wherein said fixed flows are directed to one of said pairs to create thereby a fixed—velocity propeller—pair of propellers with equal but opposite velocity, wherein said variable flows are directed to said other pair of said pairs of propellers to create thereby a variable pair of oppositionally revolving propellers of equal but opposite rotary velocity, wherein said actuator means of said variable chamber group defines the difference of rotary velocity of one of said propeller pairs relatively to the other pair of said propeller pairs and wherein said variable pair of propellers is utilized by said variable common actuator means to stably define by said single variable actuator means the difference of rotary velocity of said one propeller pair relatively to said other propeller pair in order to thereby define the inclination and flight-speed of said vehicle in the direction of flight of said vehicle.

With above structure and provisions the invention obtains its object fully and it overcomes perfectly the unstability of the craft of the former art. Because the respective propeller pair is now controlled in unison, the longitudinal, vertical, medial plane of the vehicle is exactly kept in the direction of movement, unequal actions, suctions and powers of propellers of equal pairs are prevented and in addition the requirement of bypass-valves or of additiional control flows is spared. The vehicle of the invention has thereby become stable and less expensive, but more easy controllable in flight and more safe in operation.

REPETITION OF THE SUMMARY OF THE GRAND—GRAND PARENTAL APPLICATION

In accordance with the invention, the mentioned drawbacks of the prior art are avoided, and an air-land-water vehicle is provided having a drive system which is most reliable in operation and service and practically eliminates any danger for the crew which could arise from a failure of the propelling means.

The present invention concerns only the group of vehicles indicated above as reliable in operation, that is, vehicles having hydraulically driven propellers and a hydraulic system providing either a series-connection of several hydraulic motors in a single fluid flow or a parallel connection of several hydraulic motors connected in individual fluid-flows entirely separated from each other and having flow rates which are mutually equal or in a fixed porportion, the purpose in both cases being to synchronize the rotational speed of the propellers.

In such vehicles, particularly aircraft which are supported in the air by rotor blades or enclosed propellers, the invention permits control of the horizontal displacement in respect to the vertical motion by providing means for varying, within a very small range, the speed of the propellers mounted ahead in the travel direction as compared to the speed of the propellers mounted in the rear. For example, the hydraulic motor or motors driving the propellers mounted ahead are provided with a slightly larger volumetric fluid consumption capacity relative to the motors driving the propellers behind. Another provision, in accordance with the invention, is to increase the operational security by providing hydraulic motors comprising two or even more rotors driving a common shaft and coupled thereto in only one direction of rotation, the rotors being independently supplied by separate pressure-fluid flows. This means that the shafts driving the propellers continue to operate even if one of the pressure fluid flows is interrupted or one of the rotors gets hot or jammed. Consequently, vehicles thus equipped may start and land reliably even upon failure of one of the rotors or one of the supply or return lines. Their reliability is such that they can be flown even by inexperienced pilots, especially when the equipment includes a radar control of the aircraft inclination and when designed as air-land vehicles in the form of an automobile, can also take the air out from the traffic on a highway or securely touch down into such highway traffic.

In a first embodiment of the invention, the vehicle is equipped with two rotor blades or propellers mounted on vertical shafts and disposed one behind the other in the travel direction. The shafts are driven by hydraulic motors which are connected in two entirely separate parallel pressure fluid flows, and the delivery-to-capacity ratio between the fluid pressure producing pump and the motors is different for the motor mounted ahead and the motor mounted in the rear. This difference is, of course, limited to an extent permitting a small inclination of the vehicle in the forward direction but preventing an inclination beyond an acceptable value. A stable flight position is thereby assured in all circumstances and the aircraft cannot crash.

In another embodiment of the invention, two propellers are mounted ahead and two in the rear in the travel direction, and four separate parallel fluid flows are provided to drive the hydraulic motors of which the two ahead have a mutually equal delivery-to-capacity ratio and the two in the rear have a slightly different but also mutually equal delivery-to-capacity ratio, the small difference between the two ratios determining the inclination of the vehicle to the horizontal plane.

According to another embodiment of the invention, means are provided permitting the adjustment within a small range, the capacity of the hydraulic motors, those ahead or those in the rear, or to similarly adjust the effective volume of the respective one of the delivery chamber groups, i.e., cylinder groups of the fluid-pressure producing pump. Thereby, the speed of one half of the propellers can be varied within a small but sufficient range relative to the unchanged speed of the other propellers so that the inclination and the desired forward motion of the vehicle may be controlled. At the same time, a security is given by the limitation of the variation range so that should the pilot make an operational mistake, the inclination cannot become excessive, and the aircraft cannot tilt.

In another embodiment of the invention, the speed difference between the propellers ahead and the propellers in the rear is obtain analogously by adjusting slightly smaller effective volumes of the cylinder groups associated with the motors ahead and located in the respective driving pump as compared to the delivery volumes of the cylinders associated with the motors behind, while the capacities of all of the hydraulic motors remain mutually equal.

According to another embodiment of the invention, one or more hydraulic pumps are directly driven, at mutually equal speeds, by a common driving engine, such as an internal combustion engine, as gas turbine or the like, and comprise a total of at least four groups of cylinders which groups are completely separated from one another and wherefrom four corresponding groups of cylinders in the propeller driving hydraulic motors are supplied with four separate pressure-fluid flows through uninterrupted fluid conduits. All of the hydraulic motors are thereby forced to operate at the desired same speed because, together with the conduits, the respective motor cylinders, for example, increasing their volumes in a certain operational phase, and the pump chambers, for example, decreasing their volumes at that time, form a self-contained closed space permitting no fluid escape. Consequently, any inwardly directed stroke of a piston in the pump necessarily produces an outwardly directed stroke of a piston in the motor and any angular motion in the pump is forcibly accompanied by a corresponding angular motion in the motor or, more accurately, by a corresponding angular motion of at least four motors since the system comprises four groups of cylinders.

Still another embodiment of the invention is provided in which all four cylinder groups are united in a reliably operating four-flow pump enclosed in a common casing, and a common reaction ring is provided for all of the pistons of the four groups of cylinders so that during the rotation of the pump rotor, parallel strokes, i.e., equal or proportional strokes, are produced in all of the cylinder groups resulting in a proportional or synchronous rotation of the at least four hydraulic motors which are connected in the four separate fluid flows furnished by the pump.

In order to obtain a fail-safe operation and to eliminate any danger of danger of crashing, another embodiment of the invention provides an individual driving of all propellers by hydrostatic motors, each comprising two uni-directionally free-wheeling rotors. Such a motor has the advantage, that in case of failure of one of the rotors due, for example, to a fracture or jamming, the stopped rotor is automatically disengaged from the shaft and the other rotor continues to drive the shaft and the propeller. Thus, the propeller cannot stop rotating and the aircraft can securely continue its flight or land. Another feature closely connected to this embodiment is that both rotors in such a motor are mounted in separate pressure-fluid flows which are connected in parallel and whose rates of flow are mutually equal. In such a connection, in case of failure of one of the rotors, the speed of the propeller is not affected either. To assure the highest reliability in operation and to secure the vehicle against any accident, the parallel and separate pressure fluid flows, supplied to the two rotors of the hydraulic motor, are furnished by multiple pressure-fluid producing means, such as multiple-flow pumps, which are individually driven by separate driving engines, such as internal-combustion engines, gas turbines, or the like. Owing to this arrangement, one rotor is still driven even if a pump is destroyed by fracture pieces getting into the hydraulic circuit of the wrecked rotor or if the second driving engine fails. It is possible to provide manually or automatically operated switch valves by which the pressure fluid flow supplying the faulty rotor is, in addition, directed to the running rotor. Thus, the full power of all of the still working driving engines can be used for driving the propellers.

Another feature of the invention is the improved operational reliability and efficiency of the multiple-flow pump obtained by providing pressure inserts at the two axial ends of the pump, and the provision of a shaft passing through the whole housing of the pump and permitting mounting on the shaft of auxiliary pumps, for example, a priming pump, a control pump, etc.

A major part of the invention relates to embodiments of a road-air vehicle capable of being admitted both as an automobile on the highways and as an aircraft. It is adapted to start from among the traffic on a highway and to go down again in the same manner. This means that conditions are to be met which up to date have not been complied with by any of the known vehicles. For example, a road vehicle must not be substantially wider than 2.50 meters to be allowed on the road. In addition, the vehicle must be able to travel as fast or as slow as the other vehicles on the road. Also, it must not have unprotected propellers which could injure persons or damage other vehicles and, finally, it must be able to move, accelerate, and brake in the air at the same speed as the vehicles on the road in order to be capable of alighting safely between two vehicles running on the highway. In consequence, one of the embodiments of the present invention is intended to comply with all of the foregoing requirements. In this embodiment, at least one shrouded propeller in vertical or inclined position is mounted in front of the pilot's cabin and a corresponding propeller is mounted in the rear. The outer diameter of the shrouds is smaller than the admissible width of the road vehicle. It is preferable, according to another embodiment of the invention, to provide two shrouded propellers in front of the pilot's cabin and two behind the cabin. The propellers are driven by speed-synchronized hydraulic motors of the reliable construction mentioned above. Because small propellers require a very high power supply for lifting a loaded vehicle into the air, the inventive embodiment provides two or four shrouded propellers for cases where a high fuel consumption is acceptable. Another embodiment, in accordance with the invention, which includes four shrouded propellers in front of the pilot's cabin and four propellers behind the pilot's cabin is intended for an economical design using a reduced driving power, and provides a vehicle of the size of today's heavy automobiles. Thereby, with such an arrangement, a larger mass of air is driven through the air ducts in which the propellers are mounted and, consequently, the lifting force per HP increases and the vehicle operates very economically.

In still another embodiment of the invention, the propellers are mounted in obliquely positioned shrouds of a particular shape so that at high speed in the air, the shrouds act as lifting surfaces. In a further embodiment of the invention, the shrouds, the propellers and the driving hydraulic motors are pivotally mounted so that the thrust angle may be varied and the vehicle may also be efficiently braked in the air. Still another embodiment of the invention provides a substructure carrying the heavy parts of the driving mechanism and adapted to be lowered and retracted automatically in order to permit a displacement of the center of gravity and thereby improve the stability of the vehicle in the air. Other embodiments deal with actuating and controlling means.

Accordingly, it is an object of the invention to provide a vehicle capable of traveling in the air, on land or on water surfaces, equipped with at least two propellers on vertical shafts which are driven by rotary hydraulic motors, the security of operation being ensured by providing at least two rotors in each of the hydraulic motors, each rotor being driven individually by a completely separate hydraulic fluid flow produced in a hydraulic pump having its own driving engine, the hydraulic circuits being connected crosswise so that the different rotors of one motor are driven by different pumps, the speed of some of the propellers being adjustable and possibly switch valves being provided for interconnecting the individual circuits.

Another object of the invention is to provide in an air-borne craft a rotary pressure fluid operated motor of the radial piston type, reliable in operation, comprising at least two rotors on a common shaft, each rotor being driven by a separate fluid flow and connected to the shaft by means of a coupling of the frictional ratched-wheel shaft type permitting the shaft, in case of any failure in the drive train of one rotor, to still be rotated by another rotor while being decoupled from the faulty one, and additional end-thrust bearings being provided for supporting the rotors axially.

Another object of the invention is to provide a pressure fluid operated machine of the radial-piston type in which, for reasons of constructional advantages and mounting facilities, the inlet and outlet fluid connections are provided on the radially outer periphery of the machine.

Another object of the invention is to provide a vehicle capable of traveling both in the air and on highways, of the design of an automobile, equipped with a plurality, preferably eight, propellers mounted in air ducts provided within the vehicle body and oriented obliquely upwardly in the travel direction, the propellers being driven individually by reliable rotary hydraulic motors each comprising at least two rotors, the different rotors in one motor being driven by fluid flows individually produced in different pumps, the vehicle being steered by rudder, elevator, and yaw stabilizing means, and a lowerable substructure being provided for stabilizing the vehicle in the air on which the heavy parts of the machinery may be located.

Another object of the invention is to provide an airborne vehicle capable of landing on the ground or on water surfaces, equipped with four propellers on vertical shafts individually driven by reliable rotary hydraulic motors, in which the motors are supported on four arms constituted by the hydraulic conduits and the speed of two of the propellers may be varied by means of flow volume regulators mounted in hydraulic conduits bypassing the respective motors.

Another object of the invention is to provide a rotary pressure fluid operated pump of the radial-piston type producing four separate, mutually equal fluid flows of which two are adjustable as to the rate of flow, comprising, two rotors on a common shaft each formed with two separate groups of cylinders and means for adjusting either the eccentricity of the reaction ring of one of the rotors or the flow volume in the inlet fluid passages.

Another object of the invention is to provide a vehicle capable of traveling both in the air and on highways, designed as an automobile, equipped with four or eight propellers driven individually by reliable rotary hydraulic motors each comprising two rotors connected in separate hydraulic circuits supplied from different pumps, the motors and propellers being placed in shrouds which are pivotally mounted in trifurcate extensions of the vehicle body and angularly adjustable within a range of 360° in the travel direction, a simultaneous adjustment of the angular position of the shrouds being effected by means of bar connections, the horizontal steering being effected by means of a rudder, and a lowerable and retractable sub-structure being provided for stabilizing the vehicle in the air and to facilitate its landing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 2 shows another vehicle of the invention, shown from the side.

FIG. 3 shows the vehicle of FIG. 2 seen from above.

FIG. 4 shows a portion of the vehicle of FIG. 2 at drive.

FIG. 5 shows a portion of the vehicle of FIG. 2 at braking.

FIG. 15 shows another vehicle of the invention, seen from the side.

FIG. 16 shows still another vehicle seen from top and from the side.

FIG. 29 brings the development of the calculation formulas of the invention.

FIG. 31 is a schematic of the analysis of the invention.

FIG. 40 is a view from above and partially sectionally through an aircraft wing containing fluid lines and an hydraulic motor.

FIG. 41 is a cross-sectional view through FIG. 40, taken along the line XI—XI of FIG. 40.

FIG. 45 is a longitudinal view with a cross-sectional view through another another embodiment of a multi-flow pump of one of my inventions.

FIG. 46 is a sectional view through a wing section with a propeller seen in a first angle of relative inclination.

FIG. 47 is a view as in FIG. 46, however, with the propeller seen in a second angle of inclination.

FIG. 48 is a sectional view through a portion of FIG. 49 seen along the arrowed line A—A of FIG. 49 and illustrates a wing arrangement.

FIG. 49 is a sectional view through FIG. 48 along the arrowed line B—B of FIG. 48.

FIG. 50 is a longitudinal vertical sectional view through a portion of a vehicle which is capable of travel in air.

FIG. 52 is a calculation table.

DESCRIPTION OF THE PREFERRED EMBODIMENTS

Figure 1:
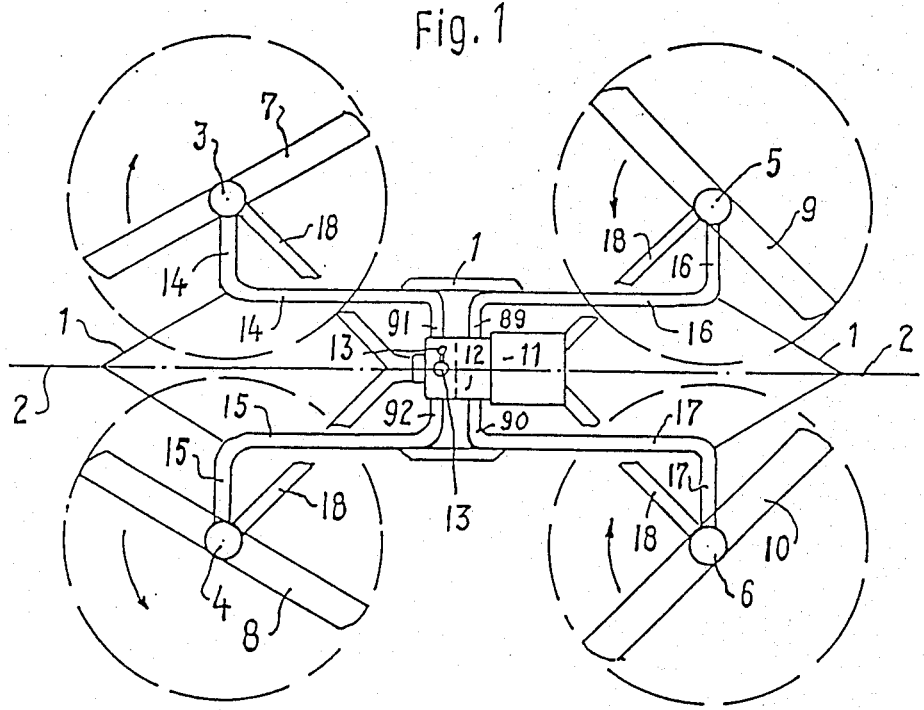
FIG. 1 is a view from top or from above onto a vehicle of the invention.

FIG. 1 shows the preferred embodiment of the vehicle of the invention, shown in a view from above.

The body 1 of the vehicle has a longitudinal, vertical, imagined medial plane 2. Two front propellers 7 and 8 are symmetrically oppositely arranged of the medial plane 2 of the vehicle in the front portion of the vehicle and these two propellers are forming together a first propeller pair or the front-propeller pair. Two further propellers 9 and 10 are arranged symmetrically oppositely of the medial plane 2 in the rear portion of the vehicle and they are forming a second propeller pair or the rear propeller pair.

The propeller of the front propeller pair are driven by hydraulic positive displacement fluid motors 3 and 4, while the rear propellers are driven by the hydraulic fluid motors 5 and 6.

Body 1, which may partially be formed by the inclusion of the fluid lines to and from the fluid motors, carries a power supply source 11,12. The propellers and their driving motors may be provided relatively high in the vehicle, while the power supply source and/or the cabine may be provided in a lower portion of the vehicle, whereby the propellers may form lift-centers above gravity-center of the weightier portions of the vehicle in order to hold the vehicle upright under the actions of the mentionend centres in the air.

The power supply source consists of a power plant 11, which drives a hydraulic power supply pump means 12. It is preferred in accordance with the invention, that as the hydraulic pump means 12, the pump of FIGS. 8 and 9 should be used.

Figure 8:
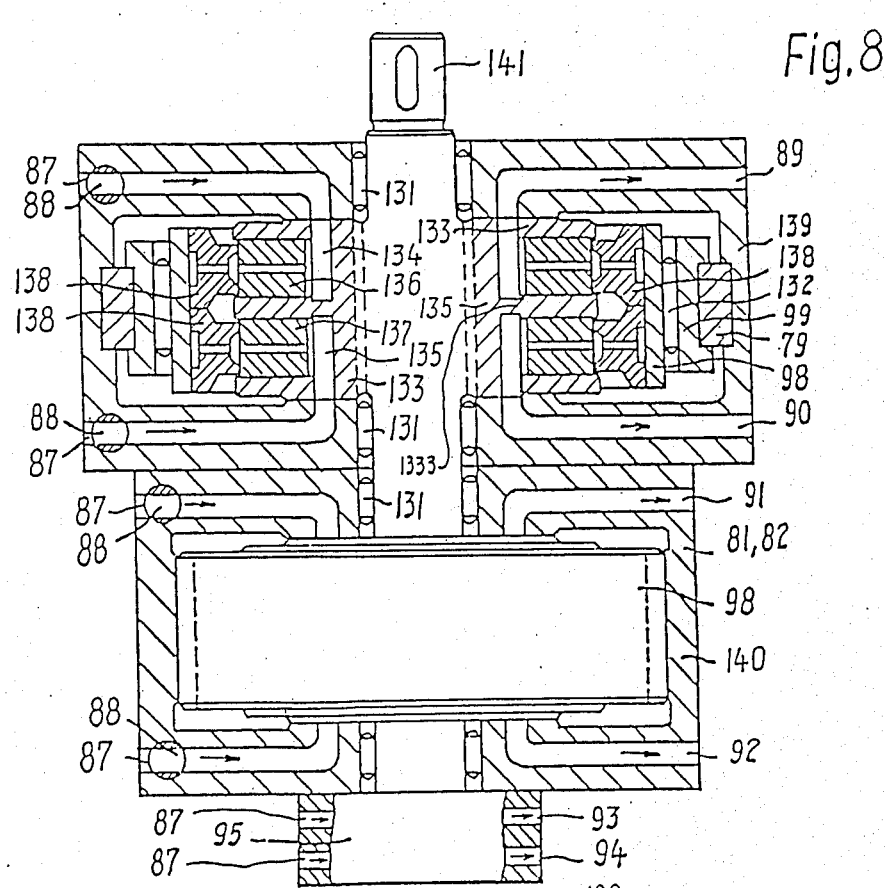
FIG. 8 shows a pump means of the vehicle in a longitudinal sectional view.
Figure 9:
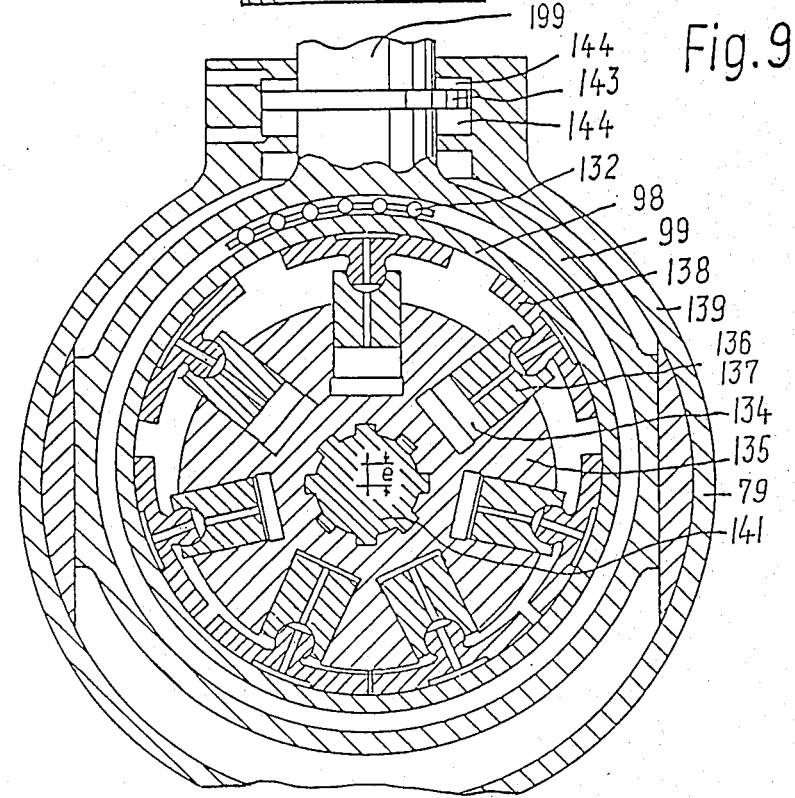
FIG. 9 is a cross sectional view through FIG. 8 along the line IX—IX.

Thus, the pump of FIGS. 8 and 9, represented by referential tial 12 in FIG. 1, has a control means 13, which controls the eccentricity adjustment of the common actuator 99 of FIGS. 8 and 9 as well as 98 of FIGS. 8 and 9. The common controller 13 thereby defines the control of the rate of flow of fluid out of two of the delivery ports of the pump 12, whereby in accordance with FIGS. 8 and 9 the rate of flow of fluid in these outputs is at all times equal relatively to each other.

The pump 12 of FIG. 1 has the outlets 89 to 92 of the pump of FIGS. 8 and 9, as seen in FIG. 1.

As will be seen from the detailed description of FIGS. 8 and 9, the pump delivers through outlets 89 and 90 two separated flows of fluid of equal rate of flow, which are equal per revolution of the pump at all times and which are non-variable.

The pump 12 further delivers two other separated flows of fluid out of outlets 91 and 92, which are also of equal rate of flow relatively to each other, but which are variable at least in a limited extent per revolution of the pump 12. How this variability at maintenance of equality of the rate of flow out of the outlets 91 and 92 is technologically accomplished and maintained is explained at the description of FIGS. 4 and 5.

Fluid line 14 extends from outlet 91 to the entrance of motor 3. Fluid line 15 extends from the outlet 92 to the entrance of motor 4. Fluid line 16 extends from the outlet 89 to the entrance of motor 5 and fluid line 17 extends from the outlet 90 to the entrance of motor 6. Return fluid lines 18 are provided to return the low pressure fluid from the outlets of the motors directly or indirectly via a tank to the inlets of the pump 12. The inlets of the pump 12 are shown in detail in FIG. 8 or 9. The fluid lines described here, may form a portion of the structure or body of the vehicle and they may be incorporated in the means to hold and carry the motors and the propellers.

The motors may be fluid motors of suitable power and of low weight, for example, those of my patents which are mentioned in patents which have come out of offsprings of the parental or grand parental patent application or any other low-weight suitable hydraulic motors.

The invention thus provides a vehicle, wherein the first propeller pair is driven by relatively to each other equal flows of fluid, while the other propeller pair is driven by a variable fluid flow pair, wherein the rates of flow are also equal relatively to each other. The propellers of each propeller pair are thereby driven at equal rotary velocities. The propellers of the other propeller pair are also driven at equal rotary velocities relatively to each other, but the rotary velocities of one of the propeller pairs are non-variable, while the rotary velocities of the other propeller pair are variable in a limited extent.

The common controller 13 holds or varies the rate of flow out of outlets 91 and 92. Controller 13 controls the eccentricity of control ring 99 of FIG. 9 and is directly associated to control-portion 199 of FIG. 9. When controller 13 varies the rates of flow out of outlets 91 and 92, such variation can be done only equally relative to the outlets 91 and 92. There is no probability whatsoever to adjust the rates of flow out of outlets 91 and 92 differently, as the structure of the pump in FIGS. 8 and 9 shows in detail. Thus, there is no possibility for error by the pilot. Whatever he does, the rate of flow of fluid in outlets 91 and 92 remains equal relatively to each other.

Controller 13 is used to increase or decrease the rate of flow of fluid in outlets 91 and 92 and thereby to increase or decrease the rotary velocities of one of the propeller pairs. Since in FIG. 1 the outlets 91 and 92 are communicated to motors and propellers 3,4,7,8 the front propeller pair 7,8 has variable rotary velocities, while the rear propeller pair 9,10 has non-variable rotary velocities at a given speed of the engine and pump 11,12.

The controller 13 thereby provides the control of the rotary velocities of the front propeller pair in relation to the rotary velocities of the rear propeller pair and thereby the inclination of the vehicle in the direction of the flight path along the medial plane 2 of the vehicle. Because a change of the rotary velocities of one of the propeller pairs results in a higher or lower lift of the respective propeller pair and thereby in an inclination of the vehicle in a direction along or parallel to the medial imaginary plane 2 of the vehicle.

The feature of the invention is, that the individual propellers of the variable propeller pair can not be varified and can not escape the variation of the rotary velocities of the respective propeller pair in unison. Thus, the inclination of the vehicle over a single one of the propellers is effectively prevented. The vehicle can incline exclusively symmetrically to its longitudinal medial plane 2 and thereby only forward or backward, but never sideward or under any direction between londitudinal and sideward.

The arrows in the Figure give proposals for the rotary direction of the propellers. The restriction of the variability to a limited extent is preferred in order to prevent too stiff an inclination of the vehicle by the pilots error.

Figure 10:
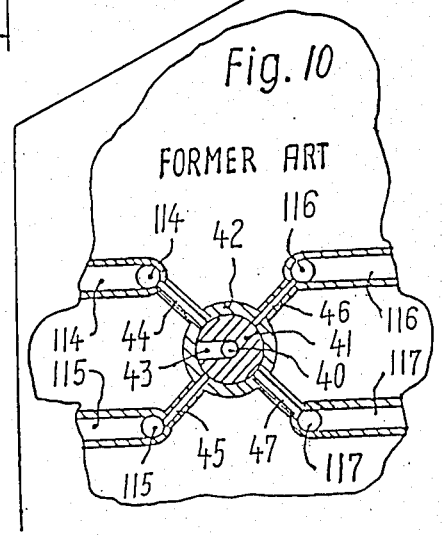
FIG. 10 shows in a schematic the characteristics of a patent of the former art.

The schematic of FIG. 10 shows in detail the control means of the most closely related former art of my patent 3,614,029. In said patent the four flows 114 to 117 which are supplied by a respective pump means have equal rates of flow relatively to each other. The mentioned patent provides an additional flow or control flow 40 out of a separated additional control flow pump. A control means is associated to the separated main flows and to the control flow, which is also called an additional flow. The FIG. 10 demonstrates this system in a schematic in a view from above in an elarged scale relatively to the mentioned patent of the former art. When the system of the former art would be provided in FIG. 1 of the invention, flow 114 would replace fluid line 14, flow 115 would replace fluid 15, flow 116 would replace fluid line 16 and fluid line 117 would replace fluid line 17 of FIG. 1 of the invention. The vehicle of FIG. 1 would then be able to fly vertically, which means, that it would be able to ascent and to descent. But it would not be able to fly forward.

The control flow 40 of the former art would then be utilized to flow through the controller 41 in housing 42. Through control port 43 the flow 40 would be directed to one of the propellers to incline the vehicle by increase of rotary velocity in one of the propellers. The control flow 40 might be directed by control port 43 selectively to either one of the medial passages 44 to 47 into either one of the flows 114 to 117.

The mentioned former art spoke of the possibility of the provision of plural control flows, but they all were, when applied, single flows with singular controls. There was no combination of plural control—flows and no provision or suggestion in the former art to utilize a pair of flows or of control flows with a common variator for equalness of variation of rates of flow in plural flows. When port 43 would have been widened, to meet a pair of medial fluid lines and of main fluid lines, which was not done in the patent, the port 43 would have provided an additional or control flow to a plurality of propellers or to a propeller pair. But the formar art failed to do so and when it would have done so, there would have been no guarantee for equal division of the control flow 40 through port 43 into equal control flow portions to main fluid lines 114 and 115 or like. Thus, the former art failed to assure an equalness of variation of the rates of flow in a propeller pair.

The vehicle of the former art with the means of FIG. 10 was thereby very handy for acrobatics and provided the possibility of quick directional changes of the fligh path of the vehicle. But it is very delicate in control and it is almost impossible for a pilot to utilize the control of the mentioned former art for the obtainment or maintenance of a straight forward flight path of the vehicle.

The present invention further discovered, that unfortunately there is an appearance at flight of four-propeller vehicles, which obviously was never recognized by the mentioned patents of the former art.

This is, that, when the vehicle flies like a helicopter, the front propellers are suctioning the air easier than the rar propellers. They are providing an downwardly directed airstream or airstreams which are thinning the air slightly above the vehicle and in the level of hight of flight of the vehicle. The rear propellers move then into the so thinned air and are thereby moving through different density of the air. While the atmosphere provides a filling of the thinned air space, such provision is done by a wind and the wind needs some time to fill up the pressure of the thinned air. When the vehicle flies slowly the thinned air might be filled up before the other propellers are reaching it, but when the vehicle flies fast, the density of the air whereinto following propellers are moving, might still be different relatively to the forwardly provided propellers.

When now the control of the former art was used, the vehicle inclined or declined slightly in the direction over one of the propelers, for example over either propeller 7 or 8. At the moment before such inclination the air surrounding the respective propeller was accelerated into a downwardly directed airstream. This downwardly directed airstream effected the surrounding of the propeller and was in fact an accelleration of a mass of air downwardly. The air is however not a solid bloc, but a fluid. A movement of a portion of the air effects the surrounding of the portion and moves also the surrounding air downwardly by a gradient of less downward motion with increase of distance from the propeller.

The outcome of the actuation of the controller 41 of the former art thereby was, that the respective propeller moved by the actuation of the controller into a portion of air which was already moving downwardly. By moving up or down in a limited extent, the respective propeller came into faster or slower downwardly moving air. The control came thereby into a lability and instability of control. The delicacy of the control increased. The present invention discovers these appearance and finds, that means are required to overcome said unstability.

The described delicacy of control and the described instability or lability of control of a four-propeller-craft is overcome by the application of the common control of the front or rear propeller pair under inclusion of a pump means as in FIGS. 8 and 9. Because the invention prevents thereby, that a single propeller could move singularily without the company of the other propeller of the same propeller pair into air portions or air surroundings of different downward motions. In the invention, each propeller of the same propeller pair is forced by the common control to move in company with the other propeller of the same propeller pair into equally downwardly accelerated air-portions.

The vehicle of the invention thereby provides the desired stability of the craft in the air and it assures a perfectly and stable working straight forward flight path of the vehicle.

The pump of FIGS. 8 and 9 might not only be applied in the vehicle of FIG. 1 but also in the other vehicles of the other Figures of the vehicles, or even, in others of my granted patents. The respective vehicles thereby obtain the stability provided by the present invention.

While the invention, in so far, has been understood by the experts with whom the invention was discussed, the importance of providing an automatic control of the straight forward flight path by the application of the pumping device of FIGS. 8 and 9 has often not be found necessary because it was assumed that any other controller could do a suitable job if a trained and experienced pilot would be available. Also the influence of the control arrangement of FIGS. 8 and 9 has never been fully understood regarding the economy and safety of flight.

While the further embodiments of the parental and grand parental applications will be discussed later, for the better understanding of those means which have not until now been fully understood, an analysis of the technologies involved will now be attempted and the consequences therefrom and the further embodiments will be discussed thereafter.

PARTIAL ANALYSIS OF THE TECHNOLOGIES INVOLVED IN THE INVENTION

At common aircraft-technology it was assumed, that it would be the most economic way to drive a propeller by mounting the propeller directly onto a flange of a crankshaft of the aircraft engine. By setting the propeller directly onto the crankshaft of the engine losses of transmissions should be prevented. Because, when a transmission is used between an engine and a means driven by the engine, there will be losses in the transmission.

This assumption of the common aircraft technology, which makes at the first glimpse the impression of being absolutely true—simply because it is true that a transmission has losses—is however, as the inventor of this application found, under certain circumstances a disastrous error, which has considerably prevented the advancement of flight-technology.

Figure 25:
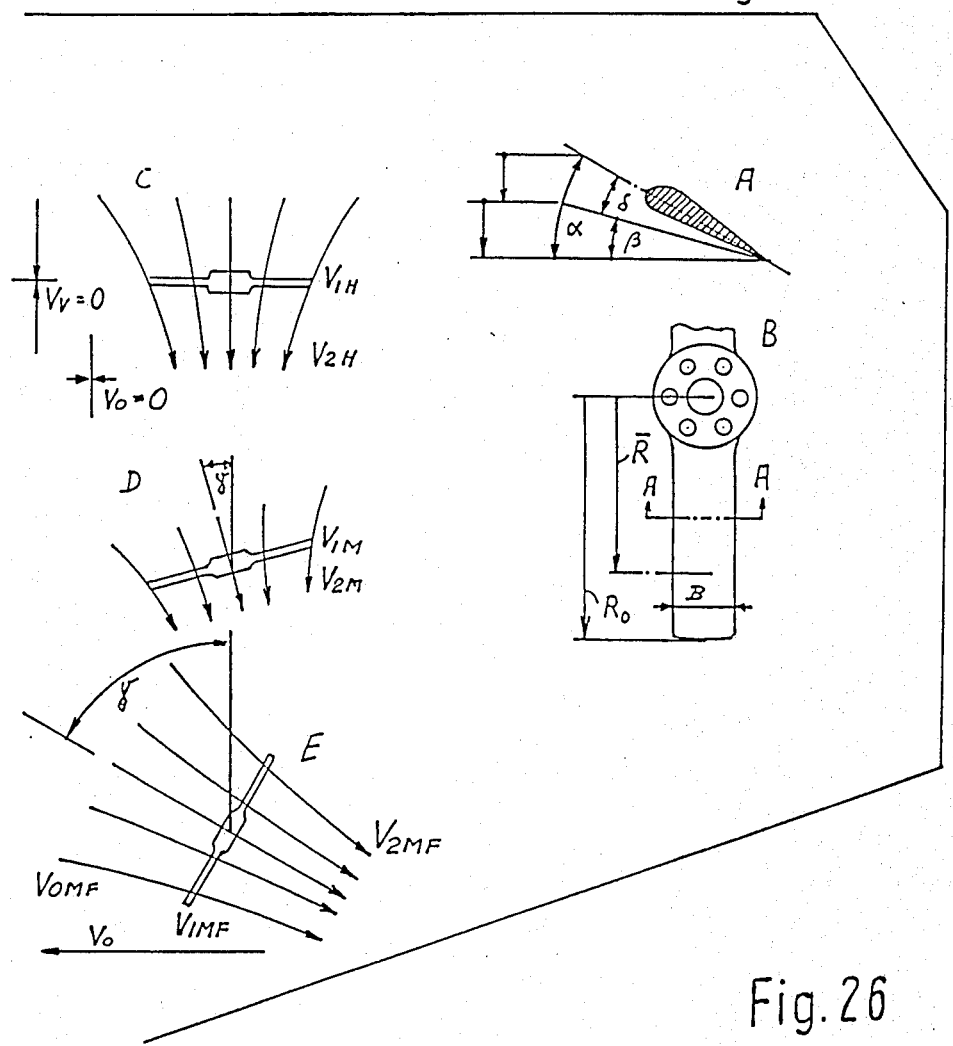
FIG. 25 is a schematic for the analysis of the invention.

This will be visible at hand of FIG. 25 of this specification.

It is generally known from Newtons law of force, that the force equals the mass multiplied by the acceleration, according to equation: (1)

$$\text{Force} = \text{mass} \times \text{accelleration; or: } F_k = m \cdot a \tag{1}$$

The mass of air, which flows through the propeller circle of FIG. 1 is:

$$m = \theta \cdot F \cdot V_1 \tag{2}$$

And, since it is required to accellerate the mass of air, when it flows through the propeller circle from the velocity "$V_o$"=zero to the final velocity "$V_2$", the accelleration of the mass of air, when it flows through the propeller circle is:

$$a = V_2/\text{second} \tag{3}$$

Consequently, the force obtained by Newton's law, is:

$$F_k = \theta F V_1 V_2 / s \tag{4}$$

And, since it is known from the theorem of Freude, that the velocity through the propeller circle is the mean value of the velocities before and after the propeller circle, namely:

$$V_1 = (V_o + V_2)/2 \tag{5}$$

the force, which is required to keep an airborne craft with vertical propeller axis (axes) in hovering without ascend and descent is:

$$F_k = \theta F V_1 V_2 = \theta F V_1 2 V_1 = \theta F 2 V_1^2 \tag{6}$$

Or, with I=impulse:

$$I = m 2 V_1 = 2\theta F V_1^2 = H = S \tag{7}$$

The kinetical energy in the air-stream behind the propeller is:

$$E_k = \frac{m}{2}(2V_1)^2 = 2\theta F V_1^3 = N \tag{8}$$

Equation (2) can be transformed to V1, to be:

$$V_1 = \sqrt[3]{N/2\theta F} \tag{9}$$

and the "V1" of equation (3) can be used to be inserted into equation (1), whereby the followings are obtained:

$$H = S = 2\theta F \left[ \sqrt[3]{N/2\theta F} \right]^2 \tag{10}$$

or:

$$H = S = 2\theta F \sqrt[3]{N/2\theta F} \sqrt[3]{N/2\theta F}$$

or:

$$H^3 = S^3 = 8\theta^3 F^3 \frac{N}{2\theta F} \frac{N}{2\theta F}$$

or:

$$H^3 = S^3 = \frac{8}{4} \theta F N^2$$

or:

$$H = S = \sqrt[3]{2\theta F N^2} \tag{11}$$

or:

$$N = \sqrt{S^3/2\theta F}$$

In the above equations the following values may be used:
 $\theta$=density of air (for example: in kg s$^2$/m$^4$)
 N=Power (for example in kgm/s)
 S=H=lift of thrust (for example; in Kg.)
 I=Impuls (for example in Kg.)
 V1=velocity of the air in the propeller-circle (f.e. in m/s)
 m=mass of air in the flow (for example Kgmass=Kg/9,81)
 F=are of propeller-circle (for example in m$^2$.).

As a first step to explain my invention, I introduce "M" which shall define the number of propellers, which will be used in my craft. For comparison with conventional helicopters it should be understood, that equal diameters of propellers are considered. Also the forms, pitches, configurations and like shall be the same, when propellers are compared.

As second step I introduce the efficiency of a transmission and call it "$\eta$". The transmission may also be my hydraulic transmission of a plurality of separated flows of fluid of equal rate of flow in the flows.

I now introduce "$\eta$" and "M" into equation (11) whereby equation (11) transforms to:

$$H = S = M \sqrt[3]{2\theta F \left(\frac{\eta N}{M}\right)^2} \quad (13)$$

This equation (13) now shows already some very interesting surprises, which will be found to be important means of the present invention. For example:

The equation explains, that the lift is as greater as the number "M" of the propellers is.

And, the equation has the further surprise, that the lift will not be reduced parallel to the losses in the transmission, but only with the third root of the second power of the efficiency-losses.

These features, which my equation explains, are obtained at the given power. Or, in other words, my equation shows, that, when a certain power is available, the lift or ability to carry, of an airborne craft will increase, when the number "M" of the propellers is increased and when done so, the losses which may appear in a transmission which transfers the power to the plurality of propellers will not reduce the lift or carrying capacity in the same ratio as the losses reduce the power in the transmission, but less, namely only with the third root of the second power.

In short, my equation shows, that with increasing the number of the propellers, an increase of lifting capacity or of carrying power, can be obtained.

As a next step to explain my invention, I assume, that in equation (13) equal values will be used for a comparison of a conventional helicopter with a plural propeller craft of my invention. Equal values in equation (13) mean, equal power "N", equal values "2"; equal values of density "$\theta$" and equal values of propeller-dimensions, including equal values of cross-sectional areas "F" through the propeller-circles. For a comparison of flight-technology-systems the equal values can simply be left out of equation (13) and I so obtain my comparison equation (14) which shows my comparison-factor "Ftl"; namely:

$$F_{TL} = M \sqrt[3]{\frac{\eta^2}{M^2}} \quad \text{or:} \quad F_{TL} = \sqrt[3]{M\eta^2} \quad (14)$$

With this equation it is possible to calculate a comparison diagram, wherefrom the comparison factor "Ftl" can immediately be seen and which shows, how many times lift a machine with a certain number of propellers and a certain transmission efficiency will give, compared to other or conventional craft. This diagram will be shown in FIG. 17.

The common helicopter has the Ftl value 1 minus the mechanic transmission losses and minus the power which is required to drive the tail rotor. In short, the common helicopter may have a Ftl value of 0.75 to 0.85.

Herebefore the thrusts, lift-forces, thrust-forces and power for the obtainment of certain forces have been calculated for the condition, that the propeller(s) does(do) not move in the direction of the axis(axes). In other words, the equations above are valid for propeller(s) in stand, but not for propeller(s) in movement in the direction of the axes of the propellers.

At the later to be discussed range of flight the craft moves substantially forward in levelled hight speed flight, where the resistance of the craft in air at the respective speed is in balance with the traction of the propeller(s). I call this range the "flight-range". Contrary thereto, the range where the propeller does not move, where the propeller is at stand or where the craft is hovering, in short, where the above discussed equations apply, we have another range, which I call the "stand-range" or the "hovering-range".

But, according to my "Handbook of my Flight-Technology" there is another range, a range between the stand-range and the flight-range. This range therebetween is called the "inter-thrust-range" in my handbook.

At this Inter-Thrust-Range the craft may permanently change its speed, for example, accelerate. The Inter-Thrust-Range can thereby also be assumed to be an acceleration-range.

At the said "Inter-Thrust-Range" the thrust of the propeller(s) is gradually decreasing when the velocity of the craft increases. The detals of this situation and condition are exactly defined by my following equations for thrust of a propeller or of propellers in the inter-thrust-range:

$$S_i = 2N_{in} \times \eta G / \left(V_o + \sqrt{V_o^2 + \left[\sqrt[3]{16\theta MFN^2/\theta MF}\right]}\right) = Kg_i \quad (15)$$

or:

$$S_i = 2N_{in} \times \eta G/(V_o + \sqrt{V_o + 2S_{ibm}/\theta MF}) = Kg \quad (16)$$

The development of the above equations for the Inter-Thrust-Range can be seen in my "Handbook of my Flight-Technology". The first equation of the two equations, namely equation (15) is the more simple equation in actual calculation. The latter equation (16) is the more accurate equation, but it is more difficult and more time consuming in actual calculation procedure.

At the later "Flight-range" when the craft is flying substantially horizontally in levelled flight parallel to the surface of the earth, and, when the resistance of the aircraft during move in air is in balance with the traction force(s) of its propeller(s); or, in other words, when thrusts of the propellers equals resistance of the craft, but thrusts and resistance are opositionally directed, the following equation is valid:

$$W = (\theta/2)C_w A V_o^2 \quad (17)$$

and further, also the following equation will be applicable:

$$N = W \times V_o \quad (18).$$

I now insert equation (11) into equation (12) and obtain:

$$N = (\theta/2)C_w A V_o^2 V_o \quad (19);$$

which I transform to:

$$V_O = \sqrt[3]{2\, Nour/\theta CwA} \quad (20)$$

whereby I have a possibility to immediately calculate the expected velocity of an airborne craft or aircraft in its flight-range. In the above flight-range equations, the following values may be used:

W=Resistance of craft in Kg.
$\theta$=Density of air, for example: 0.125 Kgs$^2$/m$^4$ close to oceanlevel;
A=Projection of wings (airfoil) in m$^2$
Cw=Coefficient of resistance; dimensionless;
N=Power in Kgm/sec;
Vo=Velocity of craft relative to air in m/sec.

Equation (14) can also be written in the following form:

$$V_o = \sqrt[3]{\frac{1}{A}} \times \sqrt[3]{2\, Nour/\theta Cw} \quad (21)$$

The latter equation shows directly the influence of wing-area's vertical projection and also the influence of power and of the permanent values for the range of flight. For further defining the influence of power and the influence of the permanent values, the equation (21) may also be written as:

$$V_o = \sqrt[3]{\frac{1}{A}} \times \sqrt[3]{2\, Nour} \times \sqrt[3]{\frac{1}{\theta Cw}} \quad (22)$$

and thereby all important influences for the speed which can be obtained in the flight range are directly visible.

With the above equations all conditions for vertical take off, for vertical landing, for the accellerations at the Inter-thrust-range and for actual horizontal levelled flight can be pre-determined and be exactly calculated in advance. The substantial correctness of the equations has been proven in actual testing in my research laboratory.

With these equations diagrams can be developed which show in detail and in advance which kind of craft are the most economical for take off and for flight.

From said equations and diagrams it can be found, that even, when hydrostatic transmissions of my hydraulic systems are arranged between a power plant, like an engine or a gas-turbine and a plurality of propellers, a substantially higher lifting capacity can be obtained than would be obtainable at the same power installation from a single propeller, if flanged onto the crank-shaft of the power plant. This is at least true for the vertical start or take off, for the substantially vertical landing and for flight with moderate forward speed. Only at a high forward speed will the single propeller per engine be of higher economy.

Consequently, it is more economical, according to this invention, to use a power plant to drive or create a plurality of separated fluid flows of substantially proportionate or equal rate of flow and drive thereby a plurality of propellers over fluid motors which are arranged at suitable locations on the craft. These theories are further condition to the fact, that at comparisons equal total power is installed and that the compared propellers have equal dimensions like equal diameters, sizes and pitches. The comparison can not be valid, if in the common craft other dimensions of propellers or power would be used, compared to those of the invention.

Therefore, according to the invention, an airborne craft may be driven by a plurality of propellers which are driven by hydraulic fluid motors, wherein the fluid motors are driven by separated fluid flows of equal rate of flow which are created in multi-flow pumps or hydrofluid conveying engines and wherein the pump(s) are driven or prime moved by a respective power plant or engine(s).

Figure 14:
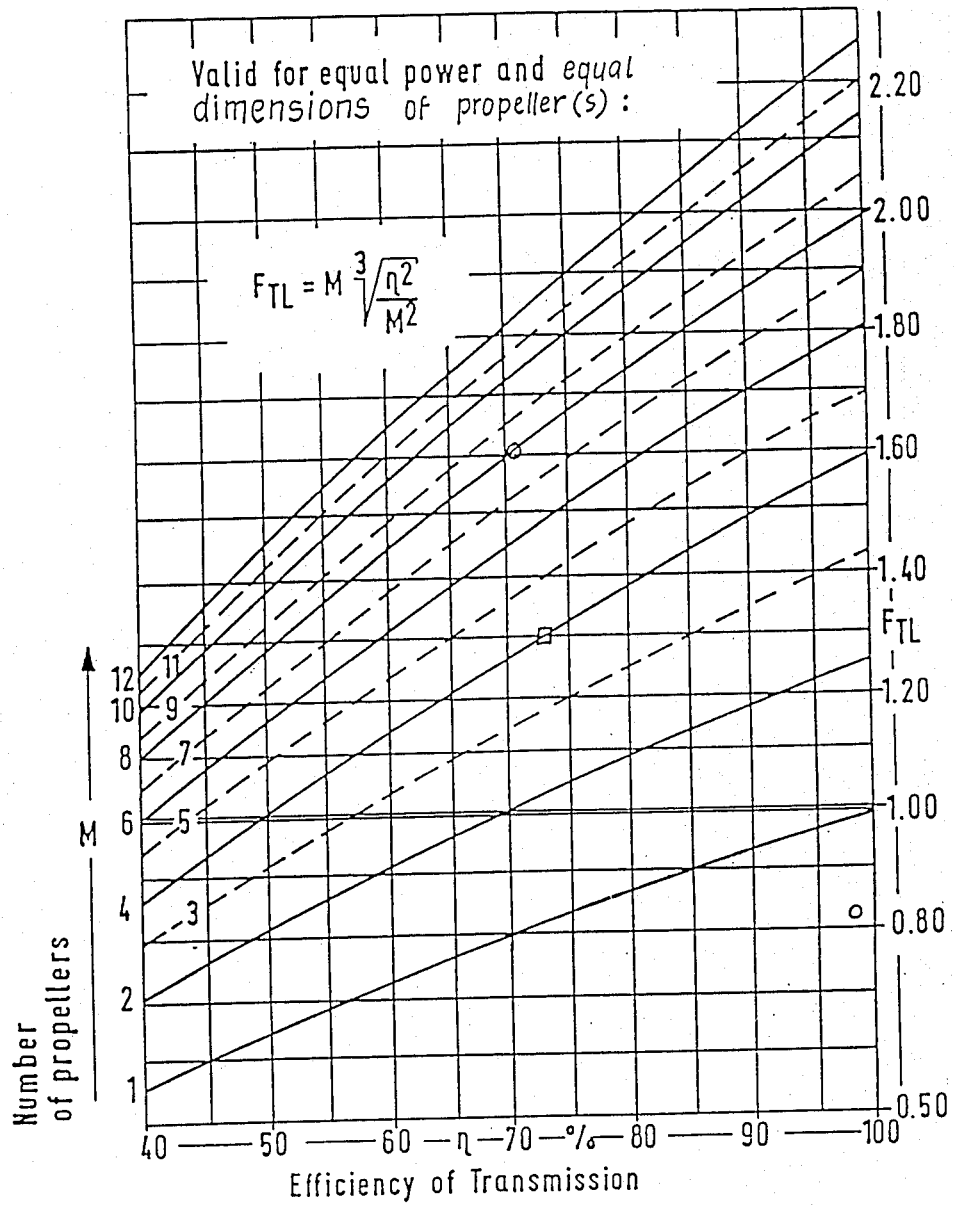
FIG. 14 shows a diagram of the analysis of the invention.

So far the analysis has made it clear that a plurality of propellers lift more than a single propeller of equal diameter when equal power is availabe and the anaylis has also given equations for the later forward flight. The very important factor "Ftl" in combination with the efficiency of the transmission from the power plant to the propellers is, therefore, shown in the diagram of FIG. 14.

Therefrom it is immediately seen that, for example, a craft with equal power and diameters of propellers lifts 1.59 times more than the rotor of equal dimensions of a one rotor helicopter. A two propeller device would lift 1.26 times more and an eight propeller device would lift two times more. Since the actual one rotor helicopter also needs to drive the tail rotor and the transmission to it has also losses, the actual helicopter lifts only about 80 to 90 percent of the lift the one rotor would give if it could be run without a transmission and without a tail rotor. Thus, the four propeller craft of the invention is able to lift roughly two times more than the one rotor helicopter with equal power and dimesnions of the rotor blades. This evaluation is done with about 73 percent total efficiency of the transmission from the common power plant to the rotors of propellers of the multi propeller craft of the invention.

It appears also from the analysis that a four or eight propeller craft is in lifting efficiency at hovering much more economic than a two propeller helicopter.

At the filing of my earier application Ser. No. 465,413 in 1974 I have, therefore attempted to run a vehicle on the road and make it able for vertical take off and landing from and onto the road.

This aim was possible only because of the use of the multi propeller arrangement of the invention which brings the better lift. The mentioned attempt used, however, in addition the shrouds around the propellers in order to remain narrow enough—about 2.2 meters wide—in order to remain below the limit of breadth for road running vehicles.

At filing the present application now, many years later, it appears that it is not in all cases beneficial any more to start from the road and land into the road because the deeper considerations about the control arrangements, for example, of FIGS. 8 and 9 in combination with the hereafter continuing of the analysis of the technologies involved, that it is more economic to start from the back yard or from the garden and to land into the backyard or into the garden. One reason is the greater safety and the other reason is that the road-air vehicle with ducted propellers has a rather high drag whereby it is limited in forward speed and is thereby a rather slow vehicle and uneconomic in forward flight.

For cantinuance of the analysis of the technologies involved and for finding out about economy of move, flight and vertical flight, it is now explained what in my view a propeller can do.

FIG. 29 gives my mathematical analysis of a propeller. A propeller blade is considered geometrically and my equations and way to calculate it is is shown in this Figure. All values are explained in the Figure. This calculation and development of equations for calculation does not take the air flow through the propeller into consideration. It shows, however, how I calculate the lift, drag, power consumption and so on of an arm of a propeller. The angle "alpha" is the relative angle to the air. If the air is not in rest, but flows through the propeller circle as in FIG. 25 then the angle "alpha" again is relative to the surrounding air which then means relative to the velocity "V1" through the propeller circle. For the power of the propeller the calculation of FIG. 29 would than have to be added to the air stream calculation of the previous portion of this analysis.

I do not claim that my calculation and development of FIG. 29 is entirle perfect but it is the way how I developed my equations and how I use them. More detailed data may be available from the leading propeller makers. For the present analysis, however, it appears to me that my equations are very helpful, especially since the integration safes lots of time relative to the calculation of a plurality of stepwise blade intervall calculation. With me developments of FIG. 29 it becomes possible to integrate a number of forms of propellers. The detailed stepwise calculations of intervals of propeller blades can thereby be spared.

Figure 12:
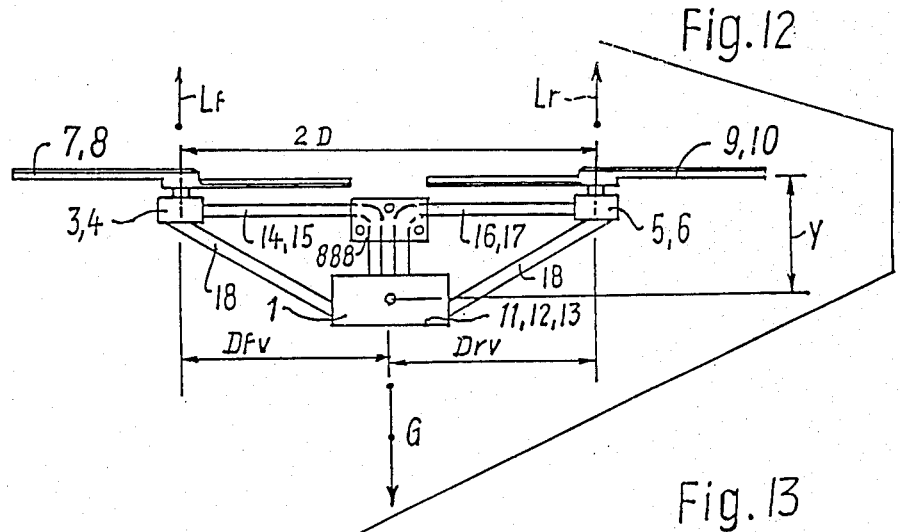
FIG. 12 is a schematic of a vehicle to explain technologies thereof.

FIG. 12 brings five different forms, configurations, of propeller arms and my system of calculating their abilities. Four thereof can be calculated by my integration development of FIG. 29. The respective equations which I have developed, are given in the bottom portion of FIG. 30.

Figure 24:
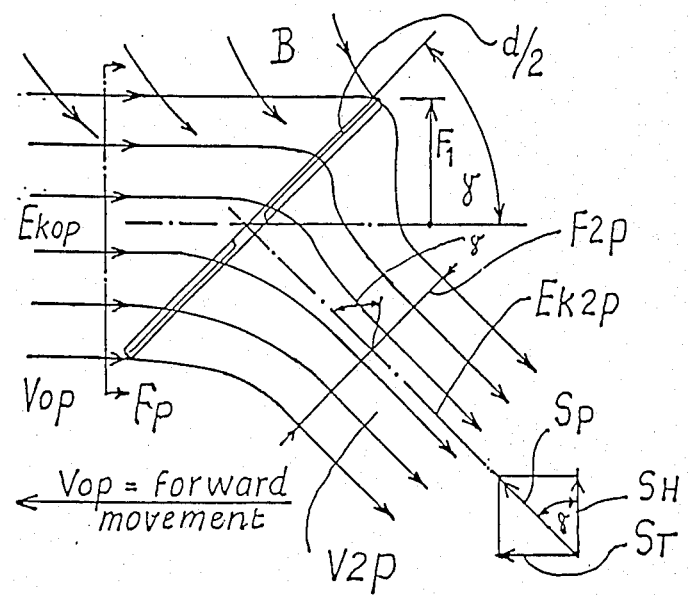
FIG. 24 is a schematic illustration of the analysis of the invention.

In FIG. 24 a vertically lifting propeller of a helicopter or of the craft of this invention is with its axis forwardly inclined by the angle "gamma". In this Figure the angle of inclination, "gamma", is fourtyfive degrees; but the following analysis is valid also for other angles "gamma".

The airstream through the propeller is now directed 45 degrees. That gives a lifting capacity in the direction of the arrow "Sp" as calculated in the beforegone analysis if the propeller is in rest and not moving towards the air. I will call this resultant force the force resultant "Sp". This resultant force is now to be separated into a vertical component "Sh" (for vertical lift) and a horizontal component "St" for forward traction.

At the shown 45 degrees "gamma" it follows from the pythagors that $Sp^2$ is the sum of $Sh^2 + St^2$ and, since at 45 degrees "gamma" "Sh" and "St" are equal, it follows: $St = Sh = \sqrt{Sp} = 0.71\ Sp$.

Thus, one sees, that at 45 degrees "gamma" the propeller would at the same power consumption and in rest lift vertically only the component "Sh" and thereby only roughly 0.71 times or only seventyone percent of its vertical lifting capacity of vertical axis with angle "gamma" = zero.

The analysis now brought to light that the vehicle would fall to the ground if it inclines its axis 45 degrees because the installed power in an inexpensive craft is not much higher than required for the vertical hovering or for vertical ascent with very slow speed.

In other words: The craft could crash or would crash if only the lessons of the former art of my former patents are taken without consideration for the safety and control of the present invention.

The angle "gamma" gives a horizontal projection and a vertical projection of the propeller circle. For this analysis I will assume that these projections of the circle are elliptoids. With the horizontal prejection area to be $R^2$ pi sin gamma and the vertical projectional area to be $R^2$ pi cos gamma. With R=radius or half diameter of the propeller circle.

With that assumption the vertical lift would also be equal to the lifting capacity "Sp" (lift in rest and vertical axis). One obtains the horizontal traction componet = St = Sp sin δ and the vertical lift would be Sh = Sp cos δ. The circle area "F" replaced by the vertical projection of it for the lift and by the horizontal projection for the horizontal traction or thrust. Thus, the lift area would be; "R R sin gamma pi" and the vertical area would be; "R R cos gamma pi" with "R sin gamma" and "R cos gamma" the smaller radii of the elliptoid. This can also be written as:

$$\text{Area } Sh = R^2 \text{ pi sin gamma} \tag{23}$$

and $$\text{Area } St = R^2 \text{ pi cos gamma.} \tag{24}$$

Until now, however, it was assumed that the propeller would not move through the air but suck the air in and through. From equation (9) it was learned:

$$V1 = \sqrt[3]{N/2\theta F} \tag{25}$$

And, according to the "theorem of Freude" in hovering V2 is = 2 V1.

More generally, the "theroem of Freude" say:
"The velocity through the propeller circle is one half of the sum of the velocities before and after the propeller circle."

Therefrom I obtained in my "Handbook of my flight technology" and in my book "Mini introduction to a new technology" the two following equations:

$$\text{valid for hovering } V_{2H} = \sqrt{2S/\theta F} \tag{26}$$

$$\text{valid for forward flight with horizontal axis } V_{2F} = \sqrt{V_0^2 + 2S/\theta F} \tag{27}$$
of the propeller Therein "Vo" is the velocity of the air far before the propeller circle. Equation (27) is the generally valid equation. At hovering with vertical propeller axes (axis), however, Vo is zero and consequently for hovering equation (27) simplifies to equation (26).

In the analysis hereinbefore the hovering of equation (26) was used because the lift with vertical axis was calculated to obtain the Ftl factor.

In equations (15) and (16), however, equation (27) was the basis. The development of equations (15) and (16) are not given in my patent applications because that would exceed the purpose of the applications. The development of these equations is available in my "HANDBOOK OF MY FLIGHT TECHNOLOGY".

Returning now to FIGS. 25 and 29, in FIG. 25-C for hovering it was assumed that the propeller accelerates the air from zero to V2. On this assumption the calculation of the required power to obtain a desired lift is based. Assuming now a slight inclination with angle "gamma" as in FIG. 25-D and assuming that the craft nowflies forward, a velocity Vo different from zero would stream towards the propeller circle. The quantity thereof would be the speed Vo which is also the forward speed of the craft, in this case, multiplied by the horizontal projection of the propeller circle. I now assume—without claiming correctness of this assumption—that at that time when the quantity of air which corresponds to the propeller circle of FIG. 25-C with the velocity V1 is streamed towards the propeller circle, that then the velocity V1 would be supplied to the propeller without the prooeller sucking this air in. The required power of the propeller would then be just one half of the power required for hovering because the propeller would not accelerate the air any more from zero to V2 but only from V1 to V2 which is just just half of the velocity V2.

Equation (9) gave: $V_1 = \sqrt[3]{N/2\theta F}$

Equation (1) gave: $M = \theta F V_1$ which gave equation (10): $H = S = 2\theta F \left[ \sqrt[3]{N/2\theta F} \right]^2$ Since for hovering V2 is 2 times of V1 for hovering follows:

$$V_2 = 2\sqrt[3]{N/2\theta F}$$

or, transformed according to my mentioned books:

$$V_2 = 2V_1 = \sqrt[3]{4N/\theta F} = 2\sqrt[3]{n/2\theta F} = \sqrt[3]{8n/2\theta F}$$

$$V_2 = 2\sqrt{I/2\theta F} = 2\sqrt{S/2\theta F} = \sqrt{4S/2\theta F}$$

$$V_2 = \sqrt{2S/\theta F} = \sqrt{2I/\theta F} = \sqrt{2H/\theta F}$$

and, accordingly by the mentioned books for V1:

$$V_1{}^2 = I/2\theta F$$

$$V_1 = \sqrt{S/2\theta F} = \sqrt[3]{N/2\theta F}$$

$$V_1{}^3 = N/2\theta F.$$

—A first (doubtful) theory—
Neglecting now the loss of vertical lift when the axis of the propeller inclines by the angle "δ" and also neglecting the drag which the craft has at forward forward flight and using the above equation "V1=√S/2 ro F" the air quantity of V1 multiplied by the propeller circle of FIG. 25-C would be supplied towards the propeller at Vo=V1h/horizontal projection of the inclined propeller circle.
Which would be:

$$Vof1 = \text{end of range 1} = [\sqrt{S/2\theta F}]/F\sin\gamma \tag{28}$$

or:

$$Vof1 = V_{1h}/\sin\Delta\gamma_1$$

with "h" indice for hovering and "f" indice for forward flight.

The first range would be that range of forward speed at which the movemen supplies air of the quantity corresponding to V1h with this quantity reached at the end of the first range. The propeller would then have got this air quantity corresponding to V1h as a present and would now work, accordingly, with half of the power required at hovering to maintain the same quantity of vertical lift. The end of this range is that forward speed at which the craft with substantially vertical propeller axis obtains its most economic flight range regaring fuel comsumption per vertical lift.

Thereafter the second speed range, the range 2 begins at which the propeller has to help to suck the air. The power required would gradually increase until the end of the second range is reached. During this range the value Nh/×V1h/sin gamma is to be added to the value Nh/2 which was valid at the end of the first speed range.

At the end of the second speed range the speed value would be Vo end range 2 and the power required would be equal to the power required for hovering.

$$Vof2 = \text{end of range } 2 = -V1h/\Delta \sin \delta_1 + V1h/\Delta \sin \delta_2 \tag{29}$$

Thereafter the third range, speed range 3 starts at which the required power increases over the power required for hovering. Equation (29) is now to be used, however, at this present assumption, for which I do not claim correctness, with Vo=actual Vo minus VOf2.

$$Vof3 = Vof3 = Vo - Vof2 \tag{30}$$

For a low loaded propeller circle as in the inexpensive private craft of the present invention, the load per squaremeter propeller circle area may be about 20 kilograms and the velocity V2h is then about 18 m/s which gives V1h to be about 9 m/s. The table shows results for different angles "gamma":

| γ ° | sin γ | V1h/sin γ m/s | km/h |
| --- | --- | --- | --- |
| 2 | 0.034 | 256 | 928 |
| 5 | 0.087 | 103 | 372 |
| 10 | 0.174 | 52 | 186 |
| 15 | 0.25 | 35 | 125 |
| 20 | 0.34 | 26 | 95 |

Whether this assumption is correct does not matter presently, because it shall show one important matter, that if it is roughly correct the consequence thereof is that to stiff an inclination by angle gamma will very rapidly decrease the speed at end of range 1 at which the craft would fly with the most economic speed and smallest fuel consumption.

Actually the drag will brake this speed and the craft will descent since the inclination reduces the component of vertical lift as explained at hand of FIG. 29.

At the third speed range the required power will very rapidly increase with speed since the propeller must now suck in the velocity Vof. With Vo as actual speed in the calculations there are several thousond calculation results in the handbokk of my flight technology. It is also known to me that a technical university in Europe in the meanwhile published a calculation method for inclined propeller performance. Said method is, however, in my opinion not better than my above described method and the European calculation disregards every helping effect by the to flowing air. Such effect is, however, known from the helicopters and also shown in performance data of US built helicopters.

It has now still to be found what effect the control arrangement of FIGS. 8 and 9 in combination with, for example, FIG. 1 has on the economy of the forward flight. This may be understood at hand of FIGS. 6 and 13.

FIG. 12 shows the craft of FIG. 1 seen from the side at hovering with vertical axes of the propellers 7 to 10. The lift of the front propellers is "Lf" and the lift of the rear propellers is "Lr". The lifts act in the centers of the propellers. The weight is "G" and acts in the gravity center "p". The distances of the lift centers from the gravity center are "Dfv", "Drv" and "y" The craft is in balance, the forces add up to "zero".

Figure 13:
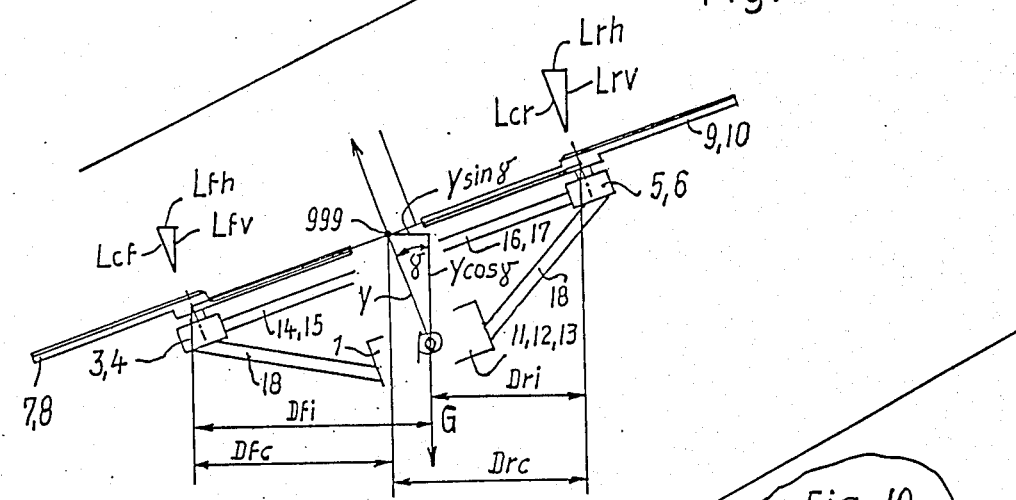
FIG. 13 shows the vehicle of FIG. 12 with another inclination.

In FIG. 13 the craft of FIG. 1 is shown from the side in forward flight. The angle "gamma" is strongly exagerated in this Figure. The lifts "Lf" and "Lr" now split up into vertical and horizontal components "Lfv", "Lfh", Lrv" and "Lrh". The vertical lifts are reduced to: "Lfv cos gamma" and "Lfh cos gamma". Forwards tracting or pushing components, the vertical horizontal components, are added and are: "Lfc sin gamma" and "Lfr sin gamma". The distances "Dfl" and "Dri" are now unequal. The craft would be out of balance if the lift of the rear propellers would not be increased or the lift of the front propellers would not be reduced.

Thus, the products "Dfi×Lfv" and "Dri×Lrv" must be equal. The distances Dv have however, (see FIG. 13) changed and have become: Dfi=Dfv−Y sin gamma and Dri=Drv+Y sin gamma. Consequently, the balance now is:

$$Lfv \times (Dfv - Y \sin \delta) = Lrv \times (Drv + Y \sin \delta) \quad (31)$$

With these basic geometrics for FIG. 13 established it is now to be found out how a change of the piston strokes of the pump of FIGS. 8 and 9 will effect the lifts and distances as well as the angle of inclination, the angle gamma.

In FIGS. 8 and 9 the housing 140 contains the fixed stroke pump and housing 139 contains the variable stroke pump. The fixed stroke shall be defined as the hundred percent relative stroke and be balled just "stroke". The variable stroke is 2 times "e" of FIG. 9 and it is adjusted or controlled by the piston stroke guide ring 99 with the control piston 143 or with the control shaft 199. This stroke will be called "Cs" for control stroke. The control stroke shall be variable relative to the fixed stroke. The range of variability shall be expressed in "Cs=% strokes" or in "Cs=". "strokes. Since any range of variability of stroke is available in my pumps, there is no limit to the ratio of the strokes relative to each other by manufacturing reasons. But the purpose of the present analysis is to find out, whether an unlimited ratio of strokes is suitable for the aircraft of the invention or whether limits of the stroke ratio "Cs/stroke" has to be set. For that purpose the following calculation table may be established to obtain a general picture of the situation. To establish the table it is to be understood that the revolutions of the propeller driving motors are parallel to the stroke of the pumps of FIGS. 8 and 9 because in the positive displacement pumps and motors the slip (leakage) is minimal and can be neglected for for the present analysis. The change of the rpm's of the propeller motors will change the lifts of the propellers and the power consumption of the propellers in accordance with the equations of FIGS. 29 and 30 if the influence of the airstream is neglected. Thus, the lift and power consumption of the front and rear propellers is now calculated at hand of the equations of FIGS. 29 and 30 for different ratio of piston strokes Cs/stroke. For simplicity propeller type 1 is elected and the stroke shall give 1000 RPM (propeller revolutions per minute). 1000 RPM/60=16.66 Rps (revolutions per second) and that gives "$\omega$"=Rpm×pi/30=104.72. Thus $\omega$=104.72. Length of propeller arm "R" shall be 1.5 meter and the breadth (chord) of the propeller arm shall be 0.2 meter.

Figure 30:
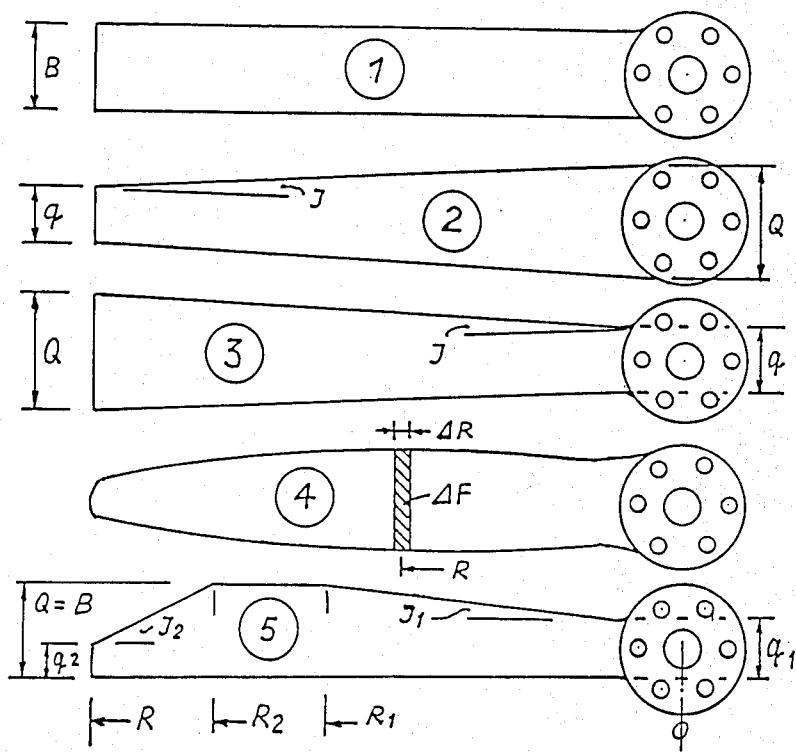
FIG. 30 is a summary of calculation systems of the invention.
Figure 32:
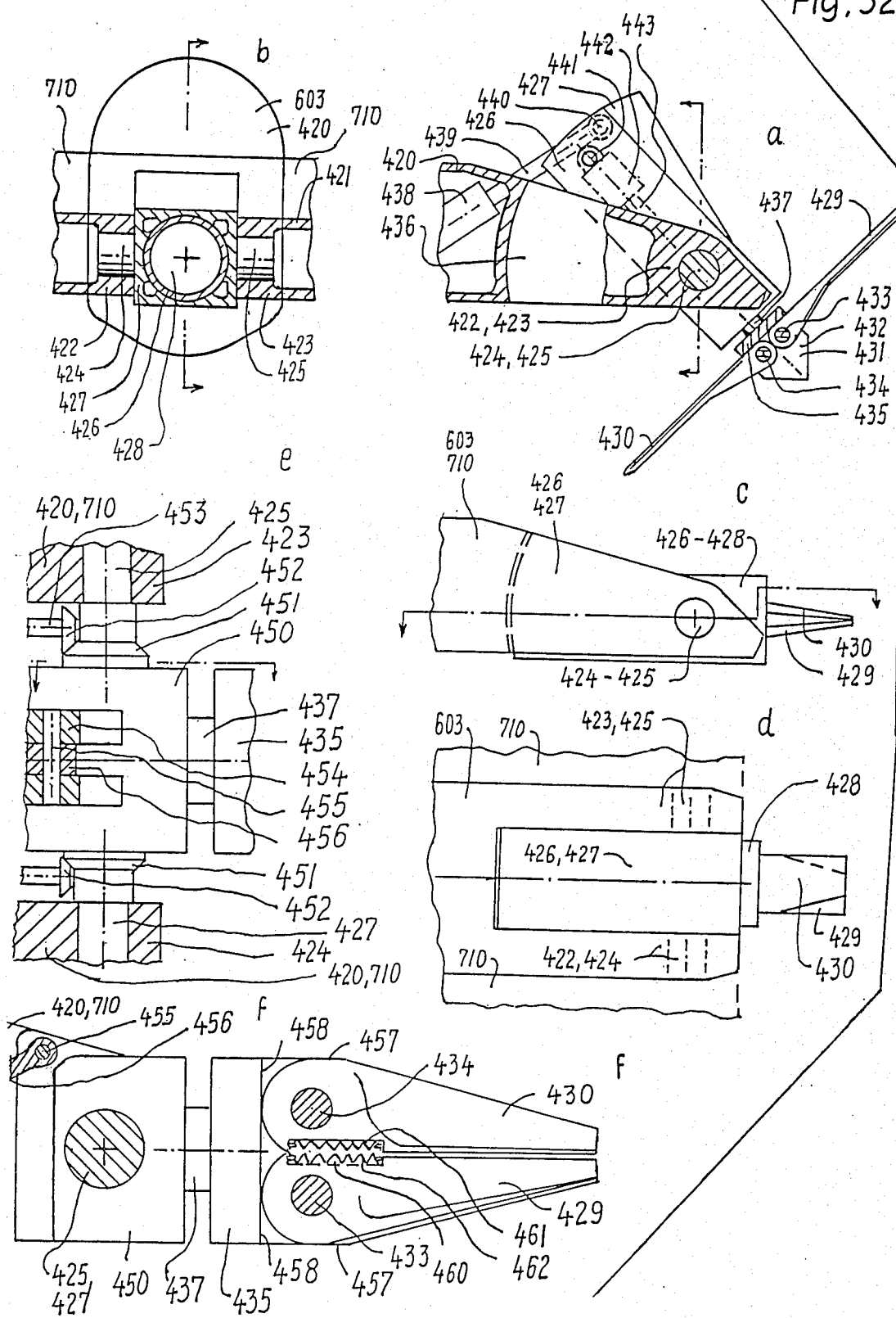
FIG. 32 shows portions of embodiments of the invention.

FIGS. 29 and 30 give:

$$E = K\omega^2; \ K = (\theta/2)Cw; \ S = (1/4)E; \ M = (1/3)E. \quad (32)$$

$$Md = \text{torque} = SBR^4 = (\theta/2)Cw(1/4) BR^4\omega^2. \quad (33)$$

$$W = \text{drag} = MBR^3 = (\theta/2)Cw(1/3) BR^3\omega^2. \text{ Lift} = \quad (34)$$

$$\left(\frac{Ca}{Cw}\right). \ N = Md\omega$$

and the following values will be used: $\eta$=0.125; Cw=0.05; Ca=1.0; (C2/Cw)=20;
Except "$\omega$" all values are now constants for the present analysis of a single sample of a propeller. Calculating them out gives:

$$Md = \text{torque} = \frac{0.125}{2} \ 0.05 \ \frac{1}{4} \ 0.2(1.5^4) \ \omega^2 = \quad (35)$$
$$0.000791 \ \omega^2 = \text{Kgm}$$

$$W = \text{drag} = \frac{0.125}{2} \ 0.05 \ \frac{1}{3} \ 0.2(1.5^3) \ \omega^2 = 0.000703 \ \omega^2 = \text{Kg} \quad (36)$$

$$L = \text{Lift} = \frac{1}{0.05} \ 0.000703 \ \omega^2 = \text{Kg} \quad (37)$$

$$N = \text{power} = 0.000791 \ \omega^3 = \text{Kgm/s.} \ (N/75) = HP \text{ required.} \quad (38)$$

Therewith the following table in which stroke ratios between 0.8 and 1.2 will be used can be established for the calculation of the single example of a single propeller:

use ωactual = ω(Cs/stroke)
FMd = 0.000791; fw = 0.000703; ω = 104.72
Md = fMd ω³; W = fw ω²; Lift = 20W; N = fMd ω³;

| Stroke ratio Cs/stroke | ω | Cs/Stroke | Md Kgm | W Kg | LIFT Lfc = Kg | N Kgm/s | HP | L − LFc Kg |
|---|---|---|---|---|---|---|---|---|
| 1.20 | 125.66 | 12.49 | 11.08 | 221.7 | 1569 | 21 | −67.8 |
| 1.14 | 119.38 | 11.27 | 10.00 | 200.1 | 1345 | 18 | −46.2 |
| 1.08 | 113.09 | 10.11 | 8.98 | 179.6 | 1143 | 15 | −25.7 |
| 1.04 | 108.91 | 9.38 | 8.32 | 166.5 | 1021 | 14 | −12.6 |
| 1.0 | 104.72 | 8.67 | 7.70 | 153.9 = L | 908 | 12 | 0 |

-continued use $\omega$actual = $\omega$(Cs/stroke)
FMd = 0.000791; fw = 0.000703; $\omega$ = 104.72
Md = fMd $\omega^3$; W = fw $\omega^2$; Lift = 20W; N = fMd $\omega^3$;

| Stroke ratio Cs/stroke | $\omega\frac{Cs}{Stroke}$ | Md Kgm | W Kg | LIFT Lfc = Kg | N Kgm/s | HP | L − LFc Kg |
|---|---|---|---|---|---|---|---|
| 0.96 | 100.53 | 7.99 | 7.09 | 141.9 | 803 | 11 | 12 |
| 0.92 | 96.34 | 7.34 | 6.51 | 130.3 | 707 | 9.4 | 23.6 |
| 0.88 | 92.15 | 6.72 | 5.96 | 119.2 | 619 | 8.3 | 34.7 |
| 0.84 | 87.96 | 6.12 | 5.43 | 108.6 | 538 | 7.2 | 45.3 |
| 0.80 | 83.78 | 5.55 | 4.93 | 98.5 | 465 | 6.2 | 55.5 |

In FIG. 13 wherein the holders 888 have been rased off in order to show the components, the moments around the lifting center 999 are visible and their calculation is developed in the equations of FIG. 13. The final result of these equations (39) to (40) is a calculation for the inclination angle "$\delta$". Using these equations, the following table is obtained:

| DV = 2m; Y = 1 m; G = 307.8; (DV/GY) = 0.0065; (L-Lfc) = above table. |||||||||||
|---|---|---|---|---|---|---|---|---|---|---|
| Cs/stroke = | 1.20 | 1.14 | 1.08 | 1.04 | 1.0 | 0.96 | 0.92 | 0.88 | 0.84 | 0.80 |
| sin $\gamma$ | −0.441 | −0.30 | −.167 | −.082 | 0 | .078 | .153 | .226 | .294 | .361 |
| $\gamma$ = ° | −26.15 | −14.47 | −9.61 | −4.70 | 0 | 4.47 | 8.82 | 13.04 | 17.12 | 21.15 |

These results show that the inclination of the craft—also strongly depending on the design relationship "Y to Dv", inclines very steeply already with small variations of the piston strokes of the pump of FIGS. 8 and 9.

Since the analysis already showed that such inclination of the craft by the inclination angle "gamma" drastically reduces the components of lift and thereby the ability of the craft to stay in the air and its lifting capacity, one sees the craft would descend or crash at such steep inclination if the power supply remaines the same as it was at hovering of the craft with vertical axis of the propellers (not inclined craft). From the above the following rule is obtained:

The range of variability of the piston strokes of FIGS. 8 and 9 must be restricted to a very small range of variability of the piston strokes if crashes by errors of pilots shall be prevented.

For further evaluation of the power consumption which will be required for forward flight of the craft with inclined axes and forwards driven by the propellers with the inclined axes a further table will show the general picture. The basis of FIG. 25 is used together with the above equations and the velocity with which the craft flies forward is defined as "Vof". Since many thousand detailed answers are available in my mentioned books, only some samples will be calculated.

The actual calculation of this table is done in FIG. 52. Therein the forward speed "Vof" is taken freely at will to get results of the calculation. The density of air is used to be 0.125; the diameter of the propeller is 2 meters, whereby the area of the propeller circle is 3.14 m² and the product $\theta \times F$ is 0.3925. To obtain the values for one squaremeter propeller circle area in order to be able to immediately find the values for other squaremeters of propeller circle area divide the results of FIG. 52 by 3.1416. The drag of the craft is not considered at the calculation in FIG. 52.

To get a picture of the drag assume, for example, a craft of FIG. 1 with four propellers of 2.8 meter diameter each. The body would be assumed to be a ball with drag coefficient C2=0.4. The propellers, motors and pipes would be replaced, for simplicity of calculation, by a pipe (cylinder) of 0.2 meter diameter und 7 meters length; having a drag coefficient Cw=0.8. The horizontal projection of the body and pipes would then be 2.18 m² with a medial drag coefficient Cw of 0.656. The drag would be: F($\theta$/2)Cw Vof² or 0.09838 Vof². Thereby the following table gives the drag for such craft as in FIG. 52:

| Vof | 10 | 25 | 50 | 100 | m/s |
|---|---|---|---|---|---|
| (Vof)² | 100 | 625 | 2500 | 10000 | (m/s)² |
| Drag: | 9.8 | 61.5 | 246 | 984 | KG |

Actually the drag differes considerably with the design of the craft and the actual drag coefficients are different too. Details are found in my handbook of my flight technology. The present analysis gives a rough picture for inclined forward movement of a craft with an inclined body with inclined propeller axes. Each craft might be roughly calculated in FIG. 52. Please note that there are squares and rootes in the calculation. Therefore, to obtain final results, the values of FIG. 52 can not just be multiplied. To give a rough picture for a higher load, for example, 100 Kg Sh, a four times load, which would correspond to a medial small craft with 100/3.14=32 Kg load per meter square of propeller circle, the four times would become two times under the rootes. The craft with four propellers of 2.8 meter diameter and about 32 Kg load per square meter of propeller circle would have to be multiplied with 7.84 (as explained above) times 8 (four times higher Sh and thereby doubling of V1fi) to obtain the required HP. Since the efficiency of the propeller circle and propeller might be 0.7 the result would still have to be divided by 0.7 to have a rough evaluation of the efficiency of the propeller included. Thus, to obtain the required HP; the HP values of table FIG. 52 would have to be multiplied by: 7.84×8/0.7=89.6.

From FIG. 52 it appears that the craft should have at least 2.2 HP installation to satisfy FIG. 52. That would be a required power installation of 2.2×89.6=197 HP. Considering a transmission efficiency of 0.75, the required HP installation would be: 197/0.75=263 HP.

The craft would lift 4 times 100 Kg per 3,14 m². Since the 2.8 meter diameter propellers would have 2.8²pi/4=6.16 m², the lift would be 4 times 100 times 6.16 divided by 3.14=784 Kg.

Since St would also 89.6 fold at 100 Kg Sh per 3.14 m² the 3.45 Kg St at inclination angle gamma=8 degrees would become 3.45 times 89.9=309 Kg. Thus, the craft with four 2.8 meter propellers could fly with more than 50 m/s forward speed with a forward inclination of 8 degrees of the axes of the propellers. (above values of drag etc. considered.)

The reason for this consideration for forward flight with inclined axes aof the propellers, for example of the craft if FIG. 1, is as follows:

The power installation would just fit (being 2.2 HP where 1.9 are needed as the minimum requirement for hovering and very low forward speed of 10 m/s.) but there would not be much power reservation.

If now, for example, the pilot would incline the craft to 20 degrees inclination what he already gets of 0.8 of maximum of stroke of the pistons of FIGS. 8 and 9, the craft would crash, because at 20 degrees inclination—see line 5 of the calculation of FIG. 52—the HP requirement would already be 2.4 HP instead of the 2.2 which the craft usually has. The craft would also crash at the following lines of FIG. 52: Lines 6,11,12,15,16,17,20 21,22,23 and 24.

Thus, at 8 degrees inclination the craft would be stable, operational and obtain enough forward speed. At 12 degrees, it would obtain very high but not much economic forward speed. At 20 degrees it would already crash. Therefrom follows:

An inclination of the craft by 2 to 12 degrees is the safest range of operation and the range of best economy of forward flight if no separated means are provided to drive the craft forward.

The second portion of the analysis further brings:

The ratio of the rate of flow to the front motors relative to the rate of flow to the rear motors should be a fixed ratio for permanent forward flight to prevent pilot errors;

and;

if a variability of the rate of flow to the front motors or to the rear motors is provided, the range of variability should be restricted to about 15 percent of the maximum of stroke or delivery quantity of the respective pumps with the said ratio of 15 percent to be set from 100 percent to 85 percent of the maximum of stroke of the other pump or to 100 to 118 percent of the maxium of stroke or of fluid flow delivery quantity of the other pump when one pump supplies to the front motors and the other pump supplies to the rear motors of motors of equal fluid flow consumption per revolution to drive propellers with in rest vertical axes of the vehicle.

The partial analysis of the technologies involved is hereby ended with the reminder that the first portion of it until equation (22) which deals with hovering and with horizontal flight is in my view a reliable analysis to the best of my knowledge and done by myself alone and without help from other persons or schools but that the second portion of the analysis which deals with forward movement with inclined axes is purely my attempt to come over future time to more reliable calculation methods whereby I know that these attempts which I disclosed are partially not final and do not in al extent require recognition as beeing a flowless true or the final solution.

DESCRIPTION OF THE FURTHER EMBODIMENTS AN PARTIAL APPLICATION OF THE ANALYSIS TO THE EMBODIMENTS OF THE INVENTION

Figure 6:
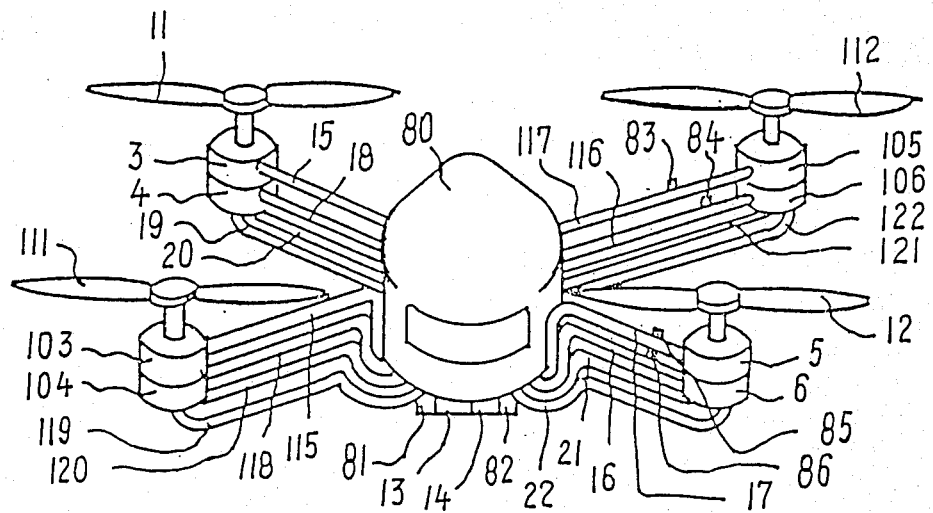
FIG. 6 shows another vehicle of the invention spherically seen from top and side.
Figure 7:
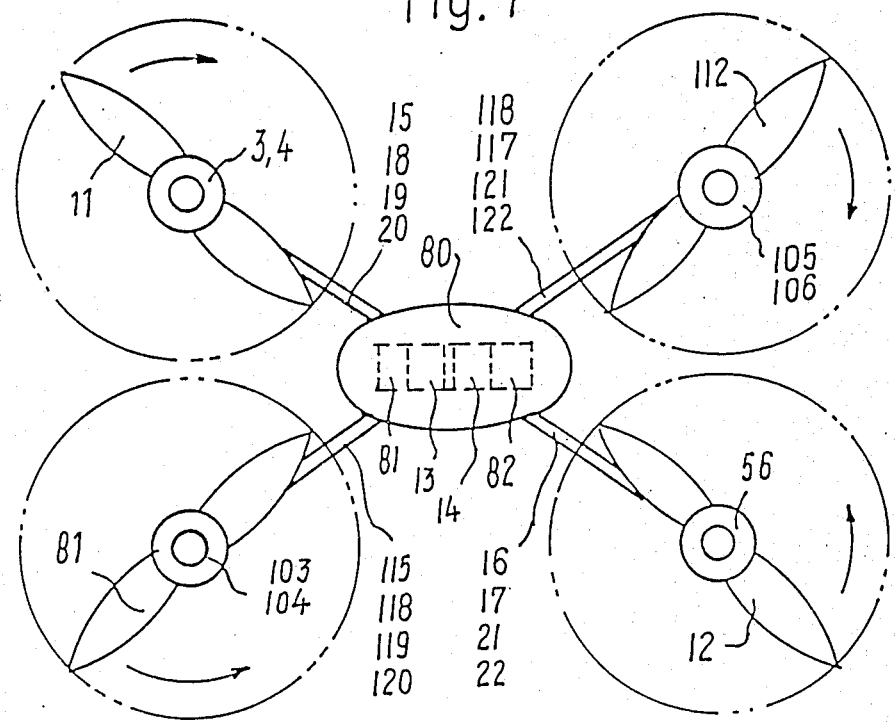
FIG. 7 shows the vehicle of FIG. 6 from above.

FIGS. 6 and 7 show a particularly reliable and inexpensive vehicle capable of flying in any horizontal and vertical direction while controlled in a simple manner and operating in accordance with the teachings of the parental invention. On the bottom of the vehicle body 80, the driving engines 13 and 14 and the pressure fluid pumps 81 and 82 are mounted producing four pressure fluid flows with rates of flow in a fixed proportion to each other. The pressure fluid pumps are preferably designed in accordance with the embodiments shown in FIGS. 8, 9 or 19. The propellers 11, 12 and 111, 112 have a diameter of approximately 1.8 to 3.6 meters and consequently may have a constant angle of incidence and be made of wood, light metal or plastics in a one-piece construction. The vehicle may carry three to four persons. The supply system of FIG. 1 is used in this case in an analogous arrangement. Four-flow pumps are provided instead of two-flow pumps. For a load of four persons, the driving engines must produce approximately 120 to 240 HP per engine, and at least two driving engines are necessary, each driving a four-flow pump. One hydraulic circuit of the four-flow pump 81 drives the propeller 11 through lines 15, 19 and the hydraulic rotor 3, another drives propeller 12 through lines 17, 22 and the hydraulic rotor 5, still another circuit drives the propeller 111 through lines 115, 119 and the hydraulic rotoer 103, and the remaining circuit drives the propeller 112 through lines 117, 122 and hydraulic rotor 105. In connection with the second pressure fluid pump, i.e., the four-flow pump 82, the first circuit drives the propeller 11 through lines 18, 20 and hydraulic rotor 4, the second drives propeller 12 through lines 16, 21 and hydraulic rotor 6, the third circuit drives propeller 111 through lines 118, 120 and hydraulic rotor 104, and the last circuit drives propeller 112 through lines 116, 121 and the hydraulic rotor 106. Should one of the driving units fail, the other continues to drive all four of the propellers, and the vehicle may make a safe landing. Should one of the hydraulic rotors fail, the other rotor of the motor continues to drive the propeller and the stopped rotor disengages automatically due to the coupling provided between the same and the propeller shaft 8. For adjusting the inclination of the vehicle to the horizontal plane and thereby determining the speed and direction of the flight, connections 83, 84 and 85, 86 may be provided, for example, on the supply lines 116, 117 and 16, 17, respectively, connected to the associated return lines 121, 122 and 21, 22 by lines shortcircuiting to a small extent the respective rotors. A flow volume regulator could be mounted in each of these bypass lines or a bypass member 100 with a turning slide valve 96 common for two of such bypass lines, as shown in FIGS. 10 and 20 of my U.S. Pat. No. 4,173,321 were connected therein. The cross-section of the connections 83 to 86 and of the flow regulator of the said patent as well as of the respective outlets and inlets 215 to 220, must be very small since only very small portions of the motor driving fluid can be permitted to pass through the bypass lines in order to prevent any excessive change of the motor speeds and thereby any excessive inclination of the vehicle endangering its stable position in the air. The bypass member and regulator, according to FIGS. 10 and 20 comprises a casing 97 and an operating valve 96. The bypass circuits for producing the inclination of the vehicles are established, for example, by connecting inlet 215 to the point 83, inlet 218 to the point 85, outlet 219 to the return line 121 and outlet 220 to the return line 21. By turning the operating valve 96, a greater or smaller quantity of pressure fluid which is in any case small relative to the main flow, is permitted to escape from two supply lines into the return lines with the effect that during the escape, the respective propeller driving motor turns at a slightly lower speed as compared to the other motors which are not controlled in this manner. Consequently, the vehicle becomes slightly inclined to the side of the slower rotating propellers and moves in this direction. Instead of associating the flow regulator 96, 97 with lines 116, 117 or 16, 17, the device may also be connected to other lines thereby reducing the speed of other motors and propellers. If, for example, inlet 215 is connected to the point 85 and inlet 218 to point 86, and outlets 219, 220 are connected to return lines 21, 22, motor 5, 6 and propeller 12 are connected in the inclination control circuit.

The indicated propeller diameters represent a particularly expedient, simple and reliable solution because, with such dimensions, gusts of wind and speed differences between the forward and backward motion of the propeller blades can still be absorbed by the shafts 8 of the hydraulic motors and shocks to which the aircraft is exposed due to the air velocity differences at the propeller blades do not yet cause too intense vibrations.

In FIGS. 8 and 9, a pump which produces four fluid flows is represented, which may advantageously be used in vehicles designed in accordance with the invention. The unit comprises two two-flow pumps mounted axially in tandem on a common shaft of which one is controllable within certain limits as to its delivery so that two and two of the produced flows have rates of flows which are equal or in a fixed proportion to each other. The housings 139 and 140 are flanged to each other, and the shaft 141 carrying the rotors is rotatably mounted in bearings 131 provided in both of the housings. Each of the housings encloses one rotor 133, and each rotor 133 is formed with two groups of delivery chambers or cylinders 134 and 135 in which pistons 136 and 137 are reciprocated by means of a reaction ring 98 with interposed piston shoes 138. Body portions 1333 of the rotor or fluid handling body 133 remain uninterrupted between two neighboring working chamber groups 134 and 135 for the separation of the respective working chamber groups 134 and 135 from each other. The stroke adjusting slide block 99 surrounding the reaction ring 98 with an interposed bearing 132 is displaceable, within certain limits, along guides 79 whereby the strokes of the pistons may be varied in the limited extent of minus 15% plus 18% of the full stroke. The groups of cylinders 134 and 135 are completely separated from each other, and each group has its own fluid inlet passage 87 and fluid outlet passage 89 to 92, respectively. The pressure fluid inlet and outlet passages cannot communicate with each other. Flow volume regulators 88 may be mounted in the inlet passages in case that the stroke adjusting slide block 79, 99 is not provided. The other housing 140 encloses the same members, i.e., the rotor block with groups of cylinders, pistons, piston shoes, and only the reaction ring 98 is not adjustable. In the Figure, this reaction ring 98 is shown in an elevational view. The part mounted in the housing 140 has its own inlet passages 87, if necessary, with flow regulators 88 mounted therein and two mutually separated and non-communicating fluid outlet passages 91 and 92. A priming device 95 having inlets 87 and two separate outlets 93 and 94 may be provided at the end of the pump. In this case, the outlets 93 and 94 lead to the inlets of the main pump. The outlet passages 89, 90, 91 and 92 are connected each to one of the hydraulic motors of the vehicle through pressure fluid lines. Owing to this arrangement, a fixed proportionality, in particular equality, of the rates of flow in all of the four circuits is assured, with two of the flows being jointly adjustable.

While the mentioned volume regulators can be a portion of the assembly of the Figures, they are commonly eliminated, when the pump of Figures, is applied in the vehicle of the purpose of FIG. 1 of the invention. In the specific vehicle of the present invention, the mentioned by-pass valves of a sister patent of the grand parental application are also not provided, when the vehicle of the gist of the present invention shall be build.

In the embodiment of FIGS. 2 to 6 which may analogously be applied also to other embodiments of the invention, the propellers are enclosed in shroud members 260–263 which are hinged by means of bolts at 271–276 to trifurcated extenion arms of body 259 and, thereby, made orientable in the flight direction. The hydraulic motors with the propellers are mounted within the shrouds and each produce an air jet. These jets may be oriented with the aid of the shrouds in all directions, in particular, forwardly, backwardly or downwardly, so that the vehicle may move up vertically, touch down vertically, move forward or backward, or brake its movement in the air. The mechanism for the orientation is actuated from the pilot's cabin 59. A connecting mechanism, comprising rods 293, joints 298, levers 291, 252 and joint members 294–297 is provided assuring a simultaneous pivotal movement of the shrouds. Naturally, any other appropriate mechanism assuring a synchronous orientation of the shrouds may be provided instead of the mechanism shown in the figures.

The vehicle represented in FIGS. 2 to 6 is a particularly short vehicle which may be used as a fully operational and reliable combined air-road vehicle nevertheless. While running on a rod, the vehicle body 259 with the cabin 59 reposes by its own weight on the lowerable undercarriage 145 supported by wheels 54. Special locking means for the travel on roads may be provided. When taking off into the air, the undercarriage 145 sinks below the body 259 and, owing to its own weight, remains in this position in which it may also be locked. The propeller shroud members are suspended from a supporting structure 276–278 which projects from the body 259 to both sides, and comprises six arms 271 to 276, as may particularly be seen in FIGS. 2 and 3. These figures also show the hydraulic motors, including each two rotors 61 to 65 and 71 to 75 as well as the propellers 258 and their direction of rotation which, however, may be inverted. FIG. 2 shows the propeller shrouds in a position for vertical ascent; FIG. 4 shows the same shrouds in a position for forward flight, and FIG. 5 shows a position for braking or backward flight.

The length of the vehicle of FIGS. 2 to 6 is between 3 and 5 m, which corresponds to the length of conventional automobiles, and the width of the vehicle is about 2.50 m or less in order to be admitted on highways. In view of the limited width given by the road traffic regulations, the propeller cannot have a larger diameter than approximately 1 meter. Such propellers have a relatively low efficiency and a very small lifting power, if small driving powers are considered. In consequence, for a load of four persons, the vehicle requires approximately 1200 HP of driving power, according to the desired speed of flight. This power is generated by two driving engines, each engine driving a four-flow pump which is designed in accordance with the invention. Each fluid flow of one of the pumps drives one of the rotors of the hydraulic motors associated with the propellers and the fluid flows of the other pump drive, each the other rotor of the respective hydraulic motor. If only one or two persons, and thus a smaller weight is considered, a correspondingly smaller driving power may be provided. In addition, in accordance with the invention, instead of two driving engines and two four-flow pumps, another number may be provided is the interconnection of the pressure fluid lines is adapted thereto.

The power capacity to be installed in a vehicle as shown in FIGS. 2 to 6 is relatively high and the fuel consumption is accordingly higher. Therefore, it is desirable to design an operative air-land vehicle requiring less driving power. The difficulty is that for being admitted on the road, the vehicle must not be wider than about 2.50 m. Thus, in vehicles according to FIGS. 2 to 6, there is no space available for providing propellers with a larger diameter which would permit obtaining a higher helicopter-like efficiency and which would reduce the necessary driving power.

A SHORT DEFINITION OF THE INVENTION, f.e of FIG. 1, may also be written as follows:

1. A vehicle capable of travel in air, comprising, in combination, a structure of substantial symmetry around an imaginary longitudinal medial plane, hydraulic power supply means, fluid times, which may form portions of said structure, extending from outlets of said supply means to fluid motors, at least a pair of front propellers and a pair of rear propellers driven by said motors,
wherein
each of said pairs of propellers includes a right propeller and a left propeller arranged substantially symmetrically on opposite sides of said medial plane, said supply means expels four separated flows of fluid out of four separated outlets through four separated lines of said fluid lines to entrance ports of said motors individually, two of said flows are of equal rate of flow and directed to the motors of one of said pairs of propellers and third and fourth flows are variable exclusively in unison and exclusively under maintainance of equal rates of flow in said third and fourth flows and directed to the other pair of said propeller pairs, and,
wherein said third and fourth flows are subjected to a common control means to prevent departure of one of said third and fourth flows from said maintenance of said equal rates of flow.

Or, additionally;
wherein said control means controls in unison the variability of said third and fourth flows, said variability controls the rotary velocity of the propellers of one of said propeller pairs relatively to the velocity of the propeller pairs relatively to the velocity of the said propeller pairs and thereby the inclination of said vehicle in the direction of said pairs of front- and rear-propellers and thereby around an imginary axis normal to said medial plane and through said medial plane, whereby said control means controls the forward inclination of said vehicle and thereby at least partially the flight speed of said vehicle.

Or; additionally with specific attention to FIGS. 8 and 9:
wherein said control means 99 includes a housing portion 144 with a hollo inner space 340,440 and a control piston 143 axially moveable in said hollow space,
wherein said control piston is connected to the stroke adjustment 99 and thereby to the rate of fluid delivery adjustment device of a variable pump 81 which supplies said variable third and fourth flows, 91, 92,
wherein said hollow inner space is closed by end portions 244,344 on the axial ends of said hollow space and said end-portions contain recesses,
wherein said control piston 143 has a piston rod 299 and an extension, 399, with said piston rod extends through one of said end portions and out of said hollow space, while said extension 399 extends through the other of said end portions and connects to said stroke- and rate of flow adjustment device 99, while said rod and said extension are sealed against losses of fluid in said recesses in said end portions,
wherein said control piston has a first axial length and said inner space has a second axial length between said end covers,
and, and,
wherein said first and second axial length define a difference, which restricts the ability of said control piston to move in said inner space to such a short stroke, that the thereby controlled rate of flow adjustment is of such a minor rate, that it limits the differences of the speeds of the front propellers and the rear propellers to such a small rate of difference, that the vehicle is prevented from any forward or rearward inclination, which would fail to maintain the stable flight without too steap an ascent or descent of said vehicle.

Figure 19:
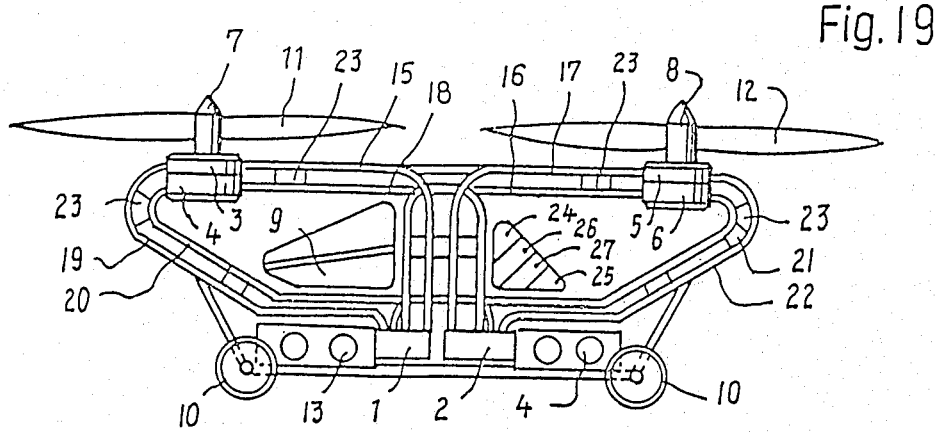
FIG. 19 shows another vehicle of the invention, seen from the side.
Figure 20:
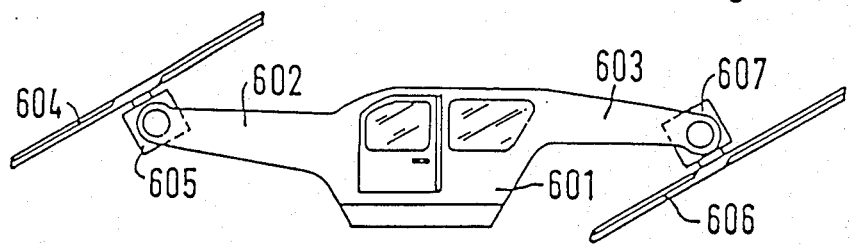
FIG. 20 shows a further vehicle of the invention, seen from the side.

Referring to the drawings in particular, the invention embodied therein, as shown in FIG. 19, comprises a combined vehicle for traveling in the air and rolling on the ground. In accordance with the invention, the vehicle includes a body structure including the pilot's cabin 9 and an undercarriage including wheels 10. The driving system comprises driving engines 13 and 14, such as internal combustion engines, gas turbines, or the like, hydraulic pumps 1 and 2, hydraulic conduits 15-22, two rotary hydraulic motors which include rotors 3 and 4, and 5 and 6, respectively, driving shafts 7 and 8, in propellers 11 and 12. The hydraulic pumps furnish each two separated pressure fluid flows, whose rates of flow are equal or in a fixed proportion, to each other. Wheels 10 may also be driven by hydraulic motors and switching valves may be provided for alternately connecting the hydraulic circuits to the wheels. The cabin 9 may also receive passengers or cargo. Fuel tanks 26 and 27 are provided, and tanks 24 and 25 are provided for the hydraulic fluid. Advantageously, one tank of hydraulic fluid is provided for at most one or two hydraulic circuits, so that in case of failure of one of the tanks or rupture of one of the lines, only one circuit is interrupted and the other circuit or circuits can still be supplied from their associated fluid tanks. Shafts 7, 8 are parts of the motors 3,4 or 5,6. The construction of the hydraulic motors is illustrated in my U.S. Pat. No. 4,173,321. As for the circuits, the first pressure fluid flow passes from pump 1 through an uninterrupted pressure fluid line 15 to and through the rotor 3 of motor 3, 4 and through a return line 19 back to the pump 1. The second pressure-fluid flow of the hydraulic pump 1 passes through an uninterrupted pressure fluid line 16 to and through the rotor 6 of hydraulic motor 5, 6 and through a return line 21 back to the pump 1. For pump 2, the first pressure fluid flow passes through an uninterrupted pressure fluid line 17 to and through rotor 5 of the hydraulic motor 4, 6 and through a return line 22 back to the pump 2. The second pressure fluid flow of hydraulic pump 2 passes through an uninterrupted pressure fluid line 18 to and through rotor 4 of hydraulic motor 3, 4 and through a return line 20 back to the pump 2. Supporting ribs 23 may be provided between the individual pressure fluid lines.

Owing to the arrangement, according to FIG. 19, even if one of the driving engines 13 or 14 fails, hydraulic motors 3,4 and 5, 6 and thereby, the propellers 11 and 12, continue to be driven by the other engine and pump and by the hydraulic motors associated therewith. Also, in case of failure of one of the rotors in the hydraulic motors, the other rotor continues to rotate because the stopped rotor disengages from the propeller driving shaft 7 or 8 due to the coupling, illustrated in FIGS. 2 and 3. The reliability in operation obtained by the described arrangement in accordance with the invention, is also applied to the other embodiments of the invention, only the description of the system is not repeated in the text hereinafter. However, all of the systems used in other embodiments are derived from this basic system illustrated in FIG. 19 and designed analogously.

The power capacity to be installed in a vehicle as shown in FIGS. 2 to 5 is relatively high and the fuel consumption is accordingly higher. Therefore, it is desirable to design an operative air-land vehicle requiring less driving power. The difficulty is that for being admitted on the road, the vehicle must not be wider than about 2.50 m. Thus, in vehicles according to FIGS. 2 to 5, there is no space available for providing propellers with a larger diameter which would permit obtaining a higher helicopter-like efficiency and which would reduce the necessary driving power.

Figure 17:
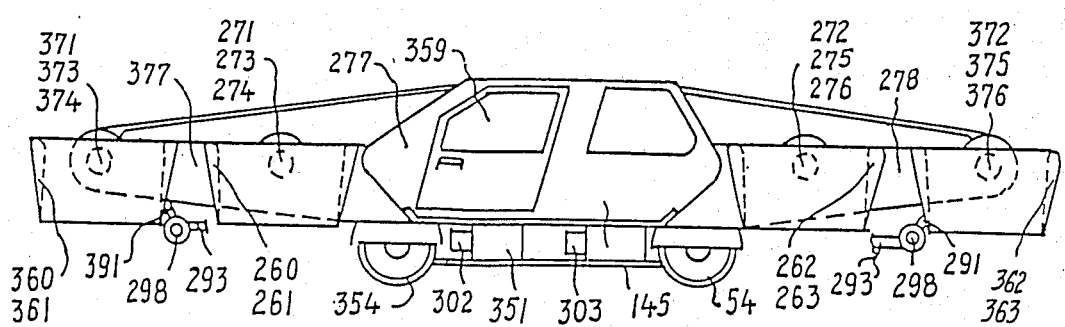
FIG. 17 illustrates still another vehicle seen from the side.
Figure 18:
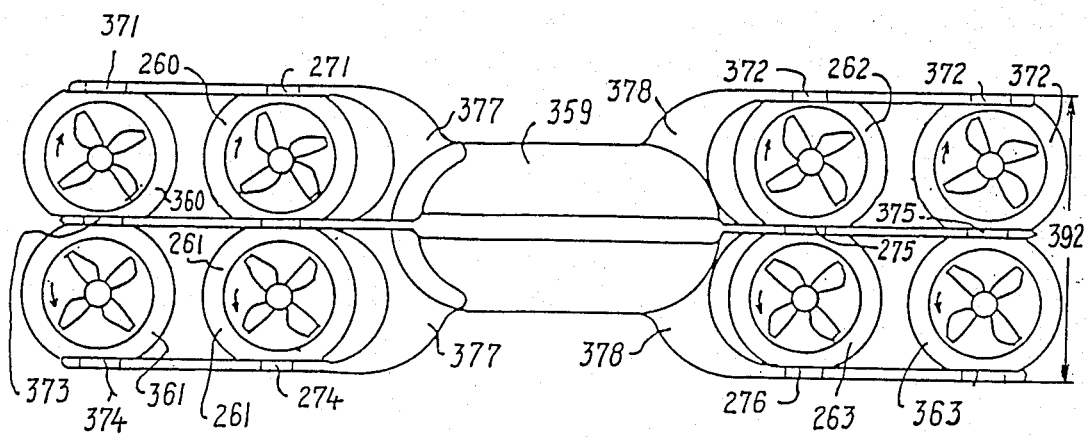
FIG. 18 shows the vehicle of FIG. 17 seen from above.

This problem is solved by the embodiment according to FIGS. 17 and 18. In this embodiment, instead of providing two shrouded propellers in front of and two behind the cabin 359, four shrouded propellers are provided ahead and four in the rear. The propellers and shrouds are of the same size as seen in FIGS. 2 to 5 without requiring a larger width of the vehicle. Consequently, the vehicle can be admitted on highways, the more so, since the propellers are shrouded and cannot hurt anybody. By doubling the number of shrouded propellers, the air volume taken in by the propellers is also doubled so that the individual propellers can work under smaller load and with higher efficiency. Thus, vehicles in accordance with FIGS. 17 and 18 require a substantially smaller driving power for the same carrying capacity. For example, two Porsche six-cylinder 210 HP-motors of the known Porsche automobile type are sufficient to drive two four-flow pumps shown in FIG. 35 so as to make an operable vehicle for four persons of the kind represented in FIGS. 17 and 18, both on the road and in the air. According to the desired driving power, 300 to 600 HP may be installed in this vehicle. The vehicle body 277 comprises a cabin 359 and wheels 54, and the driving engines 351 and four-flow pumps 302, 303 are mounted on the undercarriage 145. The supporting arms 377 and 378 extend from the central part of the vehicle to both sides, one in the forward and one in the backward direction, and their end portions are provided with means for mounting the orientable shrouded propellers, for example, with joint bolts 271 to 276 and 371 to 376 for the shrouds 260 to 263 and 360 to 363, respectively. The actuating mechanism for the synchronous orientation of all of the shrouds are indicated at 293, 393, 391 and 298.

The four fluid flows of the one four-flow pump drive the motors in inner shrouds 260 to 263 and are correspondingly connected through pressure fluid lines. The four fluid flows of the other four-flow pump drive the motors in the outer shrouds 360 to 363. Should the inner driving system fail, the outer system continues to operate and inversely so that even if a half of the drive fails, the remaining motors are sufficient to make a safe landing. The speeds of the propellers in all of the inner shrouds 260 to 263 are mutually synchronized by the four-flow pump supplying separate fluid flows having mutually equal rates of flow. The propellers in the outer shrouds 360 to 363 are analogously synchronized by the separate fluid flows of the other four-flow pump. The propellers disposed to the left and to the righthand side in the travel direction of the vehicle are rotated in mutually inverse directions which is easily obtainable by inverting the connections of the hydraulic motors. Four four-flow pumps are provided with propellers driven by hydraulic motors, each having two rotors, as described hereinbefore. The advantages and features of the other figures might be combined, if desired, with those of FIGS. 17 and 18. The data of the engines of FIGS. 17 to 18 are those of the time of filing my application Ser. No. 465,413 of 1974. The powers per weights of those engines are now much higher.

Figure 35:
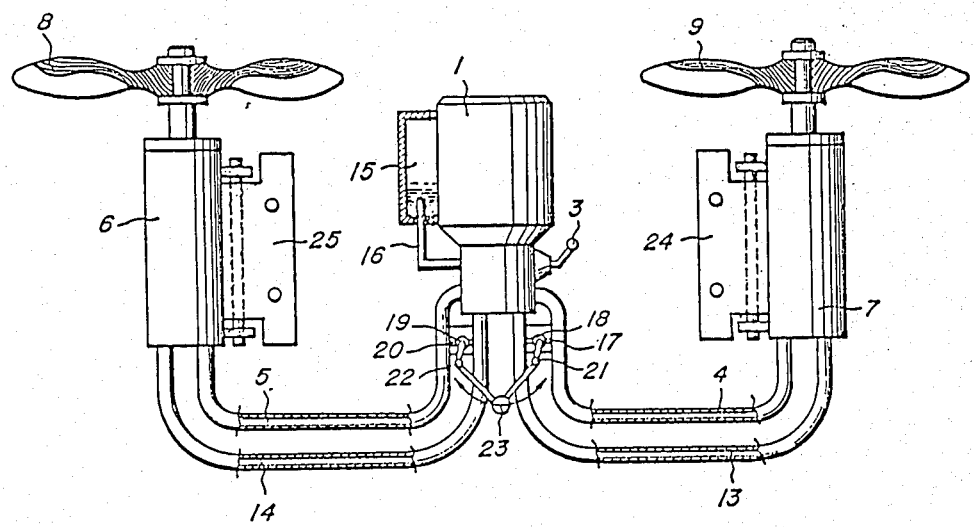
FIG. 35 is a partly sectioned view illustrating a hydrostatic power supply according to the present invention.

FIG. 35 shows a high-pressure fluid operated pump for producing four separate fluid flows which, in view of its tightness and reliability in operation, is particularly suitable for the driving of hydraulic motors used in the vehicles in accordance with the invention. In this pump, the rotor comprising the delivery chambers or cylinders is flowed through axially from and to both sides. In particular embodiments, instead of four fluid flows, six, eight or another number, for example, three, five or seven, may be provided.

Such a pump or motor producing, for example, four fluid-flows is intended for high pressures, performances, and efficiencies and reduces or eliminates the drawbacks of the known four-flow pumps thereby permitting to design and realize four-wheel drives for land vehicles and four-propeller or four-flow drives for aircraft. The pump according to the invention may of course also be used for general, less exacting purposes in the industry, because this construction is simple and therefore not too expensive.

In accordance with the invention, the result is obtained by providing in the rotor, for example, four groups of cylinders receiving and delivering the fluid of which two groups are associated with passages conducting the fluid in one axial direction and the other two groups with passages conducting the fluid in the other axial direction. The fluid passages terminate on the rotating end surfaces of the rotor which cooperate in a sliding and sealing relationship with opposite stationary end surfaces of pressure inserts which are formed with corresponding fluid inlet and outlet ports and passages. The sliding of the rotary motor end surfaces on the stationary end surfaces is made particularly tight by means of a contact pressure arrangement.

The pump comprises a housing 311 covered on the axial sides of the pump by closures or covers 316, 317. The rotor 301 is rotatably mounted in bearings 334 and provided with groups of cylinders 302-305 through which the pressure fluid circulates. The housing 311 also encloses a slide block 309, guide segments 310 therefor, a radial bearing 312 supported by the slide block 309 and a reaction ring 306 rotatable in the bearing 312. The reaction ring 306 may also be designed as a stationary member, and if a non-adjustable pump is provided, the slide block 309 and the guides 310 may be omitted.

Rotor 301 is formed with at least four groups of cylinders 302, 303, 304 and 305, cooperating with displacers or pistons 307. The volume of the working chambers increases during the intake stroke and decreases during the delivery or pressure stroke. The stroke of the pistons is produced by the reaction ring 306 against which the pistons apply by means of guide members or piston shoes 308 which may be held in their position by inner guide rings 315 received in corresponding recesses provided in the outer surface of rotor 301. In a known manner, each group of cylinders comprises a plurality of individual cylinders. The rotor 301 may be made in one piece with the driver shaft 335 or may receive the shaft in its bore and be secured to it by keying 345. The shaft 335 is, in addition, mounted in bearings 336.

In accordance with the invention, the groups of cylinders 302, 303, 304 and 305 are completely separated and cannot communicate with each other. The fluid is supplied and discharged in the axial direction and the respective fluid passages of two groups of cylinders extend in the one axial direction, and the passages of the other two groups extend in the other axial direction. Also in accordance with the invention, both of the axial ends of rotor 301 take the form of a rotary surface, for example, a radial plane or a spherical or conical end surface, and the fluid passages terminate on these surfaces forming rotor fluid ports. Thus, rotor ports 322. 323 of the cylinder groups 304, 305 lead to the lower end surface (as seen in FIG. 35), and ports 324, 325 of the cylinder groups 302, 303 lead to the upper end surface. Ports 322, 323, as well as 324, 325, are mutually offset in the radial direction, in accordance with the disposition of the respective cylinder groups.

Figure 44:
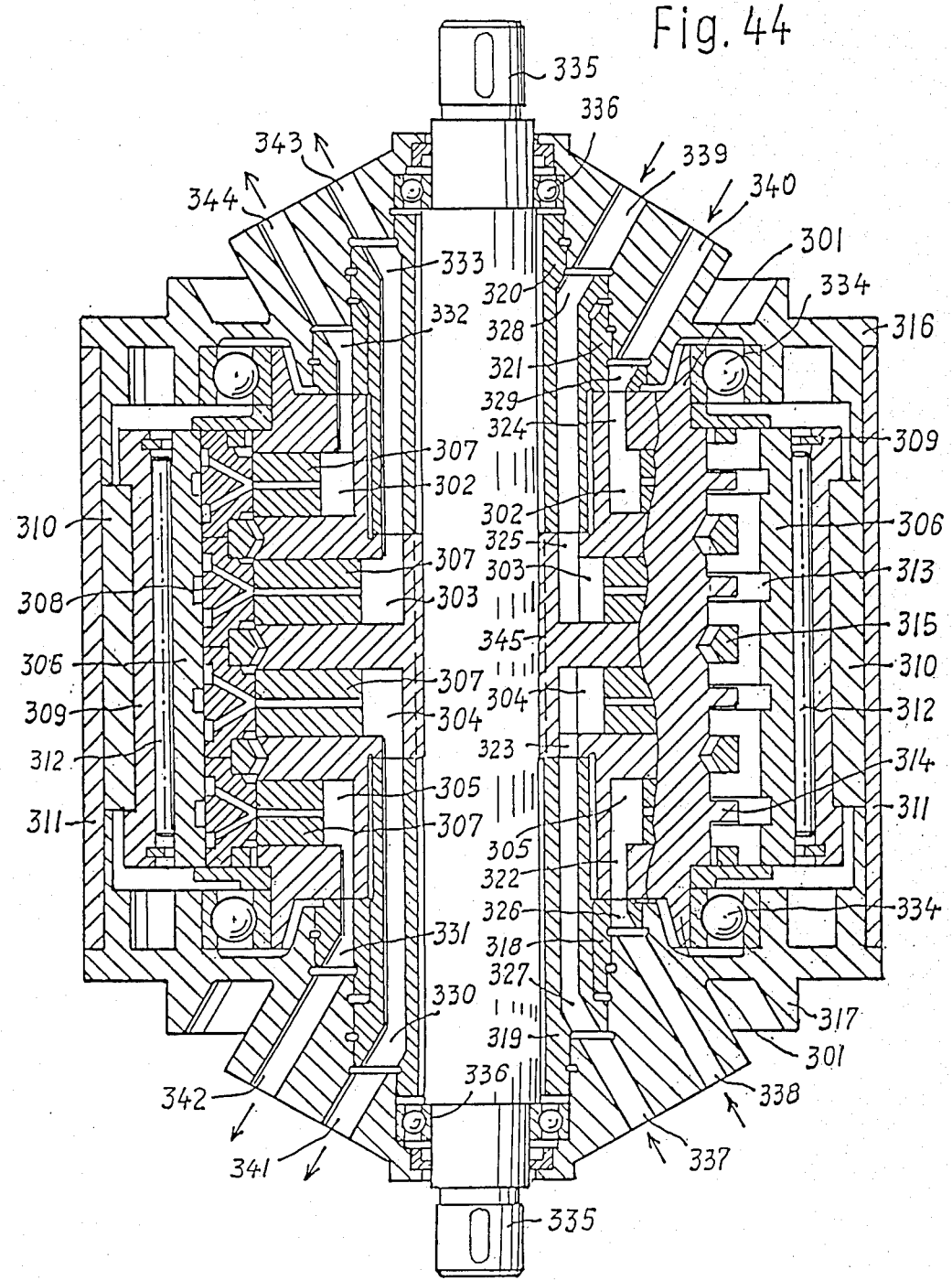
FIG. 44 is a longitudinal sectional view through a multi-flow pump.

In order to obtain a particularly tight sealing between the rotary and the fixed parts of the pump, and thereby, a high efficiency and capability of the pump to work under high pressures, there is provided, in accordance with the invention, to interpose between the outer connections and the rotor stationary pressure insets. The pressure inserts are provided at each axial end of the rotor and may be made of a one-piece construction or assembled of more pieces and are substantially intended to serve as intermediate members with tightly apply, with their inner end surfaces against the opposite conformable rotor end surface and which are formed with inlet and outlet ports and fluid passages connecting the ports to the outer connections of the pump. In the present embodiment, shown in FIG. 35, at each axial end of the rotor 301, there are provided two partial pressure inserts, an outer one 318 or 321, and an inner one 319 or 320, mounted between the respective cover 316, 317 and the rotor and coaxially surrounding the shaft 335. A corresponding number of passages is provided in the pressure inserts, in the present case, two outlet passages 332, 333 or 330, 331 and two inlet passages 328, 329 or 326, 327 which are mutually offset in radial direction and operatively aligned with the associated two groups of rotor ports 322, 323, 324, and 325. The contact surface or surfaces of the pressure inserts, i.e., the surfaces by which they operatively apply against the rotor, may be continuous or divided in radially inner and outer surfaces and may be axially spaced from each other. In the embodiment of FIG. 44, the inner pressure insert 319 or 320 is placed in a bore of the outer pressure insert 318 or 321, and is fixed in the latter against rotation but can move axially relative thereto. The shaft 335 extends through the bores of the inner pressure inserts 319 and 320.

The inner end surfaces or contact surfaces of the pressure inserts are stepped in conformity with the shape of the rotor 301 so that two in axial and radial direction mutually offset and separate partial contact surfaces are formed both on the rotor and on the pressure inserts. Consequently, each group of rotor ports 325, 324, 323, 322 is associated with the corresponding inlet and outlet ports on the stationary contact surfaces of the pressure inserts applying against the rotor end surfaces. The respective fluid passages 326-333, provided in the pressure inserts, terminate with axially outer ports and connect the inlet and outlet ports adjacent the inner end surfaces, i.e., the stationary contact surfaces and thereby the rotor ports 322-325 to the associated pump connection passages 337-344 provided in the covers 316, 317 leading to the outer inlet and outlet connections of the pump. None of these passages communicates with any other. Therefore, the fluid flows passing through the pump remain separated from each other and, provided the pistons have mutually equal cross-sectional areas and strokes, the rates of flow are equal to each other in all four flows, irrespective of their internal pressure. If the displacements are mutually different, the rates of flow are no more equal, but in another fixed proportion, to each other. Instead of maintaining the equal or proportional flow volumes, the flows may also be interconnected to that the individual flows merge. However, this is seldom desired and the main advantage of the inventive machine is just the arrangement permitting to hold the individual fluid flows completely separated from each other and thus to maintain the equality of proportionality of the rates of flow whatever the pressure may be. In the embodiment shown, the pistons 307 have a single reaction ring 306 which is common to all of them. The mutual equality or proportionality of the different rates of flow is thereby produced forcibly. In addition, it is also possible to associate each group of cylinders with an individual reaction ring. Such a ring may provide for a constant or adjustable stroke. An arrangement of four or more independently adjustable reaction rings for a corresponding number of different fluid flows is particularly useful, for example, in the design of construction machines, excavators, cranes or machines having to operate in several different locations at different speeds or in a controlled manner. By individually controlling the stroke of different groups of cylinders, the working members to be driven can be accurately controlled as to their speed and direction of motion. The arrangement with a common reaction ring 306, shown in FIG. 35, on the other hand, is particularly expedient for vehicles with a four-wheel drive or for assuring the synchronism of four or eight aircraft propellers. In such cases, motors or mutually equal capacities are forced to rotate at mutually equal speeds because they are supplied with mutually equal pressure fluid volumes by a machine in accordance with the invention.

The control surfaces of the pressure inserts 318-321 operatively apply against the conformable contact or end surfaces of the rotor 301. In normal cases, i.e., if no pressure inserts are used, the fitting tolerance between the contact surfaces is substantially constant but must be very small if an appropriate sealing is to be obtained. By using pressure inserts, in accordance with the invention, this sealing contact is considerably improved. Each pressure insert has an eccentric shoulder engaging in a corresponding eccentric recess provided in the respective cover 316, 317 so that two different axially outer surfaces are formed on each pressure insert which is tightly fitted in the cover. Consequently, two narrow pressure chambers are formed at the axially outer side of each pressure insert, for example, the chambers 345, 346 at the pressure insert 319, the fluid pressure in these chambers urging the pressure inserts in axial direction tightly into a sealing contact with the respective rotor end surfaces. The eccentricity plane of the eccentric parts of the pressure inserts 318-321 is approximately perpendicular to the eccentricity plane of the stroke adjusting slide block. In case the machine is intended for delivering in both directions, pressure chambers of mutually equal size are provided on each of the pressure inserts. The active area of the pressure chambers is provided slightly, for example, by 3 to 9% larger than the corresponding contact area between the cooperating end surfaces if mutually equal pressure conditions are considered.

Thus, a particularly reliable, tight, low friction machine is obtained for the control of four or more fluid flows which is very efficient even at high pressures. Moreover, the construction of the machine is simple and uses a shaft extending therethrough so that further mechanical power may be drawn off or further pumps may be connected thereto.

Figure 26:
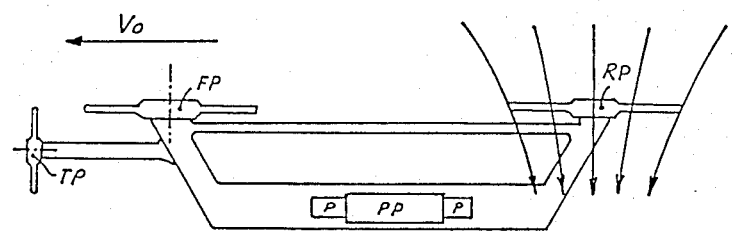
FIG. 26 is another schematic for the analysis of the invention.

FIG. 26 explains the basic values of the physics involved with helicopter propellers. Figure portion "B" explains the propeller with its medial chord "B" and with its integral medial resistance and torque responsive integral radius "R". This integral medial radius is 0.7 in blades with equal chord "B" but it reaches higher values, for example at up to higher than 0.77 in the propeller types 3 of FIG. 30. FIG. portion "C" shows the airstream through the propeller, from which the equations and novel results of my earlier application 05-973,780, now Pat. No. 4,358,073; are obtained. Figure portions "D" and "E" demonstrate how the situation of Figure portion "A" is changing, when the axis of the propeller is inclined. "D" shows the range of economic helicopter flight, where the power required is less than in hovering, while portion "C" shows an uneconomic speedy flight range, where the power required is higher than in hovering and much higher than in the economic flight of "D" at lower speed. For the calculation of the propeller usually the angle of attack "delta" of Figure portion "A" is to be used. Since, however, the propeller at hovering or at vertical flight must also accelerate the airstream of Figure portion "C", the propeller will at this stage have to use the angle of attack "alpha". The angle of attack "beta" is then the angle of attack required to accelerate the airstream of Figure portion "C". This angle of attack and this power required thereby is commonly much higher than the angle of attack "alpha" and the power required by it.

When, however, the helicopter flies forward with a certain forward speed "Vo" the propeller moves out of the downward airstream of Figure portion "C" whereby the angle of attack required reduces to "delta". The power required is then drastically reduced and the economic flight range of Figure portion "D" is obtained. When a constant pitch of angle "alpha" is used, the RPM of the propeller can be and will be respectively reduced, whereby the power requirement reduces.

In the craft of FIG. 1 the prevention of crashes by pilot errors was secured by the application of the pump of FIGS. 8 and 9 to the front propeller pair and to the rear propeller pair. The analysis of the present invention now brings, that the extension of the chambers 144 on top and below the control piston 143 of FIG. 9 should be axially respective to the axis of the control shaft 199 be restricted to roughly fifteen percent of the maximum of stroke of the pistons 137 of the Figure. If the flows of FIG. 9 are led to the front motors 3 and 4 to drive the front propellers 7 and 8 of the craft of FIG. 1, the ability to move of the control shaft 199 should be restricted by the top of chamber 144 to reach the maximum of piston stroke and the bottom cover of chamber 144 should restrict the shortening of the piston stroke to eightyfive percent of the maximum of length of piston stroke. Thus, the axial length of control piston 143 and the locations of the covers of control chambers 144 of FIG. 9 and thereby the axial lengths and locations of chambers 144 of FIG. 9 must provide these limits of variability of the piston strokes of the pump of FIG. 9 when communicated to the front propellers. If the flows of this pump of FIG. 9 are communicated to the rear motors 5 and 6 of the rear propellers 9 and 10 of FIG. 1, the limit of axial extension of chambers 144 should be 100 to 118 percent of the strokes of the pistons of the pump in housing portion 140 in Figure, in order to increase the rotary velocity of the rear propellers until 18 percent over the rotary speed of the front propellers.

Figure 28:
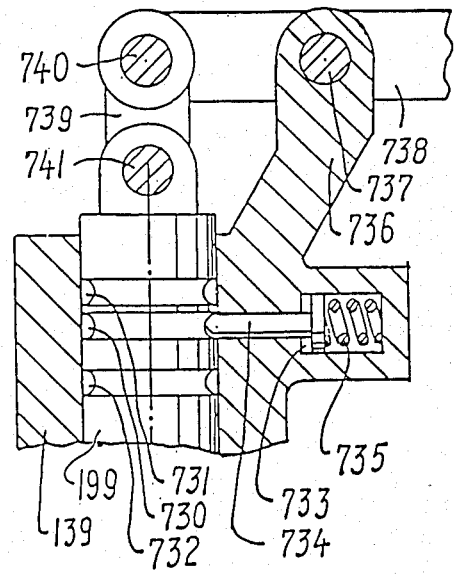
FIG. 28 is a sectional view through a controller of the invention.
Figure 27:
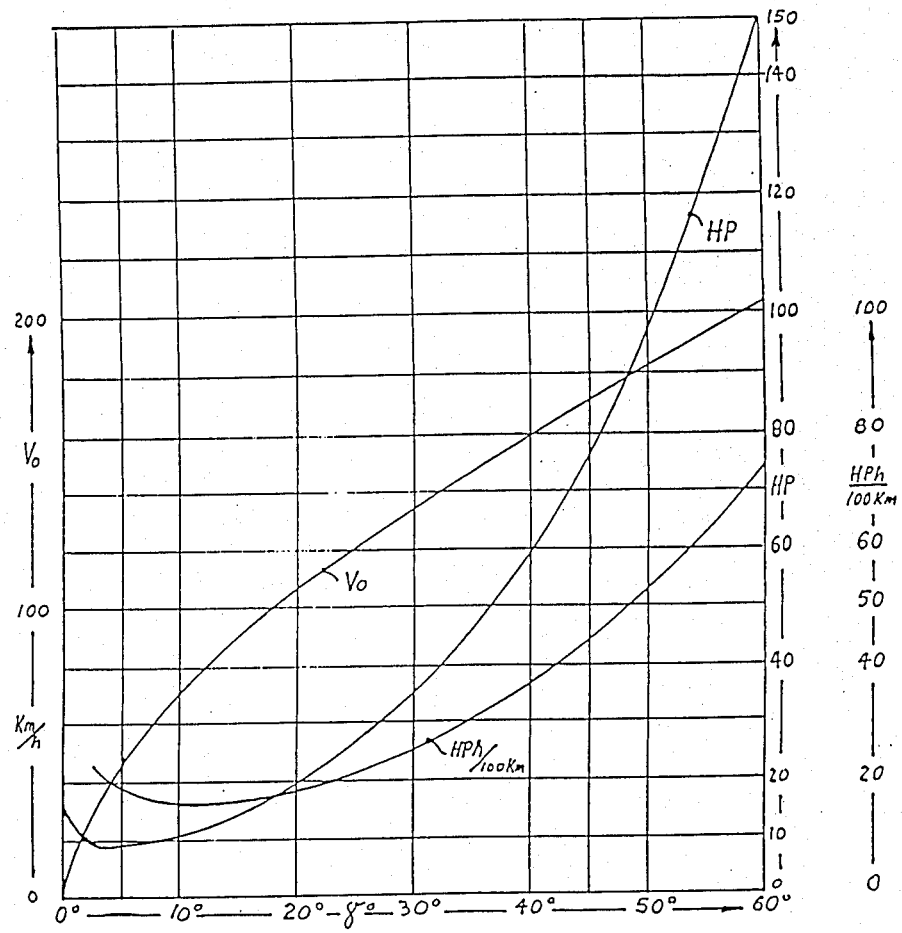
FIG. 27 is a diagram for the schematic explanation of the invention.

FIG. 28 shows an alternative control arrangement for the control of the rate of flow of fluid or of power to a drive means of a front propeller or of a rear propeller of a vehicle with substantially vertical propeller axes of propellers on a front portion and on a rear portion of a vehicle. The Figure will now be explained under the assumption that the controller is provided to control the rate of power to the front propeller while the rate of power to the rear propeller is fixed. In one application of may possible applications of the controller of FIG. 28 the controller is used to control the piston stroke and thereby the delivery quantity of the flows of fluid out of the pump of FIG. 9 and the pump in housing portion 139 of FIG. 8. The control piston 143 of FIG. 8 is now in FIG. 28 replaced by the control piston shaft 199. But the control piston shaft 199 may also be provided on top of the control piston and control chambers 144 of FIG. 8, especially if a power transfer means is provided to enforce the effectivity of the movement of control piston 199 of FIG. 28 over that of the piston and chambers 143 and 144 of FIG. 9.

The control shaft 199 is axially along its axis moveable in the controller housing 139. The control shaft 199 is connected to the rate of power control means. For example, to the piston stroke control ring 99 of FIG. 9 in such a way that the movement of control shaft 199 upwards increases the rate of power, for example, the piston stroke and a movement of the control shaft 199 downwards in the figure reduces the rate of power, for example, the piston stroke of the pistons 136,137 of FIG. 8. The embodiment of FIG. 28 is now provided with a holding portion 736 to bear thereon, for example, by pin 737 the control handle 738. The control handle has a portion which is connected, for example, by pin 740 to a medial connecter(s) 739 which is connected to the control piston 199, for example, by pin 741. Thus, a swing of the control handle 738 will move the control shaft 199 up and down in the housing portion 139 and thereby increase or decrease the rate of power supplied to the respective transmission means. For example, the rate of piston strokes and the rate of flow of fluid from the pump of FIG. 9 to the front motors of the front propellers of a vehicle; for example, that of FIG. 1 or 6. The housing 139 is further provided with a guide bore and a spring housing 733. In the guide bore an arresting pin 734 is axially moveable and subjected on its rear end to the pressing force of the spring 735 in spring housing 733. The control shaft 199 is provided with three arresting recesses 731 to 732 into which the tip of the arresting pin 734 can engage and arrest the axial movement of the control piston 199. The head or tip of arresting pin 734 may be a half ball and the arresting recesses 730 to 732 may be hollow recesses with radii in cross section which are forming the recesses complementary to the ball line of the head of the arresting pin. Thereby the pin 734 can arrest the movement of shaft 199 in the positions of recesses 730 to 732 respectively; but the stronger force of the handling of the control lever 738 can disarrest the control shaft 199 by forcing the arresting pin rearwards against the force of the spring 735.

The embodiment now makes possible and secures that the recess 730 sets the rate of power to be suitable for a vertical flight. Thus, when the arresting pin enters into recess 730 and arrests the control shaft 199 in this position the rate of flow of power to the front propellers will be equal to the rate of flow of fluid to the rear propellers. The vehicle is now capable of vertical flight, namely of vertical take off, ascent, hovering, descent and vertical landing. If the control lever 738 forces the control piston shaft 199 downward, for example, by the control action of the pilot, the arresting pin 734 will enter into the arresting recess 731. Arresting recess 731 is located at such a position on the control shaft 199 that at the arresting of recess 731 the rate of flow of power to the front propellers is just that rate which is the best rate of flow of power or of pressurized fluid to revolve the front propellers with such a rate of rotary velocity that the vehicle obtains the best forward inclination for a best forward speed for economic forward flight. The analysis brought that the recess 731 should no maximally permit 85 percent as a minimum of rate of power relative to the maximum of rate of power. For the best forward speed the rate of power may be higher than 85 percent of the maximum of power, depending on the design of the craft. The 85 percent were in the analysis of this application considered to be the rate of power reduction maximally permitted to maintain secure location and flight of the vehicle without a possibility of crash of the vehicle by a pilot error. The most economic forward flight speed may be and mostly will be a higher percentage than 85 percent of the maximum of power or of piston stroke. The rate of variability will then be lower than 15 percent of the maximum of the stroke. The arresting recess 731 would then be set to the most economic forward speed range and that may be more than 85 percent of the maximum of piston stroke or of power and the arresting pin 734 entering the respectively located arresting recess 731 would then arrest the control shaft 199 in the position of the most economic forward flight range.

Since suddenly another craft might come into the flight path of the vehicle the craft of the invention should be able to very suddenly brake its forwards speed and to stop in the air. In such case the craft must be rapidly and deeply inclined rearwards. Such a position of the craft is obtained by using the control lever 738 to lift the control shaft 199 upwards so far that the arresting pin 734 enters into the braking arresting recess 732. This recess is farther distanced from the recess 730 than the recess 731 since the braking of the forward speed of the craft might be required to appear suddenly to avoid a collusion with the other craft which may move with high speed into the forward flight path of the own vehicle. Thus, the craft would now steeply incline rearwardly when the arresting of the pin in the recess 372 is effected. The pilot must now take care that the arresting in recess 732 dures only a very few seconds until the forward speed of the craft is braked because to long arresting in the position of braking recess 732 would very soon result in the descent of the craft under the too steeply inclined rearward inclination. This again appears from the analysis of the technologies involved. This situation is anyhow an emergency situation and it will rarely be used but the pilot must be trained to know that the recess 732 is not for a rearward flight but for a sudden brake of the forward speed of the craft and that his craft will crash by lack of lifting capacity of the propellers under too steep a rearwards inclination if the craft would stay too long in the arresting position of pin 734 in recess 732. The arrangement might be reversed if the controller 199 deals with the increase of speed and decrease of spead for braking of the rear propeller(s).

Figure 51:
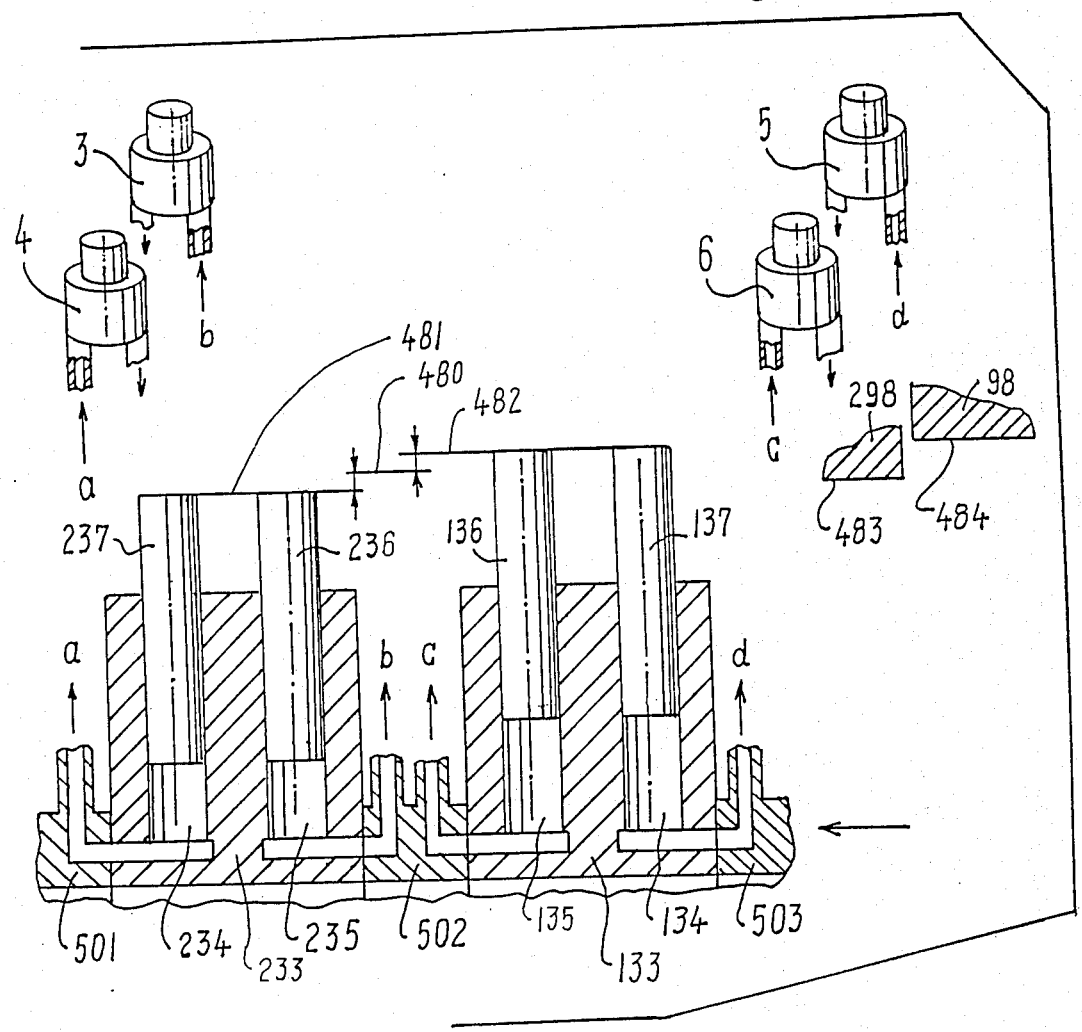
FIG. 51 is partially a sectional view with partially a perspective view of a device of the invention.

FIG. 51 illustrates in a partially spherical view and partially in sectional view the application of the pump of FIGS. 8 and 9 to a craft of, for example, FIG. 1 or 6, and, in particularity, the effect of the control arrangement of the pump in relation to the effect on the vehicle. Rotor 133 is that of housing portion 140 and rotor 233 that of housing portion 140 of FIGS. 8 and 9. The pistons 136 and 137 are reciprocable in the cylinders 134 and 135. These pistons deliver through the separated outlets the separated flows of equal rate of flow to the motors 5 and 6 of the rear propellers. The fluid lines are "c" and "d" and they are interrupted in the Figure but the cutting lines indicate that the outlet "c" of the pump is communicated uninterrupted to the entrance "c" of motor 6 while the outlet "d" of the pump is uninterrupted communicated to the entrance "d" of motor 5. The other rotor 233 has the cylinders 234 and 235 with the pistons 236 and 237 reciprocable therein. The outlets of this pump are outlets "a" and "b" which are separately and uninterruptedly communicated to the inlets "a" of motor 3 and "b" of motor 4 respectively. Line 480 now indicates the maximum of piston stroke of all pistons for vertical flight at which the rate of flow in all flows is equal and all piston strokes are equal. To restrict the variability and to provide the restricted variability in accordance with the analysis of the invention to prevent any crash of the craft py a pilot error the stroke control guide 298 for the control of the lengths of piston strokes of pistons 236 and 237 with its piston stroke guide face 483 can be moved downwards from 100 percent of stroke of vertical flight to 85 percent of the strokes of vertical flight, maximally. The strokes of the pistons 236 and 237 would then be restricted to the 85 percent of stroke, namely to the stroke where the pistons meet the bottoms of the cylinders to the strocke where the inner guide face of piston stroke guide ring 298 has the location of line 481 in the Figure. The front motors 3 and 4 will then revolve fifteen percent slower than the rear motors 5 and 6 and the vehicle would obtain its maximally permissible inclination for a respective forward speed without the danger of crashing by pilot error.

The right side of the Figure now shows a feature which is not directly shown in FIGS. 8 and 9, but made possible by them. In this case the stroke of the rear pistons 136 and 137 is permitted by the variability range of the rate of piston stroke by their piston stroke guide ring 98 to become increasable over the stroke limit of line 480 to eighteen percent longer piston strokes namley to the strocke from the bottom of the cylinders 134 and 135 to the meeting of the pistons with the line 482 which now presents the inner guide face 484 of guide ring 98.

The ratio of increase of 18 percent for the rear motors is the equivalent to 15 percent decrease of the rotary speeds of the front motors.

Commonly only one of the ranges of variability is provided for the craft of FIG. 1 or 6 because the application of both variability ranges which are shown in FIG. 51 would incline the craft too steeply if both are used at the same time and the craft could or would then crash. But both possibilities whereof a single one should be applied, are shown in FIG. 51 as possible two alternatives since only one of the alternatives is illustrated in FIGS. 8 and 9.

Conclusively the craft of the invention overcome a plurality of dangerous embodiments of my former art. The inclination control means of my former art patents were workable for experienced pilots but they included the possibilities of crashes by errors of pilots or by lack of training of pilots.

The flow through control means of the controls of my U.S. Pat. No. 3,253,806 were and are very effective. However the viscosity of hydraulic fluid which is used in the pumps, motors and fluid lines and which would thereby flow through the orifice controls of my U.S. Pat. No. 3,253,806 changes several times of ten at the temperatures wherethrough the craft flies. In winter the viscosity is about 30 or more times higher than in the hot summer. Thus, the orifice or cross-sectional control by valves is in the hot summer about thirty times differently effective than in the cold winter. Consequently, the control of inclination of an airborne craft by valve or orifice control is not safe means to prevent the crash of the vehicle by untrained pilots or by pilot errors. And my U.S. Pat. No. 3,614,029 was able to control the flight path of a two propeller vehicle but was not able to control the flight path of four propeller vehicles of FIG. 1 or 6 in forward directions because it had not available and did not provide the thereto required means of FIGS. 8, 9 and 51.

Of importance in the embodiments of the craft of FIGS. 1 and 6 is also that the application of the pumps of FIGS. 8, 9 and 51 must be provided rigidly relative to each other. Especially the rigid rate of speed of the rotors relative to each other must be secured. Also important is that the accurate functioning of the control of the rate of variability is secured relative to the rate of power of the other power portions. It is therefore preferred to have the rotors of the pump with four flows be related to each other by definite rates of gears or by providing them in the same housing and on the same shaft as shown in FIGS. 8 and 9 and 51. The piston stroke guide rings 98 and 298 are preferred also to be provided in the same housing, also in different portions thereof because otherwise the ratio of power to the front motors to the rate of power to the rear motors would not exactly be controlled.

For example, when I invented a quarter of a century ago the sum control of the power shovel which became my West German patent No. 1.188,981 and my Japanese patent 301,115 the industries produced axial piston pumps which are difficult to provide common controllers. The industries then provided an arm with two controllers to control the two variable pumps under my patents. Such a system is acceptable for machines or vehicles which work on the ground but it is not the safest means to provide a control of an airborne craft which would crash if tilted too steeply.

The analysis of this present application was primarily applied to the forward speed of the craft and to its inclination in forward direction. It brings, however, to light that the inclination appears already at only a few percent of the variation of the rate of power or of piston stroke.

The application of the analysis of the present application now also shows that an unaccurate supply of equalness of power to the motors or drive means of the propellers on the right and left of the vehicle will quickly tilt it sidewards. The control means of my U.S. Pat. No. 3,253,806 were therefore very delicate and could be handled only by acrobaticable pilots. The craft of my earlier U.S. Pat. No. 3,614,029 could never control the equalness of variation of power to both front motors or to both rear motors. It had no fluid flow creation means as such of the pumps of FIGS. 8, 9 or 51 available. The prevention of crashes of vehicles like that of FIG. 1 or 6 by the volumetrically accurately flows providing means of FIGS. 8, 9 or 51 is thereby an important improvement of airborne craft by this invention and a further improvement is their automatic flight in the best economic flight speed range.

Figure 33:
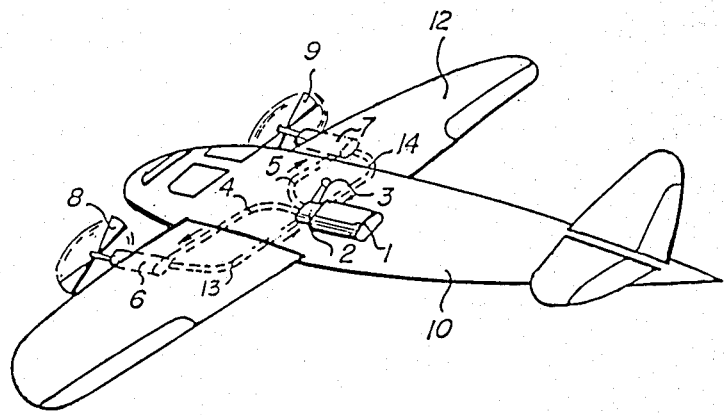
FIG. 33 is a somewhat simplified perspective view illustrating an aircraft provided with one embodiment of the invention.

Referring now to FIG. 33, it will be seen that the Figure illustrates an embodiment of a hyraulically controlled fluid-stream driven aircraft which is inexpensive to manufacture, handles well and easily and is very safe in operation. The aircraft has a body 10 provided with a pair of wings 11 and 12. A fluid-flow producing means is mounted on the body 10 and includes a power plant or prime mover 1, and a multiple-flow variable pump 2 of one of the types which will be described with reference to FIGS. 35 to 37. The rotor of the pump 2 is driven by the prime mover 1, and produces at least two separate flows or streams of hydraulic fluid. Adjusting means 3 is provided which adjusts the fluid flows in the different streams in a sense reducing or increasing the flow, but assuring that in any case the two flows are equal to one another at all times. The flows of fluid may be varied simultaneously between a zero flow rate and the maximum flow rate. Reference numerals 4 and 5 identify fluid passages which extend from the pump 2 to respective positive-displacement fluid motors 6 and 7, which drive propellers 8 and 9, respectively. The spent fluid returns from the motors 6 and 7 via respective return conduits 13 and 14 to the pump 2.

A hydrostatic power supply unit which can be used with advantage in the embodiment of FIG. 33, and which has in fact been diagrammatically illustrated therein, is shown in more detail in FIG. 35. It should be noted that this power unit is of a type which can be separately transported and secured to any desired craft, such as the aircraft in FIG. 33.

Like reference numerals in FIG. 35 identify the same components as in FIG. 33. Reference numeral 15 identifies a reservoir for fluid, from which the fluid flow producing means 1 receives the fluid via two lines 16 (only one shown). The fluid flow actuator means 3 acts equally in order to control the displacement volume of the displacement chambers in the fluid-flow producing means 1 (which may be of the type disclosed in FIG. 37) proportionately to each other if they change their volume. The means 3, therefore, assures that at all times at least a plurality of flows, such as a pair of flows, of equal flow rate or of proportional rate of flow travels from the fluid-flow producing means 1 separately into the fluid lines 4 and 5, to assure the proportionality of angular velocity of the propellers 8 and 9 at all times. Bypass lines 17, 18, 19, 20 may be provided between the outgoing fluid lines 4 and 5 and the respective return fluid lines 13 and 14, to enable the flow of a small fraction of fluid which flows through the delivery fluid lines 4 and 5, back into the return fluid lines 13 and 14. The bypasses may be operated separately from each other, or they may be operated in combination by an operating means 23 connected to the valves 21, 22 of the bypasses. By using the combined operating means 23, which again is to act equally and cooperate with both of the sets of in- and outgoing fluid lines, it is possible with a single operating control to change the rotary velocity of the propellers 8 and 9 relative to each other, and thus by using only a single handle to change the thrust of the fluid streams produced by the propellers 8 and 9 in any desired way.

Figure 34:
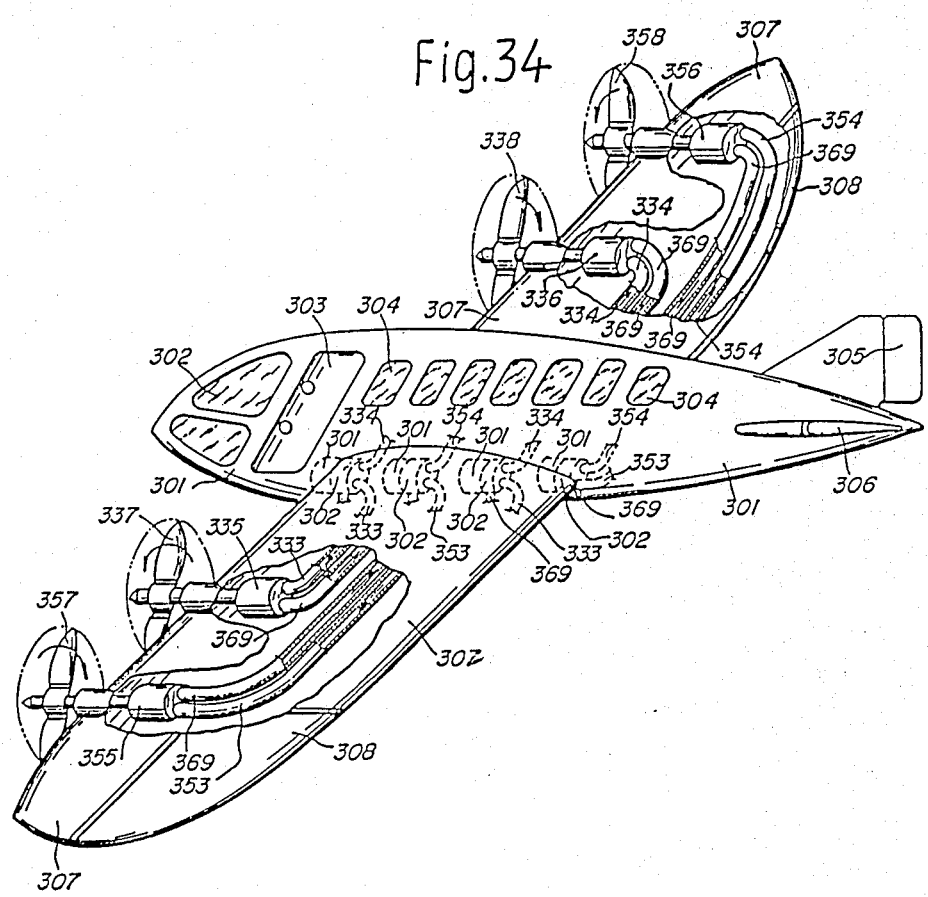
FIG. 34 is a view analogous to FIG. 33, partly broken away, but illustrating a different embodiment of the invention.

FIG. 34 illustrates by way of example a further aircraft somewhat analogous to that of FIG. 33, but provided with a plurality of pairs of propellers, namely four propellers 336, 337, 357 and 358. Thus, for example, one set of propellers 336, 337 may be of the fixed type which cannot have the pitch of its blades changed, whereas the propellers 357 and 358 may be of the adjustable type where the pitch of the blades can be changed.

Since in FIG. 34 there are several pairs of propellers provided, the embodiment of FIG. 34 must also have several separated fluid streams of equal rate of flow. The fluid flow 333 drives the fluid motor 335 and returns via a return line 369. Fluid flow 334 drives fluid motor 338. Fluid flow 354 drives fluid motor 356. All of the fluid flows return through their respective return lines 369 directly or indirectly to the fluid flow producing means. All of the flows 333 and 334 are of equal or proportionate rate of flow. The other pair of fluid flows 353 and 354 is also separated from each other and they are also of proportionate rate of flow. A plurality of fluid-flow producing means 302 is provided, which may be driven by a plurality of power plants 301.

The relatively compact size of the fluid motors makes it possible to locate them in small spaces in the wings 307. The construction makes it possible to have the propellers 337, 336, 357, 358 rotate in opposite directions, because it is simple to reverse the direction of rotation of the fluid motor. Thus, propellers 337 and 338 may, for instance, revolve in mutually opposite directions.

The aircraft has a freight or passenger cabin 304, and an entrance 303 into the same. Cabin 302 may be provided as a pilot cabin. It should be noted that it is possible and in fact preferred to have the heavier components of the drive, such as the power plants and fluid-flow producing means, located at the bottom of the body 301 of the aircraft. Equally acting actuator means cooperate equally with all fluid-flow producing means, or rather with the displacement means in the fluid-handling chambers thereof, and this has the advantage that by means of a single control the rate of flow of fluid of all of the fluid streams can be controlled, and thereby the angular velocities of all of the propellers. Reference numerals 305 and 306 identify control rudders, and the flaps on the rings 307 are identified with reference numeral 308. Details of the construction and operation of FIGS. 33, 34, 35 and 36 are already to be found in the aforementioned copending application, the disclosure of which is incorporated herein by reference.

Figure 36:
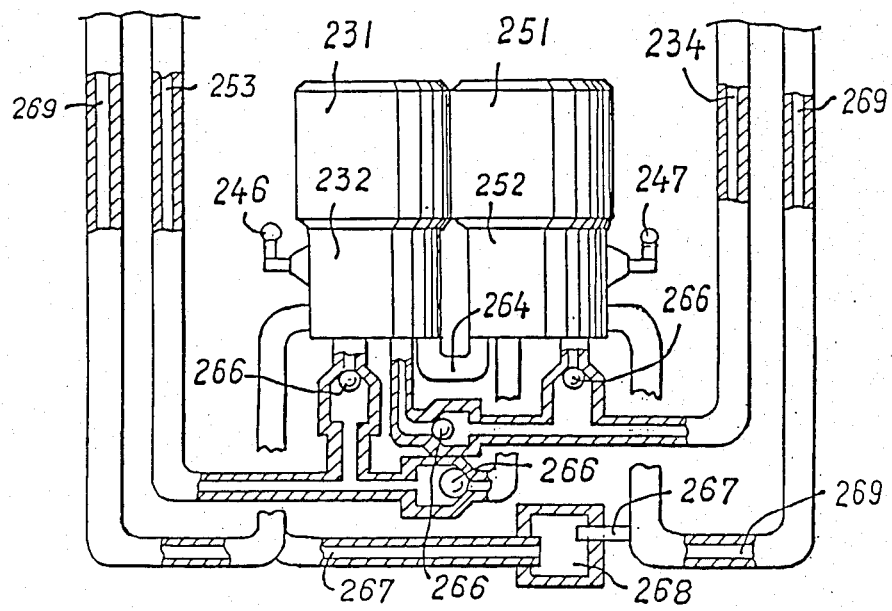
FIG. 36 is a view analogous to FIG. 35, but illustrating a further embodiment of the power supply.
Figure 43:
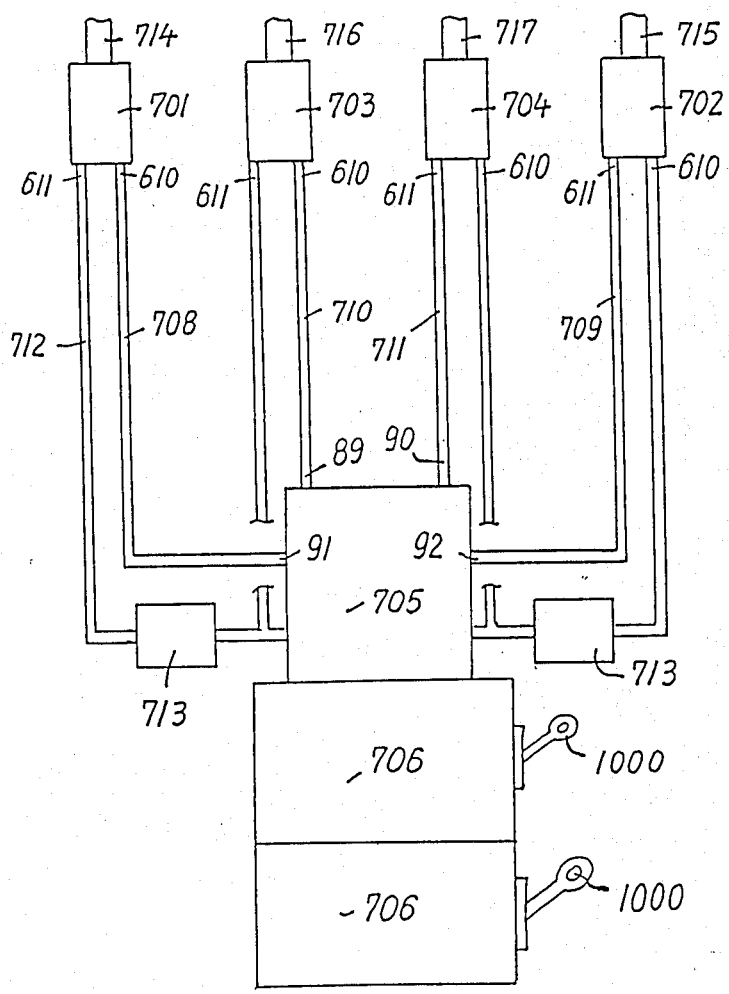
FIG. 43 shows a schematic of the connection of fluid lines.

The power plants and pumps 301,302 may be replaced in FIG. 34 by the arrangement of FIG. 43 with pump 705 of FIG. 43 being for example the pump of FIG. 44 or the pump of FIG. 45. As known in the art, the power plant 706 has a throttle for the control of the rotary angular speed and power output of the power plant. The rotary angular velocities of the motors 701 to 703 of FIG. 43; 335,338,355,357 of FIG. 34 and of the propellers 336,337,357 and 358 are then controlled by the throttle(s) of the power plant(s) 301. The power plant(s) 301 is (are) commonly (a) shaft gasturbine(s) or combustion engine(s). The throttles, f.e.: 1000, are shown in FIGS. 35, 36 and 43. The aircraft of FIG. 34 has an inner propeller pair 336,337 and an outer propeller pair 357,358. Each propeller of a propeller pair is located diametrically opposite of the medial longitudinal vertical plane of the vehicle relative to the other propeller of the same propeller pair. The outer propeller pair has those propellers which are more distant from the medial plane. The propellers of the inner propeller pair are more close to the medial plane. The propellers of the same propeller pair have equal pitches, but they revolve in the opposite direction. The propellers or another propeller pair have another pitch or angle of attack. The purpose of this arrangement is, that one propeller pair is effective at low speed, for example at take off and the other propeller pair is more effective at another speed, for example at high speed forward flight.

Thus, at different forward speeds of the aircraft the respective propellers of different propeller pairs are differently loaded. They consume different powers. Due to the fluid drive of this invention however, they are synchronized. That means, that each propeller of the same propeller pair has the same, but opposite, rotary angular velocity. The different angles of attack of different propeller pairs provide the mentioned different load at equal rotary velocities of propellers but at different forward flight speeds of the aircraft. The different loading of the propeller pairs results in different consumption of power of different propeller pairs. At different powers but equal revolutions the motors of different propeller pairs thereby provide different thrusts and consume or take in different pressure in the hydraulic fluid. It is the specific feature of the fluid drive arrangement of this invention, that even at equal total power the different propeller pairs can be supplied with different power and different pressures in the hydraulic fluid without departing from the velocity synchronization of the propellers of the respective propeller pairs. Because the equalness of rate of flow provides the equal rotary velocity of the propellers even when the consumed fluid pressure of the propeller motors is different.

The hydraulic driving and control arrangement illustrated in FIG. 35 is a unit which can be mounted on any type of vehicle. This unit includes a power plant driving fluid flow producing means 1 having outputs with proportional or equal delivery rates, connected to respective supply lines 4 and 5 which deliver working hydraulic fluid to respective positive displacement fluid motors 6 and 7 at proportionate or equal flow rates. Respective return lines 14 and 13 connect motors 6 and 7 to fluid flow producing means 1, which may withdraw fluid from tank or reservoir 15 through line 16 and which is preferably provided with a fluid flow adjusting means 3 effective to control the displacement value of the displacement chambers therein in proportion to each other. Control adjustment means 3 thus assures that, at all times, hydraulic working fluid is supplied to the motors 6 and 7, driving propellers 8 and 9, at equal or proportionate rates of flow and in supply lines which are separate from each other.

Respective bypass lines 17 and 19, each including a respective control means 18 and 20, interconnect respective supply lines 4 and 5 to respective return lines 13 and 14. Bypass lines 17 and 19 have a very small cross-sectional area, compared to those of supply lines 4 and 5, and thus allow bypassing only a small portion or fraction of the working fluid. Control means 18 and 20 may be operated separately or may be conjointly operated through connection means 21 and 22 connected to a combined operating means 23. By using means or handle 23, it is possible to change the relative angular velocities of propellers 8 and 9 by operating only a single control handle.

The unit shown in FIG. 35 is transportable and may be mounted on any kind of vehicle by the adapting means 24 and 25, with the mounting on the vehicle being effected in a manner such that motors 6 and 7 are located symmetrically on opposite sides of the vehicle longitudinal axis. By virtue of a pivoting arrangement provided between each adapting member and the associated motor, the motors 6 and 7 can be swung into or out of the vehicle.

In FIG. 36, a plurality of fluid-flow producing means 232 and 252 are provided and actuated by power plants 231 and 251, respectively. They are connected with one another in that they may have a common return or interconnecting return fluid line 264. They may also have delivery fluid lines which transfer fluid out of a tank 268 into the respective fluid flow producing means 232 and 252, and the latter each produces at least a pair of separated fluid streams of proportionate rate of flow. One fluid stream moves out of the fluid-flow producing means 232 through a check valve 266 into the fluid line 233, and another fluid stream of proportionate rate of flow travels separately from the fluid-flow producing means 252 through check valve 266 which is associated with the latter, into the common fluid line 233.

Another flow of fluid flows from the fluid-flow producing means 233 at proportionate rate of flow through another check valve 266 into the fluid line 234, and still another flow of fluid which is also separated and of proportionate rate of flow, flows from the fluid-flow producing means 252 through an additional check valve 266 into the fluid line 234. In the event that during the operation one of the power plants 231 or 251 should fail, or if one of the fluid-flow producing means 232 or 252 should fail, then the other fluid-flow producing means would still continue to deliver at least one flow of fluid into each of the common fluid lines 233 and 234, respectively. The respective check valves 266 would prevent a return flow of fluid from the common fluid lines 233 and 234 back into the fluid-flow producing means which is not operating, so that a safe operation of the system would still be assured as long as only one of the fluid-flow producing means or power plants continues to operate.

The return fluid lines 269 may return the return flow of fluids directly or indirectly into the tank 268, or via cooling means into the tank 268, or else directly into the respective fluid-flow producing means 232 or 252, or into the passage 264. The passage 264, incidentally, may be a drain line if desired. The fluid lines 267 may be suction fluid lines, or fluid lines which deliver fluid into the fluid-flow producing means 232 or 252. It is apparent that instead of providing only two fluid-flow producing means 232 and 252, it would be possible to utilize more of them, and if necessary to utilize also more of the power plants 231 and 251, in which case the system illustrated in FIG. 34 could be obtained.

The fluid-flow producing means 232 and 252 are advantageously provided with fluid-flow adjusting means 246 and 247, so that the displacement volumes of the positive displacement chambers in the fluid-flow producing means, which change from minimum to maximum and vice versa during the operation of the fluid-flow producing means, will be proportionately adjusted so that the subtraction of the minimum volume from the maximum volume of the respective positive displacement chamber remains at all times proportionate to the respective volumes of others of the positive displacement chambers. The adjusting means 246 or 247 could be operated separately or in combination.

Figure 37:
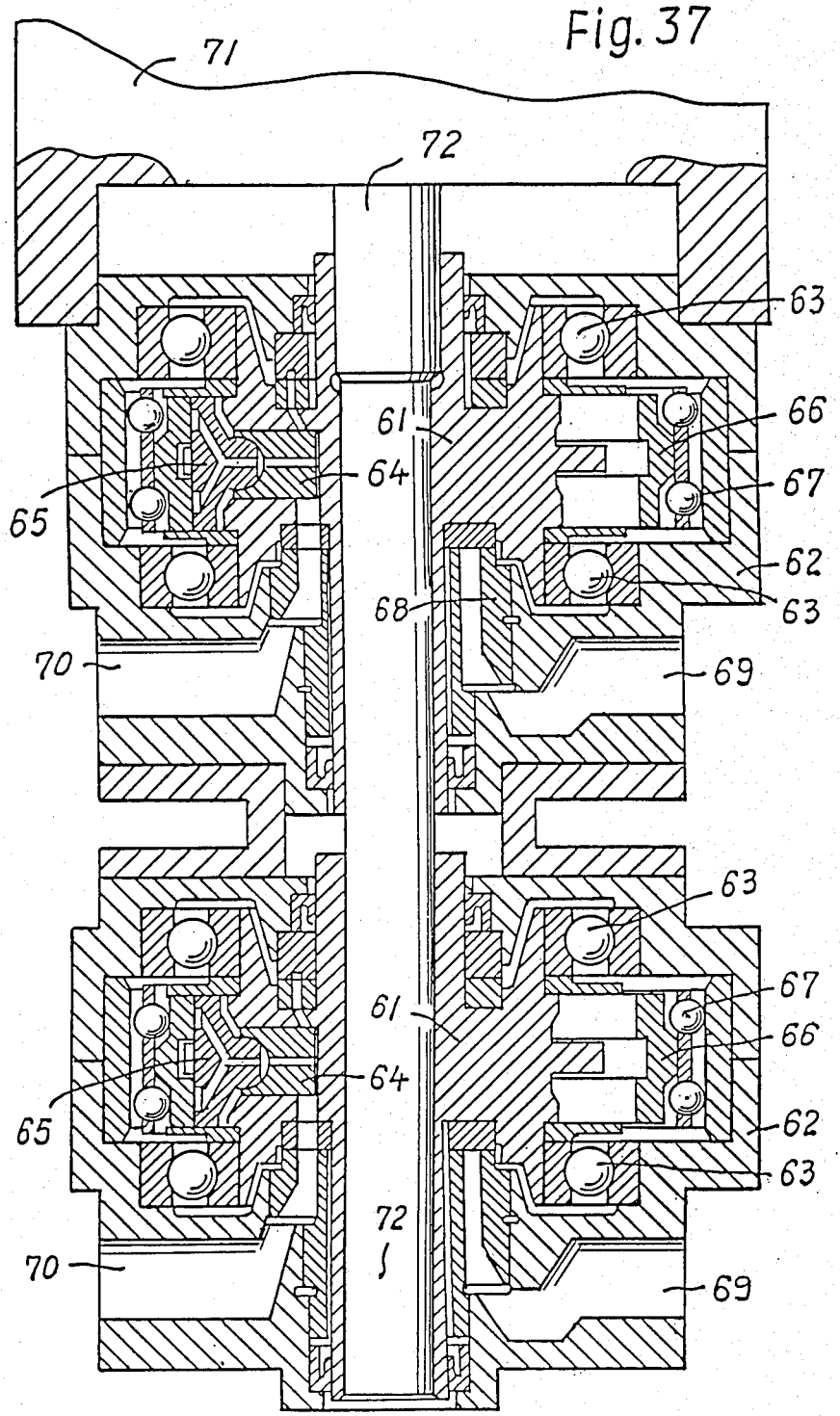
FIG. 37 is a fragmentary sectional illustration showing another embodiment of the invention.

FIG. 37 illustrates in detail how in any of the preceding embodiments equally acting actuator means may cooperate equally with the displacement means of the fluid-handling chambers of the respective fluid-flow producing means. In this Figure, reference numeral 71 identifies a power plant which drives a shaft 72 that extends through two coaxial pumps. In the pumps the rotor 61 are rotatably mounted in housings 62. Displacement means 64 serve to draw in and expel fluid with respect to the cylinders in the rotors 61. Piston shoes 65 may be associated with the displacement means 64 which are piston, between the latter and the actuator means 66, which enforce a definite displacement or stroke of the displacement means 64 in order to actuate each fluid flow at a definite rate of flow. Antifriction bearing 63 may be provided between the rotors 61 and the housings 62, and additional antifriction bearing 67 may be provided between the actuator means 66 and the housings 62. A control member 68 may be provided to establish a fluid-tight seal between the respective rotor 61 and housing 62, and a pair of ports of which one serves for entry of fluid and one for exit of fluid is provided in each pump and communicates with the respective cylinders through passage means located in the housing and rotor and the control member, if the latter is present.

The shaft 72 drives both pumps with equal rotary velocity and may extend through both pumps, but is associated with the engine or power plant and with both of the pumps together.

The two piston stroke actuator means or actuator means 66 are so assembled, that they act equally, that is they operate equally with both pumps to assure that the rate of flow of fluid flowing out of each pump is equal to the rate of flow of fluid flowing out of the other pump. In the illustrated embodiment, the pumps are radial piston pumps, and the pistons 64 and piston shoes 65 which co-operate with the respective actuator means or piston stroke guide means 66 are so controlled by the latter that equal flow rates are assured, since in each pump the central axis of the actuator means 66 is equally spaced from the rotor-axis.

Thus, the pump of FIG. 37 is a fluid flow producing means having at least one pair of separate fluid handling chamber groups of equal volumes, at least one pair of separate outlets 70 or 69, respectively, and includes means for fluid-tight separation of the chambers and outlets so that fluid from each chamber group passes through one of the outlets only; at least one pair of displacement means 64,65 associated with the fluid handling chambers, respectively; equally acting actuator means 66 actuating and defining the displacement volumes of said chambers, respectively, and co-operating at equal times and in unison with said displacement means so that fluid flows in said outlets 70 or 69 at proportionate and equal flow rates.

Figure 42:
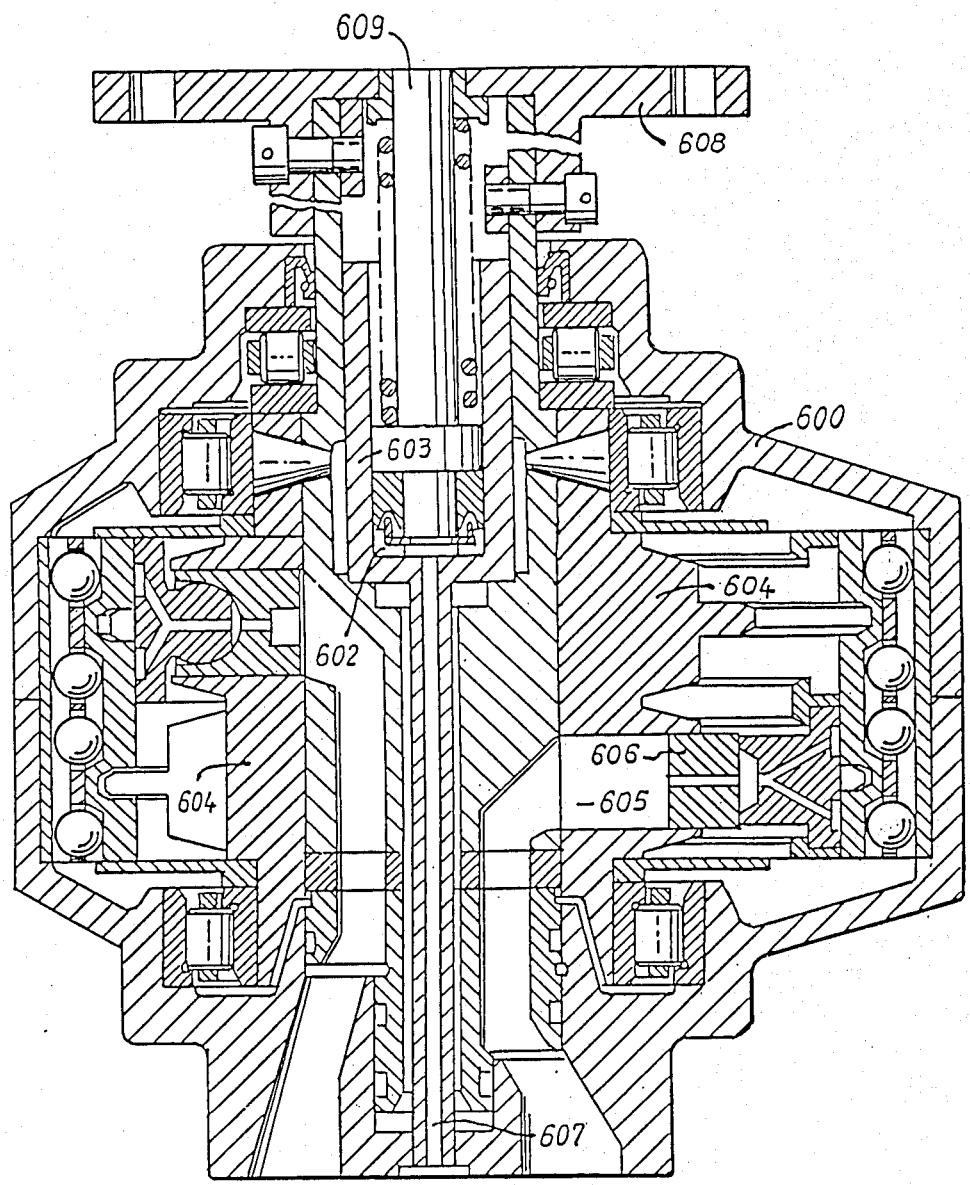
FIG. 42 is a longitudinal sectional view through an embodiment of a propeller driving fluid motor of the invention.

One motor of FIG. 42 may for example be applied as motor 7 in FIG. 33 and another motor of FIG. 42 may also be for example applied as motor 6 in FIG. 33. A separate fluid line 5 may then be set from one of the outlets 70 or 69 of FIG. 5 to the respective entrance port of the motor of FIG. 42 which serves as motor 7 in FIG. 33. Another separated fluid line 4 may be set from the other of outlets 70 or 69 of FIG. 37 to the entrance port of the motor of FIG. 42 which acts as motor 66 in FIG. 33. Thereby the motors 6 and 7 of the vehicle of FIG. 33 are forced to revolve their shafts at equal rates of revolution preferredly in opposite rotary directions.

The pump means of FIG. 37 may also serve to drive the motors of others of the Figures. For vehicles with four motors two sets of pump assemblies of FIG. 37 may be used, or any suitable four-flow producing pump means for example that of FIG. 19 of my U.S. Pat. No. 4,171,784.

Figure 38:
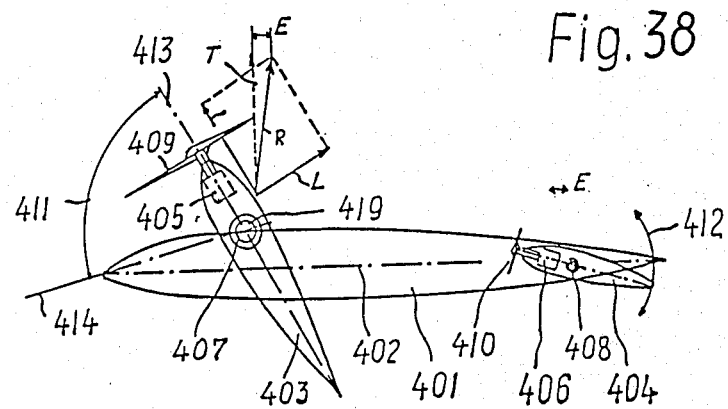
FIG. 38 is a schematic sketch of a vertical take off aircraft seen from the side having inclinable wing means with propellers.

The aircraft of FIG. 38 is for vertical or horizontal flight, landing or take-off. The hydraulic motor(s) 405 of the main wing 403 drives propeller(s) 409 also in the upwards inclined position 413. The propeller(s) 409 thereby forces air with high velocity over the main wing 403. This creates a lift L on the wing 403. On the other hand the propeller 409 excerts a propeller traction S in the direction of wing axis 413. Both components of forces together apply a force R onto the body of the aircraft. This force resultant R may be seen as a vertical upward force component T and a horizontally backward component E in the specific angular and forces-play as demonstrated in FIG. 38. This would result in an upwards lift and backwards tracting of the aircraft. Since however a hydraulic propeller driving motor 406 is provided before the elevator-wing 404, the propeller 410 forces air over the elevator 404. Thereby elevator 404 can also in stand or in vertical take off, when no natural flow flows over the elevator be used for control of the horizontality of the body 401 of the craft. By swinging or pivoting the elevator wing 404 around center 408 of swing the pivoting within the angular range 412 lifts or sinks the rear portion of the body 401 of the specific aircraft of FIG. 38. By this means the aircraft can be kept in any desired inclination relatively to the surface of the earth. Without the location of hydraulic motor 406 relatively to the elevator 404 and driving by said motor or motors a propeller or propellers on the elevator or relatively located to the elevator, so, that air is forced over the elevator, the aircraft would not be stable at vertical take off, landing or flight.

In addition the propeller(s) 410 of elevator 404 provides a traction onto the elevator 404 in the forward direction and of the size E. By making traction E equal to the backward component E of R the aircraft is brought into balance of forces. It now lifts vertically up without forward or backward move. The so remaining final summation of forces on the aircraft of FIG. 38 is T and is vertically upward directed. The aircraft goes vertically up or down or hovers in air.

This is an example how for practical application a one-winged aircraft can be made to take vertically off by controlling such take off by angle 411 of the wing and by providing the propeller to the elevator and by angular control of the elevator 404.

For forward flight the main wing 403 is pivoted forward towards the position 414 to come to rest either between positions 413 and 414 or in position 414.

Figure 39:
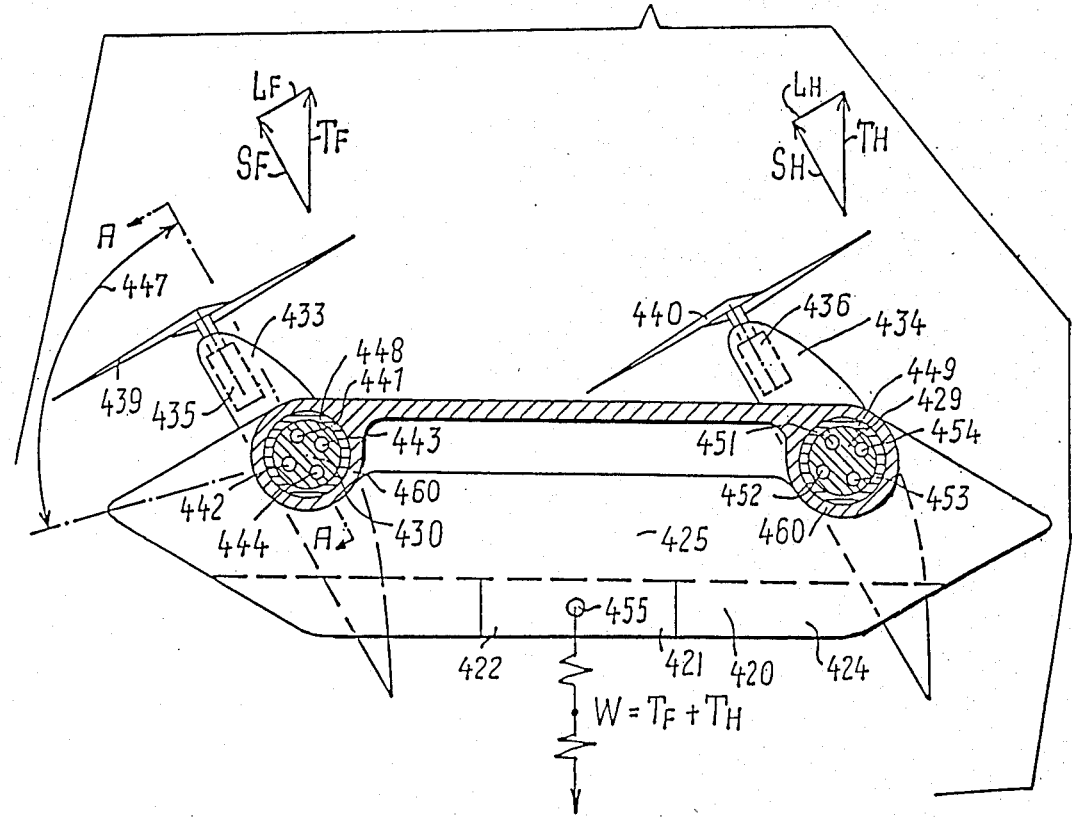
FIG. 39 shows a longitudinal sectional view through a vertical and horizontal flying, take off or landing aircraft with swingable wings.

In FIG. 39 a double winged aircraft is shown, having a body 420 with a heavy weight compartment 424 and a freight or passenger cabine 425. The heavy weight compartment preferrably contains the power plants, engines, pumps, 421 and 422 and other heavy material to form the weight center in the middle, but low in the body 420 of the aircraft. The body 420 is also provided with two or more wing bearings 448 and 449 wherein the main bone-structures 430,429 of the wings 433,433 can be pivoted with said wings at an angular intervall 447. The main bar or main bone of the wings may contain fluid lines 442,443,444,441, 451,452,453,454 to fluid motors 435,436 for driving the said motors and thereby the propellers 439,440 which are associated to said fluid motors. Said fluid lines communicate respective chamber-groups of respective pump means with respective fluid motors.

The propellers 439,440 force air with high velocity over the wings 433,434. The profile of said wings then provides a wing-lift L which is named LF for the front wing and LH for the rear wing. The direction of said wing lifts LF and LH is however not upwards, but upwards to the rear as shown in the component arrow diagram of the Figure when the wings have the angular pivot-position as shown in the Figure. At same time the propellers 435,440 provide a traction S in the direction of the axis of propeller and fluid motor. Front traction is cited by SF and rear traction of a propeller is cited by SH. The component of the forces diagramm shows, that these forces SF plus LF summarize to the upward directed front force TF at the rear of the craft the forces SH and LH summarize to the upward force TH. Both forces TF and TH are upwards directed, parallel to each other and equally distanced from the center of the craft. The weight W is downward directed from center 455. Forces TF plus TH and contrary directed force W keep the aircraft in straight position. Increasing the sum TF plus TH over W brings vertical upwards movement of the aircraft. Equalizing gives hovering and decreasing of the sum TF+TH below W gives vertical sinking of the aircraft of the Figure.

For forard flight both wings 433 and 434 are downard forwardly inclined within the range of angle intervall 447 depending on the desired flight path of the craft relatively to the horizontale.

For all those aircraft which are described in this specification as vertical or horizontal flying, landing or take off aircraft it is required, that the engines, pumps and motors are of little weight but of great power. Such capabilities are not common to usual engines, pumps or motors. Suitable less weight powerful engines, pumps and fluid motors are however available by the patents of the inventor of this application. If they are used, the vertical take off and landing or otherwise horizontally flying winged aircraft becomes a comfortable reality. To use non-suitable pumps, engines, motors will however result in failure, because they may be too heavy compared to their power or too unreliable.

Figure 11:
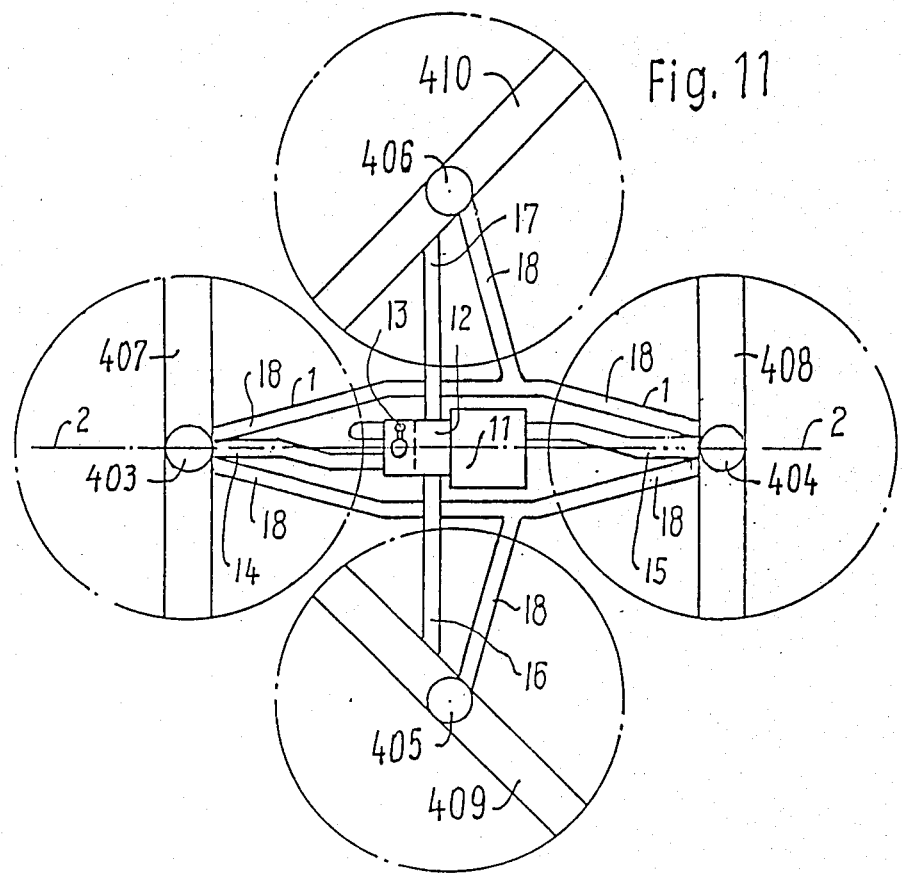
FIG. 11 shoes another vehiclem of the invention, seen from above.

In FIG. 40 and the thereto belonging sectional view, FIG. 41, a little weight wing or propeller or blade is shown, wherein the fluid lines form at least a portion of the main structure bone or bar of the said wing or blade. Two or more fluid lines, like pipes, namely 465,466,463,464 form together a holding main structure. They lead for example from a holding on the aircraft to a respective fluid motor(s) 461 for driving a thereto associated or thereby borne propeller 462. Said fluid lines can be able alone to hold and supply motor(s) 461. But in addition they may be utilized to form the wing 460 and to make the wing 460 strong and holdeable. Ribs 467 may be set around the fluid lines. In FIG. 11 they are shown as rib-portions 467-A and 467-B. Setting one of them from below and the other from up around the said fluid lines gives a strong wing-rib. They may be so configurated to keep the fluid pipes fastened between them. A medial rib-portion 467-D may be applied to rivet portions 447-A and B together to form a complete wing rib and to contain in fixed position therein two or a plurality of two or any other plurality of fluid lines or at least one fluid line. After fastening the fluid lines to the fluid motor and setting the rib portions around the fluid lines the ribs may be provided with the wing-cover 468 and said cover may be fastened to the said ribs of the wing.

The arrangement of the Figure spares the heretofore provided main bars of the wings and eliminates the weight making seeting of fluid lines plus wing-structure bone-bars. The wing of these Figures is therefore especially suitable for hydraulically operated aircraft for vertical or horizontal or combined flight.

In FIG. 42, which is a longitudinal sectional view through an example of a propeller-driving fluid motor, the housing 600 contains revolvingly borne therein the rotor 604 which has working chambers 605 for intaking fluid and driving pistons 606 in said chambers 605 for revolving the rotor 604 of the motor. The rotor of this embodiment of the invention is provided with a central bore or hub which extends also through the entire motor. A cylinder or thrust chamber 602 is provided in or on the motor and a member or piston 603 is moveable therein. It may be excerted from the other end by spring pressure. It is especially convinent to provide space 602 as a cylinder provided in the rotor hub and a piston 603 axially moveable therein. A fluidline 607 extends through at least a portion of rotor 604 to said space 602 to operate the member 603 therein by fluid pressure. Propeller flange 608 may be mounted to the shaft and rotor of the motor; and member 609 associated to member 603 may extend through propeller shaft 608 to control and drive the variable or swingable members or portions of the associated propeller.

FIG. 43 is a schematic which shows how in the transmission of the obstract of the disclosure the outlets of respective pumps and the inlets of respective motors, which drive the propellers of a respective propeller—pair are connected by respective fluid lines with each other for the transfer of fluid from the pump to the motors and thereby to transfer the power from the power plant to the rotors, to synchronize the rotary speed of the rotors of a rotor—pair and to divide the power into power portions to rotor pairs with a variable ratio of the rate of power to one of the pairs relatively to the rate of power in the power portions to the other pair, when the arrangement of FIG. 43 is used in a plural-propeller-pair driven vehicle, for example of FIG. 34, and, when the forward velocity of the vehicle varies.

Power plant assembly 706 consists of one or more power plants to drive one or more pumps means 705. Means 705 may for example be the pump of FIG. 45 or 44. When it is FIG. 44's pump, it has outlets 89 to 92 with outlet pair 89,90 and an other outlet pair 91,92.

Motors 701 and 702 form a first motor pair to drive with their shafts 714,715 a first rotor—pair of a first resistance during rotation. Motors 703,704 form a second motor pair to drive with their shafts 716,717 a second rotor pair of a second resistance during rotation of the respective rotors.

The rate of flow in the outputs 91 and 92 is equalized in the pump means and transferred by separated fluid lines 708,709 to the entrance parts 610 of the respective motors 701 and 702 to revolve the motors of this pair with equal rotary velocities.

The rate of flow in outputs 89 and 90 is also equalized in the pump means and transferred by the separated fluid lines 710 and 711 to the entrance ports 610 of the motors 703 and 704 of the other motor pair to revolve the motors of this pair also with an equal rotary velocity relatively to each other.

When the rate of flow in outputs 89,90 is equal to the rate of flow in outputs 91,92, then all motors revolve with equal rotary velocity. The different resistances of the first and second resistances then define the difference of the power portions to the first and second rotor pair. The ratio of one of the power portions to the other pair comes from different pressures in the fluid lines to different rotor pairs because of the different first and second resistances. The ratio of the power portion to one of the pairs relatively to the power portion to an other of the pairs will change, when the first and second resistances are changing.

Return fluid lines 712 may transfer the return fluids from exit ports 611 of the motors to a tank means 713 or directly into the pump 706 depending on operation in an open or closed hydraulic circuit, or circuits.

In the embodiment of FIG. 44 a common actuator means 306 acts on the displacement members 307 of four separated fluid flow delivery chamber groupes 302,303,304,305 to deliver four separated flows of equal rate of flow in the pressure fluid out of two pairs of exit ports or outlets 341,343 and 342,344.

Two separted fluid flows of equal rate of flow can thereby be utilized to be send to a first motor pair to drive a first pair of fluid motors and thereby to drive a first pair of rotors or of propellers of a first resistance during rotation.

To other fluid flows of equal rate of flow can thereby be utilized to be send to another pair of motors to drive a second pair of rotors or propellers of a second resistance during rotation.

More details of the Figure can be obtained from FIG. 19 and the description thereof in my U.S. Pat. No. 4,171,784.

The arrangement now provides a first fraction of power of the power plant into two first power portions of a pressure in the fluid defined by the resistance of the rotors of the first rotor pair and it provides a second fraction of the power of the power plant into two second power portions of a second fraction of power of a second pressure in fluid defined by the second resistance of the second rotor pair.

When the resistances in the first and second rotor (propeller) pairs are equal, the first and second power portions are equal. When the resistances of the first and second rotor pairs are different, there exists a ratio of the first power portion to the second power portion.

When the ratio varies during operation of a device, for example in different surrounding or due to different resistances of the rotor pairs at a certain speed of the arrangement, the ratio varies automatically in response to the difference of the resistances.

The pressure in the fluid lines to the first pair is then different from that to the second pair. Thus, the arrangement provides a power division means with equal power portions in power fractions to equal pairs but different power portions in power fractions to different pairs.

The pump means of FIG. 45 has a first working portion for the creation of a first pair of flows of fluid of equal rate of flow to be transfered separately out of outlets 89 and 90.

It also has a second working portion 98 for the creation of a second pair of fluid flows of equal rate of flow to be separately transferred out of the separated outlets 91 and 92.

The bottom Figure is a cross-sectional view through the portion of the top-Figure along the line IX—IX and shows, that at least one of the mentioned working bodies is provided to supply a pair of variable flows of equal rate of flow. The other working body may supply a pair of fixed flows of equal rate of flow out of outlets 91 and 92. But also this working portion could be built similar to that of the other working portion and thereby be made able to supply two variable flows of equal rate of flow too.

More details, how this pump means is operating and designed can be studied in FIGS. 8 and 9 of my U.S. Pat. No. 4,171,784.

The pump means of FIG. 45 can for example, be used, to temporary revolve both propeller pairs of FIGS. 2 and/or 6 equally and to act other times to let one of the propeller pairs run slower or faster than the other and it can also be used at other times to set one rotor pair or one of the propeller pairs to rest.

When one of the mentioned pairs is set to rest all or almost all of the power of the power plant is transferred to the other pair of rotors or propellers.

The arrangement including this Figure as pump means is thereby able to divide the power into desired power portions of rates of power at will.

The latter may be done by the incorporation of respective control means 99,143 of FIG. 45.

Thus, this device is able to perform even the most sophisticated or the most variant ranges of the ratios of power fractions or portions of the invention.

At discussions of the invention it has become visible, that not all persons immediately understood the invention. They are commonly assuming, that a control means should be provided to control the flow of power portions. Occasionally it is also assumed, that propellers must consume more power, when they are revolving faster.

Both assumptions may be correct for conventional technology, but they are not at all times correct for the present invention and its application. Because in the invention the division of power and the variation of the power ratios occurs automatically. The only control means for the invention is the "throttle" of the power plant, which defines the speed and output of the power plant.

The gist of the invention is therefore partially also shown in the following explanation The gist of the invention (and main claims) is, that the variation of the rates of power to the different propeller pairs is not done by variation of the power of the power plant as a whole, but occurs automatically and depending on the forward velocity of the craft. The pilot normally does not influence this automatic power variation of the power fractions which are going to the different propeller pairs.

To give an example of practical flight: The pilot may have available a long runway. He is not forced to start with over power for a short runway. The pilot is conscious of the fuel consumption. His power plant may give him, for example, 100 Horsepower maximally at, for example, 5000 rpm. But he knows, that the best fuel consumption and best economic power rating of his engine is at 75 HP at 4000 RPM. Now, in order to save fuel, he intends to run his power plant in this most economic fuel consumption range. The aircraft, which the pilot intends to fly, is an aircraft of the present invention. Thereby the pilot has one single means for control of power to his disposal. That is the throttle of his power plant. For example, a shaft gasturbine with a pump thereon or a combustion-engine with the pump thereon. He has indications on his throttle (or accelerator in cars) which indicate the setting of the rate.

This fuel conscious pilot now may act as follows: He sets his throttle to power rating 4000 RPM, 75 HP. He leaves the throttle in this position and does not touch the throttle any more until later he will land at his destination. (Provided during the flight from departure to destination he is not disturbed by air traffic, bad whether or like.) He from thereon gives his attention only to his three rudders, side rudder, elevator(s) and aileron(s).

His craft starts to move forward on the long runway. His Propellers with the low pitch grasp the air effectively but his propeller pair with the steeper pitches are not so effective now. They are more a burden. His craft gains forward speed. Finally, after a long run with the best power range, the craft ascends from the runway and flies. Both propeller pairs may now bite at about the same efficiency. Finally his craft is reaching the cruising speed. At this forward speed of the craft, the propellers with the steeper angle are in best condition and they bite very effectively now for the long flight towards the destination. The propellers with the lower pitch are now at about "zero" angle of attack relatively to the air. They now provide the smallest resistance, since they not grasp much air any more. They are merely running along without taking much power and without taking much air to drive the aircraft.

What has happened during the procedure is, that the craft runs first with effective power range towards the low pitch propeller pair and then gradially changes the rate of power to the propeller pair with the steeper angle of attack. The pilot did not do any power-control at all. All variations of the power rates to the different propeller pairs has happened automatically and without any action by a control means or by a pilot.

This is the major gist of the present invention, and hereon, the main claims have to be based.

The slightly more sophisticated, but possible, control at will is only an addition to the basic invention and it requires a knowledge of more sophisticated control by the pilot. Therefore, again an example of practice:

The aircraft, which the pilot intends to use has the pump means of FIG. 45. Now again, he will set his throttle to 4000 RPM and to 75 HP. Because he is energy consumption conscious.

He knows, since he has more sophisticated education, that his propeller pair with the steeper pitch is a burden at start and it will increase his required runway length. Consequently, he uses the members 143,144,99 to reduce the rate of flow in portions 98 of FIG. 15. His propeller pair with the steeper pitch is now revolving slower. It uses less effective power. The power ratio may even be much smaller now than the power ratio which is going to the now more effective propeller pair with the smaller angle of attack or with the duller pitch. His craft needs now a shorter runway-length and ascends earlier. He then gradually with increasing forward speed of flight, increases the rate of flow out of portion 98 of FIG. 45 by controlling members 98,99,143,144 of FIG. 15 to a greater rate of flow (longer piston stroke). At the final flight stage of cruising speed, this portion 98 of pump 15 now supplies the main portion of the power, the greater rate of power of the 75 HP, 4000 RPM to the propeller pair with the steeper angle of attack and the steeper pitch.

There could be other practical applications too. For example, the portion with two flows, the variable portion 98, of FIG. 45 could be communicated to the propeller pair with the smaller, finer or lower angle of attack or propeller pitch. But those things are possibilities, but not the matter of the basic main gist of the invention. When too many of such possibilities, which might be added, would be given into the specification, the main gist of the invention would become more and more in danger of being misunderstood or overlooked.

THE APPLICATION OF THE INVENTION

To use the invention beneficially in practical application in aircraft, a number of my newer discoveries should become obeyed. At a first glimpse in might look, that the provision of different propeller pitches to different propeller pairs would already bring the desired results.

In the basic application it would be true, that the application of different pitches of propellers in different propeller pairs would be within the scope of the invention. Thereby the propeller pairs might be synchronized mechanically by gear means or otherwise, for example by the hydraulic transmission as in the embodiments of the Figures. However, the basic application will not in all cases bring benefit. Because there have been a number of relationships discovered in my co-pending patent allications. Those relationships, which are expressed in the co-pending applications in mathematical formula, are of great influence to the benefit of the invention in application in practice. The mentioned relationships can rarely or never be obtained from common aircraft literature.

Because they obviously have never been considered before my respective inventions.

To obtain an effective aircraft with good economical operation and with an optimum of economy for certain flight speeds and distances, the mathematical rules of my co-pending applications should become considered in addition to the effects of the pitches of the propellers. For example, the differences of the speed ranges in efficiency to the propellers as well as the number of propellers and their effects on thrusts of propellers in the respective speed ranges of the disclosures of my mentioned co-pending applications and their mathematical disclosures have to be taken into consideration. Only if that is done, the final and best propeller pitches for the respective speed ranges, numbers of propellers and flight distances can be designed.

The mathematical disclosures may be obtained from my U.S. Pat. No. 4,387,866.

In the embodiment of FIGS. 46 and 47, the specifity of the invention is, that the propeller 439 is pivotably borne on an airfoil section, for example on a wing 433. Axis 2000 of propeller 439 is pivotable from axis 694 to axis 693 and vice versa. To operate the pivotion of the axis of the propeller and thereby of the propeller, a bearing holder 471 is provided and bearing housing 480 bears pivotably thereon. Housing 480 holds or contains fluid motor 435. Fluid motor 435 carries and drives the propeller 439. The pivot arm portion 690 extends from bearing 480 and is connected by connecter 673 to piston 672. Piston 672 is movable in cyclinder 670, while cylinder 670 is swingably borne in holder 671. In FIG. 47 the arrangement is shown in the second axis-location 694, while in FIG. 18 the arrangement is shown in the first axis-location 693 of the propeller and motor axis. Instead of making the angle variable between locations of axes 693 or 694 it is also possible to fix an axis direction therebetween. At present time however, I prefer the variable axis direction of this embodiment. Because the best overall direction of the axis of the motor and propeller is still under investigation.

In these embodiments of the invention, the effects of the mathematical considerations are taking hold. The propellers are tracting and providing a lift or thrust as shown and defined in the respective equations for "Hh" and "Hf". As a side effect the velocity of the propeller stream "V2" appears beind the propeller. The invention now makes good use of the propeller-stream velocity "V2", namely "Vsh" or "V2f" in order to provide an artificial airflow or airstream over the wing section 433. The direction of the propeller axis relative to the medial plane 3000 of the chord of the section is very important. It greatly influences the desired lift of the wing section, but also induces drag on it.

By the equations, which are given, all effects can be calculated, when the "Cl"-"Cd" values of the section are known. The arrows "T" are showing the thrust of the propeller 439; "L" shows the vertical lift of the wing section under the propeller flow, "R" shows the component of lift vertically to the medial chord plane of the section; "B" and "W" show resistances, namely drags of the wing section 433 under the influence of the propeller stream; "F" shows the remaining forward thrust or traction of the propeller and "N" the remaining thrust or traction of the propeller in the respective axis direction in FIG. 47. It should be understood, that, when calculating, th difference between propeller in stand and in flight must be considered, because it brings the very different results of air flow speeds V2, namely the differences between "V2h" and "V2f" which greatly influence the outcome of the arrangement. In addition the forward movement, if any is taking place, through the air is to be added to the calculation of the forces appearing on the wing section 433. The point-dotted lines 3000 in the Figures are demonstrating in schematic the medial planes of the chords of the sections or wings, in order to be able to see the loacation of the propeller axis or axes relatively to the mentioned medial plane 3000. Because this relation is important for judging the influence and effects of the embodiments of the invention.

Presently it is convinient to apply the arrangement of the variable angles of axes of propellers and motors of FIGS. 18 and 19 to the embodiment of FIG. 39. Because it provides the best possibility to obtain an optimum of lift and of efficiency in the inter-thrust range between vertical take off and horizontal flight, when the propellers are pivoting from vertical axes to horizontal axes. At a later time however, a best overall angle of installment of inclination of the propeller axis relatively to the medial plane or chord 3000 may become established by empirical results. Such best angle of inclination of overall operation may then be set instead of the variable arrangement of FIGS. 18, 19 in order to save the weight and costs of the application of the variable inclination—axes arrangement.

A great difficulty in the building of aircraft and of wing sections can be overcome by the embodiment of FIGS. 48 and 49. Wings are requiring usually many parts and many fasteners. They are thereby becoming heavy and very expensive. In order to overcome the heavy weight and to reduce the great costs, this embodiment of the invention is provided. It utilizes two fluid lines 5 and 14, whereof one is an entrance or delivery fluid line and the other is a return fluid line. The fluid lines are provided by pipes 5555 and 1414 respectively. Their axes may be parallel to each other or slightly inclined to each other. However, the axes of the pipes 5555 and 1414 are located in a pipe axes plane, which in this embodiment may coincide with the medial chord plane 3000. The outer ends "E" of the fluid line pipes 5555, 1414 are fastened to entrance and exit ports "PE" and "PO" of a fluid motor 461 respectively. Thereby the fluid motor 461 is borne and held by the fluid pipes 5555,1414. The shaft of motor 461 holds and carries the propeller 462. When fluid flows through the pipes it also flows through the motor and revolves thereby the shaft of the motor and the propeller 462. So far the arrangement is basically known from my earlier U.S. Pat. No. 3,211,399. Novel however is, that the housing of the motor 461 directly connects to the pipes and that the pipes are connecting under a ninety degree or other degree angle of the shaft and propeller.

The decisive novelty of the embodiment however is, that the only two pipes are carrying and holding the wings in combination with holding the motor, the propeller and driving the propeller.

This feature saves weight, because the wing is now constructed to only a very few parts. In order to be able to hold and carry the wing, and in order to prevent deformation normal to the axes plane 3000, it is required and provided by the present embodiment of the invention, to insert longitudinal stabilizers 1554,1555 substantially normal to the chord of the profile or wing section.

To form and hold the profile of the airfoil section, also sectional stabilizing portions or stabilizers 1467 and/or 1468 may be provided and be fastened.

A profile skin 468 may then be set over the entire arrangement.

Important in this embodiment is also the ease and perfection, with which the arrangement is actually built and obtained.

The longitudinal stabilizers 1554,1555 may extend through the length of the wing. They may be divided or be one piece sheets from top to bottom of the wing skin 468. The profile stabilizers 1467,1468 are however preferred to be build of upper portions 1468 and bottom portions 1467. The end adjacent to the skin 46 may be fastened to it. At the inner ends however, they are formed by ends which embrace the neighboring portions of the pipes 5555,1414 or at least meet portions of them. Thereby the pipes 5555,1414 are fixed between the ends of the upper and bottom portions of profile stabilizers 1467 and 1468. The bottom portion 468 of the skin may be fastened first to the stabilizers 1554,1555 by bent portions or fasteners 1515 and also to the stabilizers 1467. Therafter the upper portion of the skin 468 may be bent backwards over the profile stabilizers 1468 and fastened to them as well as to the longitudinal stabilizers 1554,1555, until the ends of the skin 468 are meeting and form the rear edge of the wing section. By fastening the rear ends of the skin 468 together to form the rear edge of the profile and of the wing section, the assembly is perfect and form-stable. The arrangement of this type of wing is very strong and inexpensive. It is easy and fast at building. It is of low weight and fulfills many purposes at the same time. Namely the provision of the wing, the driving and holding of the fluid motor and the revolving of the propeller. The inner ends "I" of the pipes are fastened preferably to the body of the craft and to the pump or fluid supply means.

The embodiment demonstrated in part in FIG. 50 is an alternative to the vertical take off and landing, but horizontally flying aircraft of FIG. 39. Instead of pivoting two motor carrying wings as in FIG. 39, the embodiment of FIG. 22 carries to each lateral side symmetrically a pivotable medial wing 635 with medial plane 3000, which pivots in unison with two therefrom distanced pivotally borne motor holders 829,929. A control means 1445 with handle or connector 1446 assures by connections to pivot arms 1444 over connecters 1447 the pivotion of wing holder 729 in unison with propeller holders 829 and 629. The pivot means are consisting of housings 630,730,830, wherein the holders 829,729,629 are pivotably borne respectively. Pivot arms 1444 are extended from holders 829,729,629 through windows 631 in the bearing housings 830,730,630. The holders may be first pipes 829,729, and 629. Inner or second pipes 929 may be provided in the holder pipes 829,729,629. The holders may be pivotable around the center lines "O". One of the pipes may in each holding assembly be a fluid line to transfer fluid to a fluid motor 435,436 respectively, while the other pipe of the holding assembly may be a return fluid line. For example, pipe 929 in pipe 829 may carry a driving fluid to port 666 of fluid motor 435, while pipe 829 returns the fluid from exit port 667 of fluid motor 435. Fluid line 929 in pipe 629 carries driving fluid to entrance port 666 of motor 436 and pipe 629 returns the fluid from exit port of motor 436. By such arrangement only the outer pipes, namely the holder pipes and their pivotion is visible to the outside. The interior pipes 929 are invisible to the viewer.

The effect of revolving the two propellers and the medial wing therebetween in unison is, that a smooth change over from vertical take off or landing to horizontal flight is possible. The medial wing is away from the propellers at least temporarily and temporarily independend thereof. The craft of this embodiment is inexpensive and it is strong. However, it requires bigger diameters of the outer pipes 829,729,629, than the embodiment of FIG. 39. The embodiment of the FIG. 50 is thereby slightly heavier than that of FIG. 7. However, it may be for higher speed forward flight, because it has only half the number of wing portions.

The embodiment of a pump of FIG. 45 as far as until now described, is especially suitable to drive a vehicle with a forward tracting or pushing propeller. Such propeller is shown, for example, in FIG. 26. The craft would have four equal sized propellers and four equally sized fluid motors to drive the propellers. Such vehicle could then obtain the benefit of FIG. 31 of the analysis of the technologies involved, namely the benefit of lower fuel consumption at moderate forward speed without using inclination of propellers to obtain a forward movement of the vehicle.

A slight modification of the pump of FIG. 46 secures however also an absolute security of forward flight without departing from a straightly directed forward flight path of the vehicle of FIG. 1, if two of the piston groups are provided with slightly smaller or bigger diameter than the other two piston groups of FIG. 45 and if the outlets of the one group are communicated to the front motors and the other to the rear motors of the vehicle of FIG. 1. The further advantage of such an arrangement of the pump of FIG. 45 in the vehicle of, for example, FIG. 1, FIGS. 2 to 5 or 6 and 7 would be that the craft flies automatically forward with all times the same speed when the power plants run with equal revolutions per time. The craft will never fly with a speed too slow, it will never depart from the straight forward flight path to the left or right and it will never tilt in an undesired direction because the rate of flow in the separated fluid lines will force the propellers to revolve at all times with a definite rate of rotary speed relative to each other. The propellers are then synchronized by the equal sizes of consumption volumes of the motors and the ratio of rate of flow delivery of the first pair of piston groups relative to the other pair of piston groups of the four fluid flow delivery lines of FIG. 45.

FIG. 20 illustrates a further embodiment of the invention, wherein the vehicle has a body 601 with therefrom extending arms, namely the front arm 602 and the rear arm 603. The outer ends of the arms carry thereon pivotable motors 605 and 607 to drive a front propeller 604 and a rear propeller 606. The body 601 contains also a power plant and a multi flow pump for the delivery of at least two separated flows of fluid. One flow to the front motor 605 to revolve its rotors and one to the rear motor 607 to revolve also the rotor of this motor. The rates of flow may be equal to the front motor and to the rear motor because in this embodiment the motors are specific to have the ability to pivot for a pivotal angle between vertical and horizontal propeller axes or for a portion at a range between these two extremities of pivotal movement. The arm 602 carries to motor pivotably to swing the axis from forwardly horizontal to upwards vertical direction. The rear arm 603 carries the motor with such pivotability that the propeller can be swang from horizontally rearward to the vertically downward direction. The rear arm 603 may be located higher then the front arm 602. The arms 602 and 603 may be replaced by a fluid line structure which holds the motors of the propellers as, for example, in FIGS. 1 or 6.

At the time of filing my first patent application for this FIG. I have not excluded and hoped that this vehicle might obtain a high forward speed because it would not have any drag of a wing. The partial analysis of the technologies involved in the present application brings now, however, the knowledge that at high degrees of inclination of the axes of the propellers the fuel consumption will be extremely high. I have under these conditions with the present knowledge to consider the embodiment of this Figure as not very economic despite of its simplicity. Consequently, in accordance with the results of the analysis of this present application, I advance the vehicle of FIG. 20 to the new vehicle of FIGS. 21 and 22, while it will be advanced further in additional Figures of this patent application.

Figure 21:
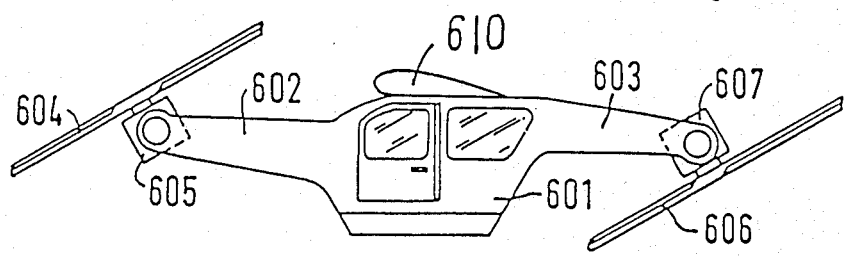
FIG. 21 shows still another vehicle of the invention, seen from the side.
Figure 22:
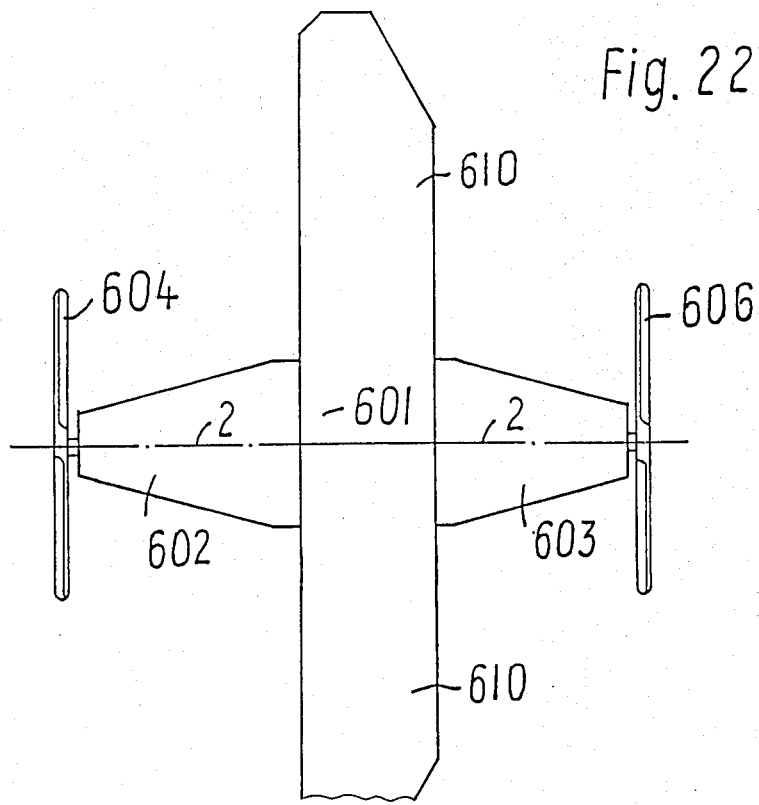
FIG. 22 shows the vehicle of FIG. 21 seen from above.

FIG. 22 illustrates the embodiment of the invention equal to the embodiment of FIG. 20; however, with one important difference. The body of the vehicle, body 601 carries now a wing 610. In other words, the vehicle is provided with a wing to carry the vehicle at forward flight. Since FIG. 22 illustrates the vehicle of FIG. 21 seen from above the wing is clearly visible. It is preferred to set the wing on top of cabine 601 of the vehicle. Such a craft can now fly forward economically on the wing and the propeller are then driving it forward whereby they can spare the duty to carry the craft. Their axes may be set completly horizontally directed to have exclusively or almost exclusively the component Sh of the analysis.

FIG. 22 shows the craft of FIG. 21 in such forward flight condition with the propellers and motors directed to have horizontal axes. The propellers now serve as lifting propellers for vertical flight as take off and landing and for horizontal forward flight; temporary with vertical or with horizontal axes. Only at the short time of change from the upright to the horizontal direction of the axes the propellers will partially carry the vehicle and provide it with the required forward speed to be carried therafter at forward flight on the wings.

FIG. 15 shows another craft of the invention and this is again taken from my co-pending application Ser. No. 533,073 as well as FIG. 20 was taken from the same co-pending application. FIG. 15 differes from FIG. 20 therein, that not only the motors are carried pivotably on the outer ends of the arms 602 and 603 but motors which carry wings and propellers. These wings are shown by 608 and 609 in the Figure and they pivot together with the motors 605 whereon they are fastened. Also, I invented this craft of this Figure already at filing my application Ser. No. 973,780 during 1978, I have until now rather neglected this Figure in practical application; or, I have underestimated its value.

Regarding FIG. 15, however, the analysis in this patent application brings to light that the craft of FIG. 15 would be much more economic in forward flight than FIG. 20 is. Because the forward flight with steeply forwardly inclined propeller axes of propellers which bear the craft is highly uneconomic according to the analysis while on the other hand the forward flight on wings with driving propellers with substantially horizontal axes is more economic. Thus, FIG. 15 is now still an important embodiment of the invention. It can easily be built and is economic in forward flight.

FIG. 16 shows in its upper Figure portion the craft of FIG. 15 in forward flight with substantially horizntaly directed axes of the propellers and with repectively pivoted wings 609 to carry the craft thereon at the forward flight. The bottom portion of FIG. 16 shows the craft of FIG. 16 seen from above. There the wings 609 are clearly visible and so is the relationship of the propellers to the wings and to the craft in forward flight.

Figure 23:
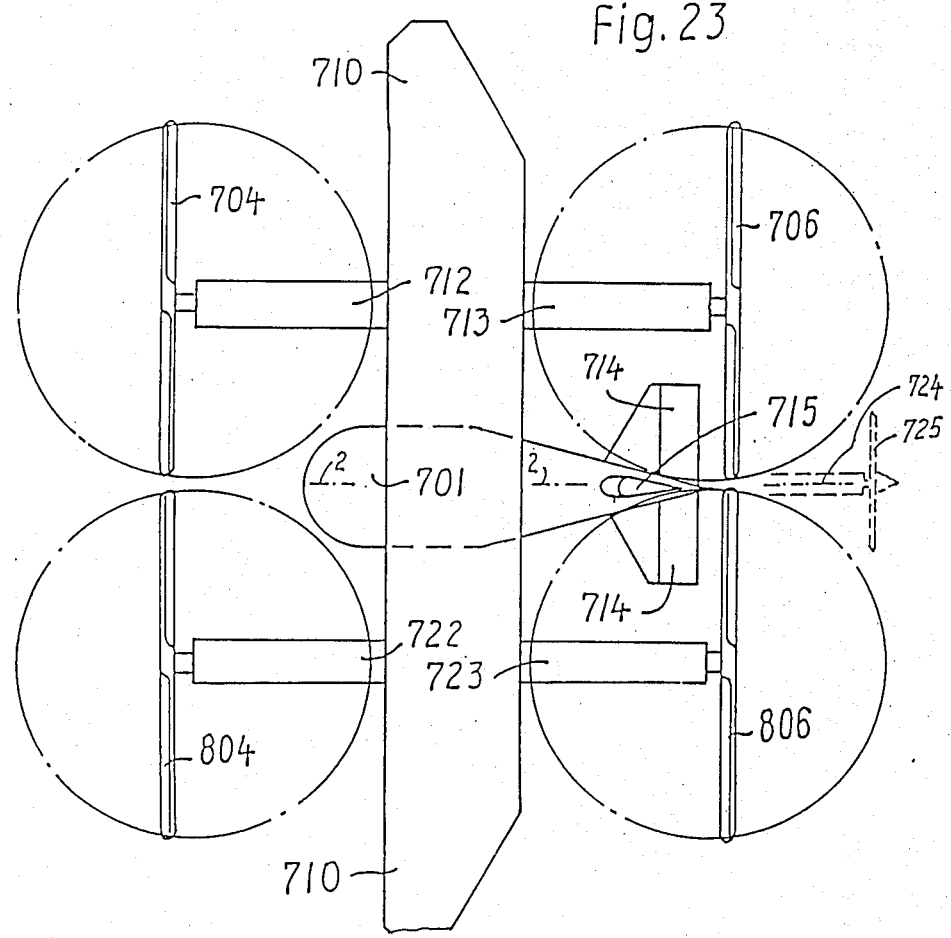
FIG. 23 shows another vehicle of the invention, seen from above.

FIG. 23 shows another embodiment of an airborne craft of the invention and this craft appears for the first time in the present patent application. It is the most advanced craft of the group of FIGS. 15 and 20 and it is the outcome of the analysis of the present patent application. The analysis brought clearly that a craft should have four or more propellers for the vertical flight like take off, landing, ascent, descent and hovering rather than only two propellers. When this discovery which I partially made in my U.S. Pat. No. 3,211,399 of 1965; but which I expressed for the first time in clear mathematical terms in my patent application Ser. No. 973,780 of 1978, would be applied to FIGS. 15 and 20, the crafts of FIGS. 15 and 20 should get wings and, in addition, should get four propellers. Consequently, the present invention discovers, that FIGS. 15 and 20 of my co-pending applications are useable crafts but they can not obtain the best economy for vertical take off in combination with an economic forward flight. Also FIGS. 15 and 20 are known to the public from many of my earlier publications; there has never been any improvement of these Figures by third parties or by the public and, consequently; I have to do the still required invention myself. Thus, I now disclose the embodiment of FIG. 23 for the first time in this present patent application. FIG. 23 is now basically equal to that of FIG. 20 but it contains the improvement thereof as shown in FIG. 21, namely the application of the wing 710 to the craft. In this case the wing 710 is provided on top of the cabine or body of the craft, namely on top of body portion 601. As a novelty regarding this craft, the embodiment of this Figure has obtained the side rudder 715 and the elevators 714 on the rear end of body 701. The further and important novelty of the embodiment of this Figure is, that the body 701 does not have arms 602 and 603 as in the previous FIGS. 15 and 20. But instead the body 710 is fully free of such propellermotors carrying arms and provides a free outlook from the cockpit in all forward, upward and side-word directions. The former arms 602 and 603 are not any more provided on the body 701 but on the wing 710. The Figure, thus, shows a pair of forward and rearward extended arms symmetrically laterally of the body of the craft and thereby symmetric to the medial vertical longitudinal plane 2 of the body of the craft. The mentioned arms are now carried by the wings 710 of the craft.

The embodiment of FIG. 23 thereby comprises an airborne craft capable of vertical take off, landing, ascent, descent and hovering while it is also capable of forward flight on wings, wherein the body 701 is provided with symmetrically to the medial plane of the craft extended wing portions 710 wherein the wing portions are provided with forwardly directed arms 712 and 722 with one thereof on the right and the other thereof on the left side of the medial plane while the wing portions are also provided with rearwardly extending arms 713 and 723 with one thereof on the right and the other thereof on the left side of the medial plane of the craft and wherein the mentioned arms are provide with holding means which carry therein pivotable motors with rotors and shafts which hold and drive propellers 704 and 804 on the mentioned front arms and rear propellers 706 and 806 on the mentioned rear arms, and, wherein the propellers and their driving motor means are pivotable from horizontally rearward directed axes of the propellers to vertically downward directed axes of the rear propellers, while the front propellers are pivotable from a direction of the axes of the propellers which are horizontally forwardly directed to a position at which the axes of the front propellers are vertically upwards directed and wherein it is preferred that a power plant is common to a transmission to all of the motor means of all of the propellers while the mentioned power plant, which might consists of a plurality of such power plants, is preferred to be located in the body 701 of the craft while the transmission means which carries the respective portions of the power of the power plant to the motor means of the propellers extends from the power plant in the body 701 through the respective portions of the wing portions 710 and through the respective arms 712,722 and 713 and 723 to the respective driving means or motor means of the propellers 704,804, 706 and 806 and, wherein control means are provided to pivot the propellers in unision to secure that all the propellers have at equal times an equal direction of the axes of the propellers or at least the front propeller axes have equal directions of their axes and the rear propellers have equal directions of there axes while the axes of the rear propellers may differ from the directions of the axes of the front propellers. It is preferred in this embodiment of FIG. 23 to utilize as the mentioned transmission from the power plant to the propellers my multi flow pumps and my fluid motors and fluid lines to secure a light weight and effective transmission. The craft of FIG. 23 now has the feature that it can lift vertically strongly with the "FTl" factor of the analysis while it can fly forward with horizontally directed propeller axes borne by the wings 710 of the craft.

A propeller consumes a certain power at stand of the vehicle, when the vehicle is not moving and it consumes another power for the creation of thrust, when the vehicle moves forward, whereby the propeller moves forward relatively to the air of the atmosphere or to the water wherein or on the vehicle moves.

The power consumed by the propeller varies with the speed of the vehicle for any amount of desired thrust.

It was custom heretofore to use variable pitch propellers to obtain the best propeller efficiency at different speeds of the vehicle.

It was also proposed in the past to use propeller pairs of different numbers of propeller blades to drive ships by multiple propeller pairs. At those drives of ships it was also already proposed to use different pitches of the propellers to obtain a running of the ship with a minimum of vibration.

However, it was never tried to use a plurality of propeller-pairs with equal pitches of the propellers of the same pair but different pitches of the propellers of another pair and to varify automatically the power supply to the different propeller pairs in order to supply to each propeller pair the different powers for different speeds.

If however, such power division would become possible, the vehicle could be driven by propeller pairs of simple propellers with fixed-pitch, inexpensive propellers, but different pitches in different propeller pairs. And, such vehicle would then be able to run with good efficiencies at different forward speeds.

When a propeller rests relatively to the fluid, like water or air, wherein it is applied, it consumes the power:

$$N = \sqrt{S^3/2\theta F} \qquad (a)$$

But, when the propeller moves forward relatively to the fluid, it consumes the power:

$$N = 0.5 \theta C_w A V_o^3 \qquad (b)$$

In the above equations the following values are applying:
  N=power t.e. in Kgm/s
  S=thrust in KG.
  $\theta$=density of fluid; f.e. 0.125 kgs$^2$/m$^4$ for air;
  F=Area of propeller circle=$d^2\pi/4$ f.e. in m$^2$ with d=diameter of the propeller; for example, in m.
  A=vertical projection of the propeller-blade f.e. in m$^2$.
  Vo=relative velocity of the rotary speed of the propeller-blade relatively to the fluid, for example in m/s.
  Cw=drag coefficient of this propeller-blade.
  Vo=is $2R\pi n/60$ in m/s for R=radius of propeller for the respective propeller area and n=RPM.

The above equations are proven in my U.S. Pat. No. 4,387,866 which issued on June 14, 1983. and in my German patent publication No. 2,903,389 of Oct. 10th, 1979.

In said publications the development of the above equations can become studied.

Equation (b) is given in the said patent for an aircraft, or an aircraft wing. The propeller-blade is acting in the same way as an aircraft wing, when not seen in the direction of movement of the propeller's axis but seen in the direction of movement of the propeller blade relatively to the surrounding fluid. Equation (b) can therefore be applied to a propeller-blade as well as to an air craft wing. The power consumption of the propeller is then obtained by calculating and summarizing all consumed powers of all blade portions.

In equation (b) appears the drag-coefficient Cw. This coefficient depends strongly on the angle of attack of the propeller and the angle of attack is a function of the pitch of the propeller and of the forward speed of the vehicle, because with increasing forward speed of the vehicle the angle of attack decreases, when the propeller has a fixed, constant pitch.

The value of the drag coefficient Cw is commonly around 0,04 at angle of attack about zero and it rises to about 0,2 at angle of attack about 15 degrees.

The invention now considers, that the vehicle should be driven by a single power plant and said plant should drive at least two propeller pairs. Then the fact exists, that only the installed power is available for the vehicle and it can not be rised over the installed power.

The vehicle intends to fly economically at a higher forward speed, or to move at a higher forward speed. At such high forward speed the propeller pair requires a suitable angle of attack in order to obtain the best traction or thrust at the respective forward speed. The propellers to drive the vehicle at such forward speed therefore require a high pitch of the fixed propeller's constant pitch, because the forward speed requires such high angle of pitch in order to obtain the suitable angle of attack at the mentioned forward speed.

When the same propeller would be used with the so installed propeller pitch to run the vehicle with slow speed, the active angle of attack would become so high, that the power required would be so high, that the installed power would not be able any more to revolve the propeller. Because the propeller pitch for high forward speed would then give an angle of attack, probably even higher than the mentioned 15 degrees and the drag coefficient would become so high, that the engine would fail to supply enough power to revolve the propeller with enough rotary speed.

To run the vehicle effectively at start or at low speed it would, therefore, be required to give the propeller pair a smaller angle of attack in order, that the engine or power plant has enough power to spin the propellers around with enough rotary velocity.

But, when the propellers would get such a small pitch to be suitable for running the vehicle at low speed, the propellers would have too small an angle of attack at the higher forward speed, that they would not bite then any more and the craft or vehicle would then not be able any more to obtain such a high speed as the installed power could give the vehicle when it would have propellers with suitable angle of attack at the higher forward speed.

The invention solves these problems thereby, that it drives at least two propeller pairs by a transmission means between the power plant and the propellers. Hereto it adds, that the propellers of one of the pairs have another pitch than the propellers of the other propeller pair. For example, one propeller pair for a slower forward speed and the other propeller pair for a higher forward speed of the vehicle. To held the vehicle simple and inexpensive in production, the invention applies in addition a fixed ratio of transmission speed between the power plant and the propellers. Thereby the propellers of equal pairs revolve with equal rotary velocities. The rotary direction may be opposite, when the propellers of the pair are arranged on opposite sides of the vehicle.

By this solution of the invention, the novel and highly desireable effect appears, that at the lower speed one of the propeller pairs effectively bites and accellerates the vehicle forward to enter the higher speed range as quick as possible. True, the propellers of the higher-speed pair have now too high an angle of attack and they ae braking the speed of the propellers or they are restricting the revolutions of them. But as soon as the higher speed range is obtained, the propellers of the higher speed range pair will bite effectively, while the propellers of the lower speed pair are now having a very small or negative angle of attack and therefore now, in the higher speed range consume only little power.

The novel and highly effective solution of the invention now is, that gradually with increase of the forward speed of the vehicle, more and more of the power goes to the higher speed range propeller pair. Or, in other words, during the accelleration proceedure of the vehicle the portions of power supplied to the propeller pairs change or vary relatively to each other. The power portion transfered to the higher speed range propeller pair increases with increase of forward speed of the vehicle relatively to the power portion supplied to the lower speed propeller pair.

Thus, the power available is stepplessly variable between the propeller pairs depending on the forward motion speed of the vehicle. The power is automatically and without pilot—action or driver—action more and more supplied to the higher speed propeller pair, when the speed of the vehicle increases.

The total installation of power to the vehicle of the invention is thereby less than would be required, when the vehicle would run with propellers with equal pitch only, or when each propeller would have an individual power plant.

Due to another object of the invention, the transmission is a multi flow fluid drive of individual flows of equal rate of flows in individual flow pairs which enforces equal rotary velocities in individual propeller pairs.

Another object of the invention is, to make at least one pair of flows of the the fluid drive variable by application of a variable multiple flow pump in order to be able to selectively infuence the power portion to be transfered to the respective propeller pair.

It is also possible to apply plural variable multi-flow pump sets in order to operate different propeller pairs at different forward speeds of the vehicle, whereby most economic propeller efficiencies of different propeller pairs can be obtained at both speed ranges, the lower and the higher forward speed range. Thereby almost all available power can be transfered to the lower speed propeller pair at lower forward speed of the vehicle, while almost all of the available power can be transferred to the higher speed range propeller pair at the higher forward speed of the vehicle and in speed ranges therebetween the power can be delievered in the right proportion to one or the other or both of the installed propeller pairs.

With the above described technological background, it is no possible to engage the specific objects of the present invention.

Therefore it is also an object of the invention is, to provide an arrangement to at least one propeller with means to varify at least one portion in relation between a propeller and its neighborhood in order to obtain a specific capability.

In order to obtain the best benefit from the arrangements of the invention, it is strongly recommended to obey the following rules and equations of my mentioned co-pending applications or of other of my literatures:

$\theta$ = Density of air or fluid, for example = 0,125 Kg s²/m⁴
m = Mass of air or fluid, for example = rho·F·V1
Vo32 Velocity of air or fluid in fluid stream before the propeller f.e. m/s
V1 = Velocity of fluid through propeller-circle; f.e. m/s
V2 = Velocity of fluid in fluid stream after the propeller; f.e. m/s
V2h = Velocity after propeller, if propeller revolves in stand
Vsf = Velocity after propeller, if propeller flies forward along axis $$V1h = \sqrt{S/2\theta F} = \sqrt[3]{N/2\theta F} = m/s$$

$$V1f = (V_0 + V_2)/2 = m/s$$

-continued $$V2h = 2V_1h = \sqrt[3]{4N/\theta F} = \sqrt[3]{8N/2\theta F} = \sqrt{2H/\theta F} = m/s$$

$$V2f = \sqrt{V_0^2 + 2S/\theta F} = m/s$$

H = Lift in stand or hovering, f.e.: Kg; = $2\theta F V_1^2$
I = impulse of mass of fluid
N = Power consumption in Kg m/ec
F = Area of propeller circle = D²pi/4 with pi = 3,1416
D = Diameter of the propeller, for example, in meter = m
A = Area of wing. Biggest projection, usually vertical projection in m²

$$Nh = \text{Power at hovering} = \sqrt{\left(\frac{1}{\eta} S\right)^3 / 2\theta F}$$

$$H = \text{Lift in stand or hovering} = \sqrt[3]{2\theta FN^2} =$$

$$M\sqrt[3]{2\theta F\left(\frac{\eta N}{M}\right)^2}$$

Ftl = Comparison factor for multiple propellers at equal power
M = Number of propellers $$Ftl = M\sqrt[3]{\frac{\eta^2}{M^2}} = \sqrt[3]{M\eta^2}$$

Lf = Lift of wing section in flight, for example: Kg.
Df = Drag of wing section in flight, for example,: Kg.
Cl = Lift coefficient of wing section
Cd = Drag coefficient of wing section.
$\eta$ = efficiency(ies)
Lf = $(\theta/2)$ CL A V² = KG
Df = $(\theta/2)$ CD A V² = KG;
whereat specific attention should be given thereto, that velocity V2 which is created by the propeller provides in some embodiments of the invention a velocity V over a wing section and thereby drag and lift; also attention should be provided, that according to my theories increase in number of propellers at a given power increases lift in stand. rn most embodiments of the invention, the plural appearances are overlaying and are overlaid in such a way, that they bring the desired benefit.

It will be understood that each of the elements described above, or two or more together, may also find a useful application in other types of constructions differing from the type described above.

While the invention has been illustrated and described as embodied in a fluid-stream driven aircraft, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims.

What is claimed is:

1. A vehicle capable of travel on a road as a car and capable of lifting away from the road to fly through the air while it is also capable of landing onto a road, comprising, in combination, a body provided with at least four wheels, a power plant and holding arms which extend forward and rearward from said body, said wheels freewheeling on axes which extend perpendicular to the longitudinal direction of said body to run said body on said road in forward and rearward directions, a plurality of ducts pivotably provided on said arms with an equal number of said ducts provided on said foreward and said rearward extending arms, propellers individually provided in said ducts and borne in said ducts to revolve around their axes, drive sets individually provided to said axes of said propellers, individual transmissions extending from said power plant to said drive sets to drive said propellers, a common adjustment means provided to said ducts to pivot said ducts in unison from a horizontal to a vertical position and vice versa, wherein said transmission is a hydrostatic transmission;

wherein said drive sets are hydrostatic motors, wherein said transmission includes a multi flow pump with individual outlets equal in number to the number of said ducts and with at all times proportionate rates of flow in all of said outlets, wherein said transmission includes individual delivery fluid lines and individual return fluid lines between said pump and said motors, and, wherein said number of said ducts defines eight ducts with four of them in pairs located on said forward extending arm and four of them located in said rearward extending arm, whereby the ducts of said pairs are located laterally of each other and said pairs are located with one pair behind another pair, for obtaining a balanced thrust of all propellers in all ducts respective to a longitudinal axis of said vehicle and for obtaining a capability to lift said vehicle in the lateral size of a car.

* * * * *